United States Patent
Kim et al.

(10) Patent No.: US 10,390,357 B2
(45) Date of Patent: Aug. 20, 2019

(54) METHOD AND APPARATUS FOR TRANSMITTING OR RECEIVING DATA IN WIRELESS COMMUNICATION SYSTEM

(71) Applicant: LG ELECTRONICS INC., Seoul (KR)

(72) Inventors: Myoungseob Kim, Seoul (KR); Hanbyul Seo, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/744,678

(22) PCT Filed: Jul. 11, 2016

(86) PCT No.: PCT/KR2016/007494
§ 371 (c)(1),
(2) Date: Jan. 12, 2018

(87) PCT Pub. No.: WO2017/010761
PCT Pub. Date: Jan. 19, 2017

(65) Prior Publication Data
US 2018/0213549 A1 Jul. 26, 2018

Related U.S. Application Data

(60) Provisional application No. 62/191,546, filed on Jul. 13, 2015.

(51) Int. Cl.
*H04W 4/00* (2018.01)
*H04W 72/12* (2009.01)
(Continued)

(52) U.S. Cl.
CPC ........... *H04W 72/1257* (2013.01); *H04L 1/00* (2013.01); *H04L 5/0023* (2013.01);
(Continued)

(58) Field of Classification Search
CPC ............ H04L 1/00; H04L 5/00; H04W 28/02; H04W 4/40; H04W 72/0486;
(Continued)

(56) References Cited

U.S. PATENT DOCUMENTS

2014/0301312 A1* 10/2014 Kim ................. H04W 72/1263
370/329
2015/0111519 A1  4/2015 Li et al.
2016/0212793 A1*  7/2016 Jung ..................... H04W 76/14

FOREIGN PATENT DOCUMENTS

WO  WO 2011/043637 A2  4/2011
WO  WO 2014/048486 A1  4/2014
WO  WO 2015/050393 A1  4/2015

OTHER PUBLICATIONS

LG Electronics Inc., "V2V/V2I communication", 3GPP TSG-SA WG1 Meeting #70: S1-151103, Apr. 13-17, 2015, pp. 1-3.

* cited by examiner

*Primary Examiner* — Minh Trang T Nguyen
(74) *Attorney, Agent, or Firm* — Birch, Stewart, Kolasch & Birch, LLP

(57) ABSTRACT

The present invention relates to a method and apparatus for transmitting or receiving data with a base station by a device in a wireless communication system supporting a vehicle to everything (V2X) service. The present invention provides a method and apparatus for establishing a V2X link for transmitting or receiving a message with the base station, entering into an idle state, and transmitting, on the basis of a specific condition in the idle state, a message through a first resource allocated by the base station or a second resource for contention-based transmission to the base station.

18 Claims, 35 Drawing Sheets

(51) Int. Cl.
  *H04L 1/00* (2006.01)
  *H04W 28/02* (2009.01)
  *H04W 4/40* (2018.01)
  *H04W 72/14* (2009.01)
  *H04W 74/08* (2009.01)
  *H04W 72/04* (2009.01)
  *H04W 72/08* (2009.01)
  *H04L 5/00* (2006.01)
  H04W 84/00 (2009.01)

(52) U.S. Cl.
  CPC .......... *H04L 5/0032* (2013.01); *H04L 5/0055* (2013.01); *H04L 5/0057* (2013.01); *H04W 4/40* (2018.02); *H04W 28/02* (2013.01); *H04W 72/0486* (2013.01); *H04W 72/087* (2013.01); *H04W 72/1268* (2013.01); *H04W 72/14* (2013.01); *H04W 74/0833* (2013.01); H04L 5/0007 (2013.01); H04W 84/005 (2013.01)

(58) Field of Classification Search
  CPC ........... H04W 72/087; H04W 72/1257; H04W 72/1268; H04W 72/14; H04W 74/0833; H04W 88/08
  See application file for complete search history.

(a) Radio resource use_type 1

(b) Radio resource use_type 2

METHOD AND APPARATUS FOR TRANSMITTING OR RECEIVING DATA IN WIRELESS COMMUNICATION SYSTEM

CROSS REFERENCE TO RELATED APPLICATIONS

This application is the National Phase of PCT International Application No. PCT/KR2016/007494, filed on Jul. 11, 2016, which claims priority under 35 U.S.C. 119(e) to U.S. Provisional Application No. 62/191,546, filed on Jul. 13, 2015, all of which are hereby expressly incorporated by reference into the present application.

TECHNICAL FIELD

The present invention relates to a wireless communication system and more specifically, a method for transmitting and receiving data in a wireless communication supporting Vehicle-to everything (V2X) communication and an apparatus supporting the method.

BACKGROUND ART

A mobile communication system has been developed to provide a voice service while guaranteeing user mobility. However, the mobile communication system has been extended a service range to a data service as well as a voice, and nowadays, a resource shortage phenomenon occurs due to explosive traffic increase and users request a higher speed service and thus a more enhanced mobile communication system is required.

A next generation mobile communication system should be able to support acceptance of explosive data traffic, significant increase of a transmission rate per user, acceptance of the largely increased connection device number, very low end-to-end latency, and high energy efficiency. For this reason, various technologies such as dual connectivity, Massive Multiple Input Multiple Output (Massive MIMO), In-band Full Duplex, Non-Orthogonal Multiple Access (NOMA), Super wideband support, and Device Networking have been researched.

SUMMARY OF INVENTION

Technical Problem

Vehicle-to-everything (V2X) communication or Vehicle-to-Vehicle (V2V) communication may perform communication directly among devices or enable a device to transmit data to a base station through an uplink frequency band.

At this time, while maintaining a connection (for example, RRC connection) with the base station, the device may transmit uplink data according to the scheduling of the base station but is unable to transmit data through the scheduling of the base station after the connection is released.

In this case, the device may perform communication by re-establishing a connection with the base station. However, the connection procedure is complicated, and a large number of messages have to be transmitted and received until the connection is re-established.

Also, in the case of V2V communication, since vehicle speeds are different, it is likely that a normal connection may not be established because of large signaling overhead due to frequent inter-cell handover, frequent handover due to mobility, and limited PRACH resources.

Therefore, to solve the problem above, there needs a method for transmitting and receiving data without involving a re-connection procedure when a connection between a device and a base station is released.

Technical objects to be achieved by the present invention are not limited to those described above, and other technical objects not mentioned above may also be clearly understood from the descriptions given below by those skilled in the art to which the present invention belongs.

Technical Solution

To achieve the object above, the present invention provides a method for a device to transmit and receive data with a base station in a wireless communication system supporting a V2X (Vehicle-to-everything) service, comprising establishing a link for transmitting and receiving messages with the base station; entering an idle state; and transmitting a message through a first resource allocated by the base station based on a specific condition in the idle state or through a second resource for contention based transmission to the base station.

Also, according to the present invention, the specific condition is determined by one of a message type, message size, first energy level of the second resource, or mobility of the first device.

Also, according to the present invention, when the specific condition is determined by the message type, the message type may be determined by Quality of Service (QoS) of the message, and the QoS is one of a latency request value indicating a required latency of the message and a target error rate.

Also, according to the present invention, when the QoS is the required latency value, the message is transmitted through the second resource when the required latency value is less than a threshold value, and the message is transmitted through the first resource when the required latency value is larger than the threshold value.

Also, according to the present invention, the threshold value indicates the maximum value required for the device to establish a link with the base station and transmit data.

Also, according to the present invention, when the specific condition is determined by the message size, the message is transmitted through the first resource when a value representing ratio of overhead for transmitting the message is less than a threshold value, and the message is transmitted through the second resource when the value is larger than the threshold value, and the threshold value indicates the maximum value of overhead ratio for transmitting the message through the second resource.

Also, according to the present invention, when the specific condition is determined by the first energy level, the method further comprises measuring the first energy level.

Also, according to the present invention, when the first energy level is less than a threshold value, the message is transmitted through the second resource.

Also, according to the present invention, when the first energy level is larger than a threshold value, the method further comprises measuring a second energy level of the first resource.

Also, according to the present invention, when the second energy level is less than the threshold value, the message is transmitted through the first resource.

Also, according to the present invention, when the second energy level is larger than the threshold value, the message is transmitted through the resource randomly chosen between the first and the second resource.

Also, according to the present invention, when the specific condition is determined by the mobility, the message is transmitted through the second resource when the mobility is larger than a threshold value, and the message is transmitted through the first resource when the mobility is less than the threshold value.

Also, according to the present invention, when the message is transmitted through the first resource, the method further comprises requesting a third resource for transmitting a BSR (Buffer State Report) to the base station; receiving the third resource from the base station; transmitting the BSR through the third resource; and receiving the first resource for transmitting the message from the base station based on the BSR.

Also, the present invention provides a method comprising establishing a link for transmitting and receiving messages with the base station; requesting allocation of a third resource for transmission of a BSR to the base station; receiving the third resource from the base station; transmitting the BSR through the first resource; and transmitting the message through the first resource or the second resource for contention based transmission based on the BSR according to whether the first resource for transmitting the message has been allocated.

Also, according to the present invention, when the size of the message is larger than the size of the message reported through the BSR, the message is transmitted through the second resource.

Also, according to the present invention, when the size of the message is equal to or smaller than the size of the message reported through the BSR, the message is transmitted through the first resource.

Also, according to the present invention, when the first resource is allocated within a specific time period, the message is transmitted through the first resource.

Also, according to the present invention, when the first resource is not allocated within a specific time period, the message is transmitted through the second resource.

Also, according to the present invention, when the second resource is not allocated within a specific time period, the method further comprises requesting allocation of a fourth resource for transmitting the message to the base station; receiving the fourth resource from the base station; and transmitting the message through the fourth resource.

Also, the present invention provides a device comprising a communication unit for transmitting and receiving a signal to and from the outside in a wired and/or wireless manner; and a controller functionally connected to the communication unit, wherein the controller is configured to establish a link for transmitting and receiving messages to and from the base station, to enter an idle state, and to transmit a message through a first resource allocated by the base station based on a specific condition in the idle state or through a second resource for contention based transmission to the base station.

Advantageous Effects

According to an embodiment of the present invention, data may be transmitted and received not only when a device is connected to a base station but also when the device is in the idle state.

Also, according to the present invention, data is transmitted to a base station when a device is in a connected or a non-connected state according to whether a specific condition is satisfied, and thereby data may be transmitted or received in a flexible manner.

Also, according to the present invention, a device transmits and receives data to and from a base station in a connected or idle state by taking into account the message type, message size, resource state, mobility, and so on, thereby transmitting and receiving data appropriately for a given situation.

Also, according to the present invention, since data is transmitted and received in the idle state through contention based resources, service requirements may be satisfied.

Also, according to the present invention, since data is transmitted and received in the idle state through contention based resources, latency for data transmission and reception may be reduced.

Also, according to the present invention, while a device is in the connected state, data may be transmitted and received through a resource allocated according to data size and/or whether a resource has been allocated or through contention based resources.

The technical effects of the present invention are not limited to the technical effects described above, and other technical effects not mentioned herein may be understood to those skilled in the art from the description below.

DESCRIPTION OF DRAWINGS

The accompany drawings, which are included to provide a further understanding of the present invention and are incorporated on and constitute a part of this specification illustrate embodiments of the present invention and together with the description serve to explain the principles of the present invention.

BEST MODE

Figure 1:
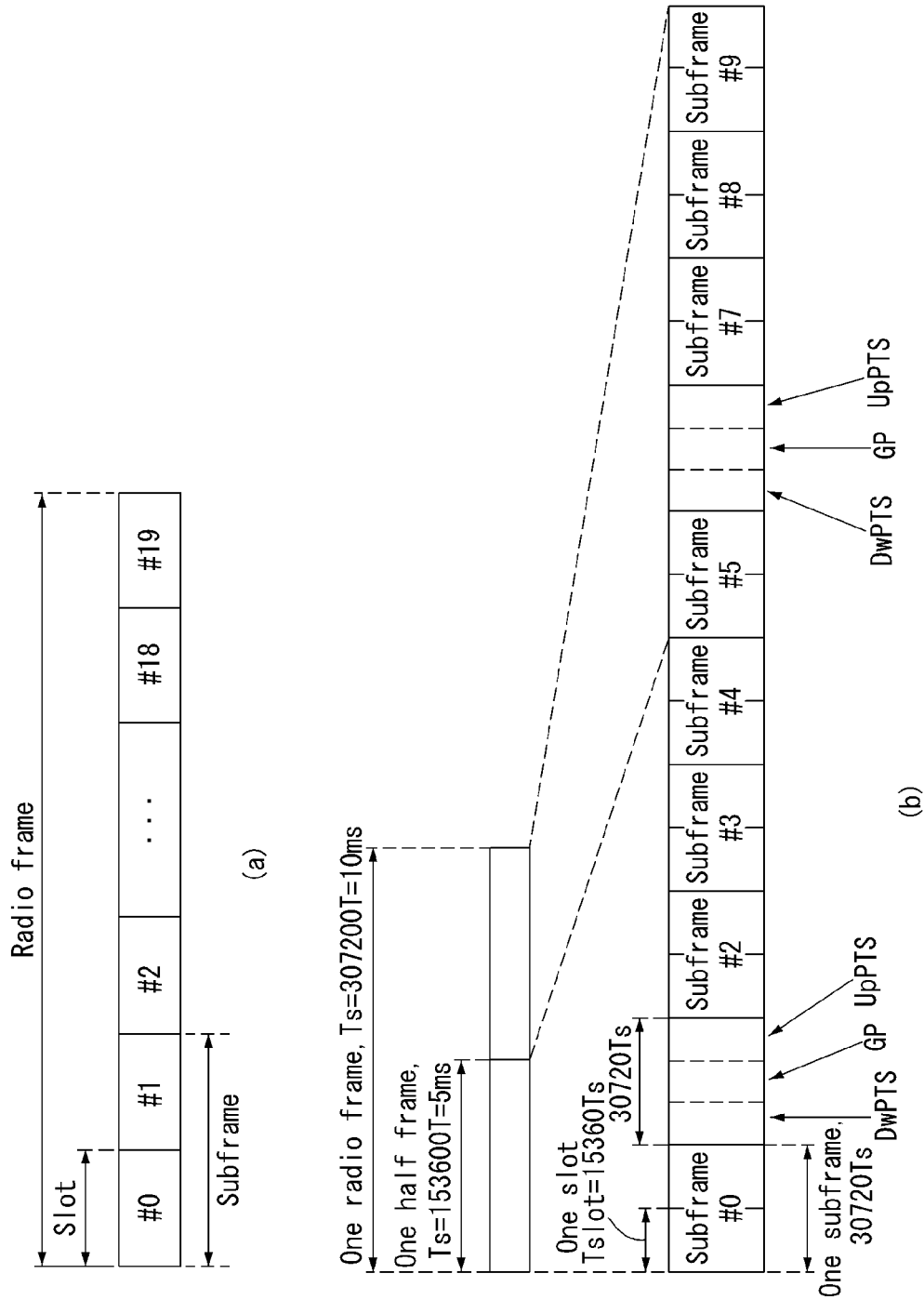
FIG. 1 illustrates the structure of a radio frame in a wireless communication system to which the present invention may be applied.

Hereafter, preferred embodiments of the present invention will be described in detail with reference to the accompanying drawings. A detailed description to be disclosed herein below together with the accompanying drawing is to describe embodiments of the present invention and not to describe a unique embodiment for carrying out the present invention. The detailed description below includes details in order to provide a complete understanding. However, those skilled in the art know that the present invention can be carried out without the details.

In some cases, in order to prevent a concept of the present invention from being ambiguous, known structures and devices may be omitted or may be illustrated in a block diagram format based on core function of each structure and device.

In the specification, a base station means a terminal node of a network directly performing communication with a terminal. In the present document, specific operations described to be performed by the base station may be performed by an upper node of the base station in some cases. That is, it is apparent that in the network constituted by multiple network nodes including the base station, various operations performed for communication with the terminal may be performed by the base station or other network nodes other than the base station. A base station (BS) may be generally substituted with terms such as a fixed station, Node B, evolved-NodeB (eNB), a base transceiver system (BTS), an access point (AP), and the like. Further, a 'terminal' may be fixed or movable and be substituted with terms such as user equipment (UE), a mobile station (MS), a user terminal (UT), a mobile subscriber station (MSS), a subscriber station (SS), an advanced mobile station (AMS), a wireless terminal (WT), a Machine-Type Communication (MTC) device, a Machine-to-Machine (M2M) device, a Device-to-Device (D2D) device, and the like.

Hereinafter, a downlink means communication from the base station to the terminal and an uplink means communication from the terminal to the base station. In the downlink, a transmitter may be a part of the base station and a receiver may be a part of the terminal. In the uplink, the transmitter may be a part of the terminal and the receiver may be a part of the base station.

Specific terms used in the following description are provided to help appreciating the present invention and the use of the specific terms may be modified into other forms within the scope without departing from the technical spirit of the present invention.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as Global System for Mobile communications (GSM)/General Packet Radio Service (GPRS)/Enhanced Data Rates for GSM Evolution (EDGE). The OFDMA may be implemented as radio technology such as IEEE 802.11 (Wi-Fi), IEEE 802.16 (WiMAX), IEEE 802-20, E-UTRA (Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

The embodiments of the present invention may be based on standard documents disclosed in at least one of IEEE 802, 3GPP, and 3GPP2 which are the wireless access systems. That is, steps or parts which are not described to definitely show the technical spirit of the present invention among the embodiments of the present invention may be based on the documents. Further, all terms disclosed in the document may be described by the standard document.

GPP LTE/LTE-A is primarily described for clear description, but technical features of the present invention are not limited thereto.

General System

FIG. 1 illustrates a structure a radio frame in a wireless communication system to which the present invention can be applied.

In 3GPP LTE/LTE-A, radio frame structure type 1 may be applied to frequency division duplex (FDD) and radio frame structure type 2 may be applied to time division duplex (TDD) are supported.

FIG. 1(a) exemplifies radio frame structure type 1. The radio frame is constituted by 10 subframes. One subframe is constituted by 2 slots in a time domain. A time required to transmit one subframe is referred to as a transmissions time interval (TTI). For example, the length of one subframe may be 1 ms and the length of one slot may be 0.5 ms.

One slot includes a plurality of orthogonal frequency division multiplexing (OFDM) symbols in the time domain and includes multiple resource blocks (RBs) in a frequency domain. In 3GPP LTE, since OFDMA is used in downlink, the OFDM symbol is used to express one symbol period. The OFDM symbol may be one SC-FDMA symbol or symbol period. The resource block is a resource allocation wise and includes a plurality of consecutive subcarriers in one slot.

FIG. 1(b) illustrates frame structure type 2. Radio frame type 2 is constituted by 2 half frames, each half frame is constituted by 5 subframes, a downlink pilot time slot (DwPTS), a guard period (GP), and an uplink pilot time slot (UpPTS), and one subframe among them is constituted by 2 slots. The DwPTS is used for initial cell discovery, synchronization, or channel estimation in a terminal. The UpPTS is used for channel estimation in a base station and to match uplink transmission synchronization of the terminal. The guard period is a period for removing interference which occurs in uplink due to multi-path delay of a downlink signal between the uplink and the downlink.

In frame structure type 2 of a TDD system, an uplink-downlink configuration is a rule indicating whether the uplink and the downlink are allocated (alternatively, reserved) with respect to all subframes. Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | — | — | D |

Referring to Table 1, for each sub frame of the radio frame, 'D' represents a subframe for downlink transmission, 'U' represents a subframe for uplink transmission, and 'S' represents a special subframe constituted by three fields such as the DwPTS, the GP, and the UpPTS. The uplink-downlink configuration may be divided into 7 configurations and the positions and/or the numbers of the downlink subframe, the special subframe, and the uplink subframe may vary for each configuration.

A time when the downlink is switched to the uplink or a time when the uplink is switched to the downlink is referred to as a switching point. Switch-point periodicity means a period in which an aspect of the uplink subframe and the downlink subframe are switched is similarly repeated and both 5 ms or 10 ms are supported. When the period of the downlink-uplink switching point is 5 ms, the special subframe S is present for each half-frame and when the period of the downlink-uplink switching point is 5 ms, the special subframe S is present only in a first half-frame.

In all configurations, subframes #0 and #5 and the DwPTS are intervals only the downlink transmission. The UpPTS and a subframe just subsequently to the subframe are continuously intervals for the uplink transmission.

The uplink-downlink configuration may be known by both the base station and the terminal as system information. The base station transmits only an index of configuration information whenever the uplink-downlink configuration information is changed to announce a change of an uplink-downlink allocation state of the radio frame to the terminal. Further, the configuration information as a kind of downlink control information may be transmitted through a physical downlink control channel (PDCCH) similarly to other scheduling information and may be commonly transmitted to all terminals in a cell through a broadcast channel as broadcasting information.

The structure of the radio frame is just one example and the number subcarriers included in the radio frame or the number of slots included in the subframe and the number of OFDM symbols included in the slot may be variously changed.

Figure 2:
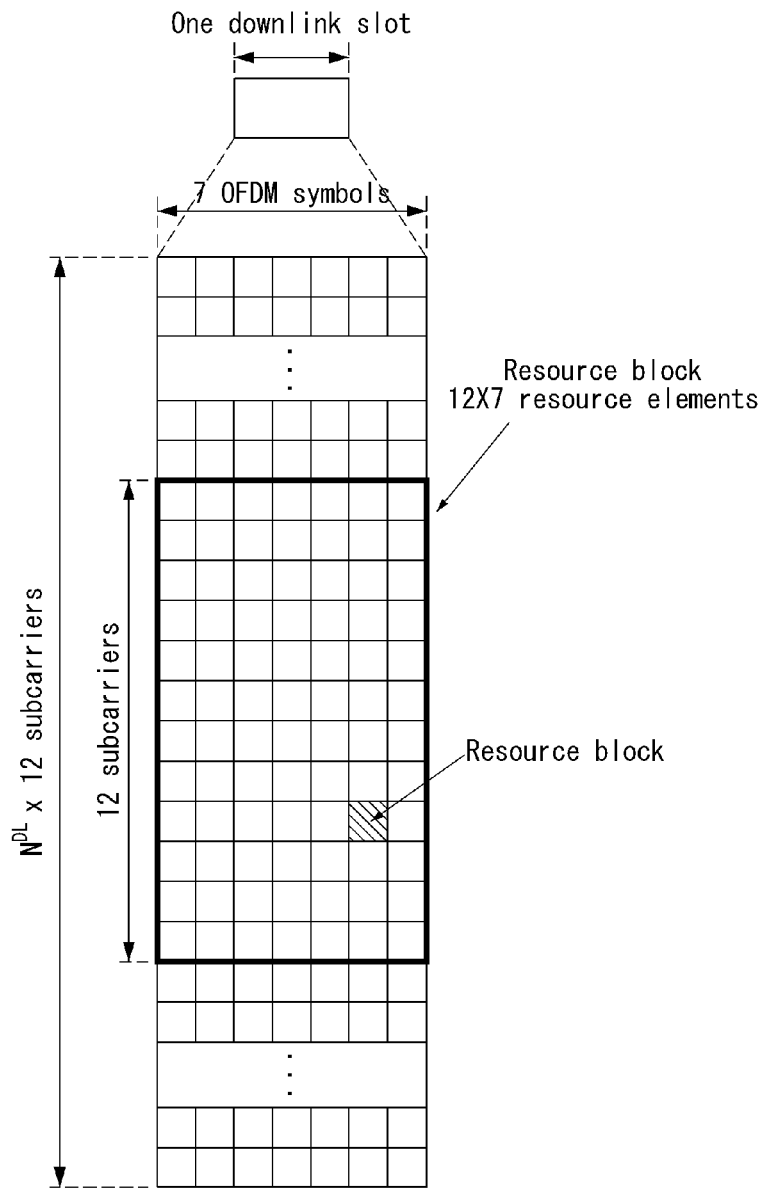
FIG. 2 is a diagram illustrating a resource grid for a downlink slot in a wireless communication system to which the present invention may be applied.

FIG. 2 is a diagram illustrating a resource grid for one downlink slot in the wireless communication system to which the present invention can be applied.

Referring to FIG. 2, one downlink slot includes the plurality of OFDM symbols in the time domain. Herein, it is exemplarily described that one downlink slot includes 7 OFDM symbols and one resource block includes 12 subcarriers in the frequency domain, but the present invention is not limited thereto.

Each element on the resource grid is referred to as a resource element and one resource block includes 12×7 resource elements. The number of resource blocks included in the downlink slot, NDL is subordinated to a downlink transmission bandwidth.

A structure of the uplink slot may be the same as that of the downlink slot.

Figure 3:
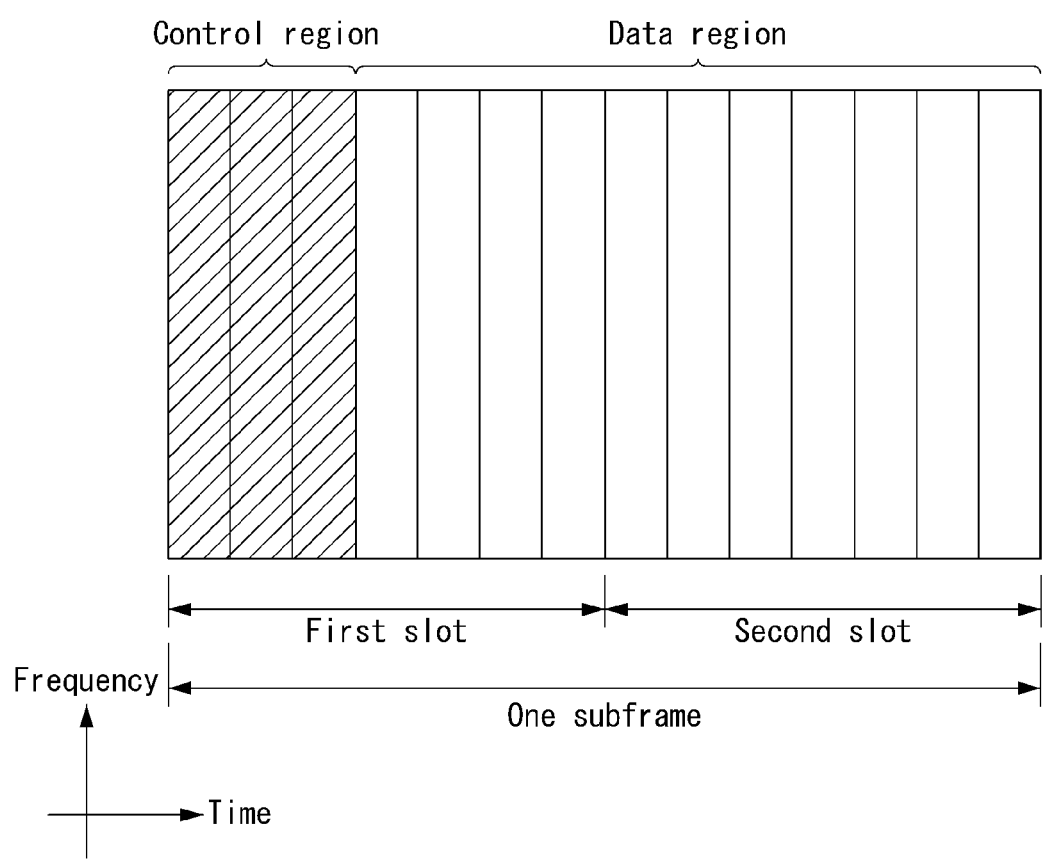
FIG. 3 illustrates a structure of downlink subframe in a wireless communication system to which the present invention may be applied.

FIG. 3 illustrates a structure of a downlink subframe in the wireless communication system to which the present invention can be applied.

Referring to FIG. 3, a maximum of three fore OFDM symbols in the first slot of the sub frame is a control region to which control channels are allocated and residual OFDM symbols is a data region to which a physical downlink shared channel (PDSCH) is allocated. Examples of the downlink control channel used in the 3GPP LTE include a Physical Control Format Indicator Channel (PCFICH), a Physical Downlink Control Channel (PDCCH), a Physical Hybrid-ARQ Indicator Channel (PHICH), and the like.

The PFCICH is transmitted in the first OFDM symbol of the subframe and transports information on the number (that is, the size of the control region) of OFDM symbols used for transmitting the control channels in the subframe. The PHICH which is a response channel to the uplink transports an Acknowledgement (ACK)/Not-Acknowledgement (NACK) signal for a hybrid automatic repeat request (HARQ). Control information transmitted through a PDCCH is referred to as downlink control information (DCI). The downlink control information includes uplink resource allocation information, downlink resource allocation information, or an uplink transmission (Tx) power control command for a predetermined terminal group.

The PDCCH may transport A resource allocation and transmission format (also referred to as a downlink grant) of a downlink shared channel (DL-SCH), resource allocation information (also referred to as an uplink grant) of an uplink shared channel (UL-SCH), paging information in a paging channel (PCH), system information in the DL-SCH, resource allocation for an upper-layer control message such as a random access response transmitted in the PDSCH, an aggregate of transmission power control commands for individual terminals in the predetermined terminal group, a voice over IP (VoIP). A plurality of PDCCHs may be transmitted in the control region and the terminal may monitor the plurality of PDCCHs. The PDCCH is constituted by one or an aggregate of a plurality of continuous control channel elements (CCEs). The CCE is a logical allocation wise used to provide a coding rate depending on a state of a radio channel to the PDCCH. The CCEs correspond to a plurality of resource element groups. A format of the PDCCH and a bit number of usable PDCCH are determined according to an association between the number of CCEs and the coding rate provided by the CCEs.

The base station determines the PDCCH format according to the DCI to be transmitted and attaches the control information to a cyclic redundancy check (CRC) to the control information. The CRC is masked with a unique identifier (referred to as a radio network temporary identifier (RNTI)) according to an owner or a purpose of the PDCCH. In the case of a PDCCH for a specific terminal, the unique identifier of the terminal, for example, a cell-RNTI (C-RNTI) may be masked with the CRC. Alternatively, in the case of a PDCCH for the paging message, a paging indication identifier, for example, the CRC may be masked with a paging-RNTI (P-RNTI). In the case of a PDCCH for the system information, in more detail, a system information block (SIB), the CRC may be masked with a system information identifier, that is, a system information (SI)-RNTI. The CRC may be masked with a random access (RA)-RNTI in order to indicate the random access response which is a response to transmission of a random access preamble.

Figure 4:
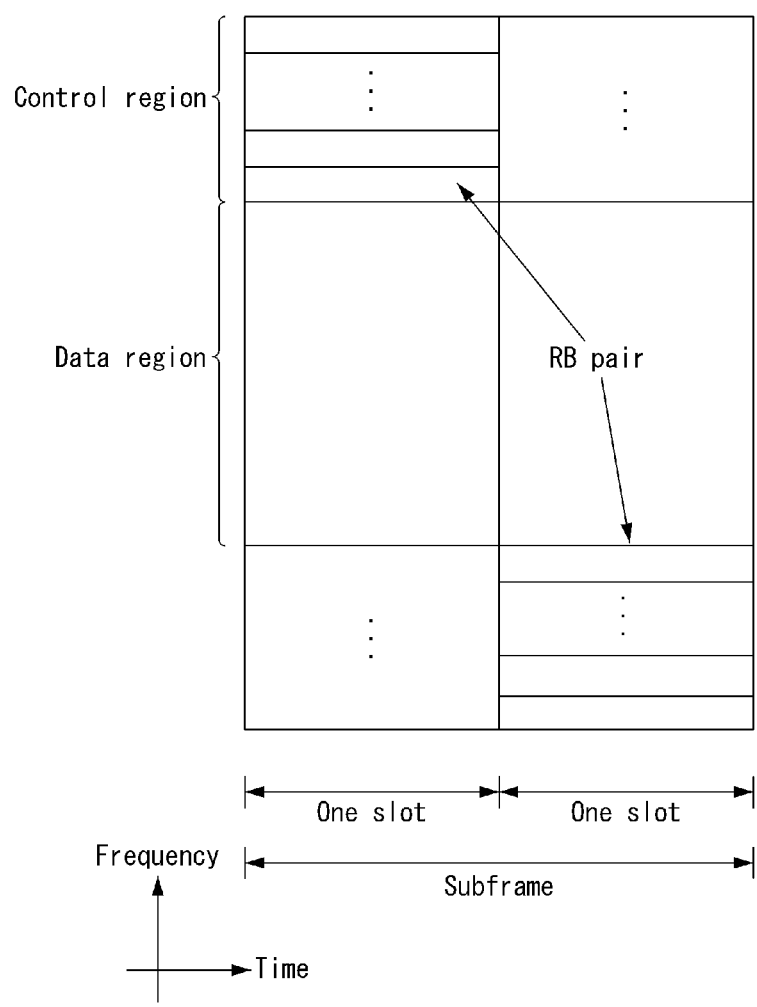
FIG. 4 illustrates a structure of uplink subframe in a wireless communication system to which the present invention may be applied.

FIG. 4 illustrates a structure of an uplink subframe in the wireless communication system to which the present invention can be applied.

Referring to FIG. 4, the uplink subframe may be divided into the control region and the data region in a frequency domain. A physical uplink control channel (PUCCH) transporting uplink control information is allocated to the control region. A physical uplink shared channel (PUSCH) transporting user data is allocated to the data region. One terminal does not simultaneously transmit the PUCCH and the PUSCH in order to maintain a single carrier characteristic.

A resource block (RB) pair in the subframe are allocated to the PUCCH for one terminal. RBs included in the RB pair occupy different subcarriers in two slots, respectively. The RB pair allocated to the PUCCH frequency-hops in a slot boundary.

Physical Uplink Control Channel (PUCCH)

Uplink control information (UCI) transmitted through a PUCCH may include the following scheduling request (SR), HARQ ACK/NACK information, and downlink channel measurement information.

Scheduling Request (SR): The SR is information used for requesting an uplink UL-SCH resource. The SR is transmitted using an On-off Keying (OOK) method.

HARQ ACK/NACK: The HARQ ACK/NACK is a response signal to a downlink data packet on a PDSCH. The HARQ ACK/NACK represents whether a downlink data packet is successfully received. ACK/NACK 1 bit is transmitted in response to a single downlink codeword, and ACK/NACK 2 bits are transmitted in response to two downlink codewords.

Channel State Information (CSI): The CSI is feedback information about a downlink channel. CSI may include at least one of a Channel Quality Indicator (CQI), a rank indicator (RI), a Precoding Matrix Indicator (PMI), and a Precoding Type Indicator (PTI). 20 bits are used per subframe.

The HARQ ACK/NACK information may be generated according to a downlink data packet on the PDSCH is successfully decoded. In the existing wireless communication system, 1 bit is transmitted as ACK/NACK information with respect to downlink single codeword transmission and 2 bits are transmitted as the ACK/NACK information with respect to downlink 2-codeword transmission.

The channel measurement information which designates feedback information associated with a multiple input multiple output (MIMO) technique may include a channel quality indicator (CQI), a precoding matrix index (PMI), and a rank indicator (RI). The channel measurement information may also be collectively expressed as the CQI.

20 bits may be used per subframe for transmitting the CQI.

The PUCCH may be modulated by using binary phase shift keying (BPSK) and quadrature phase shift keying (QPSK) techniques. Control information of a plurality of terminals may be transmitted through the PUCCH and when code division multiplexing (CDM) is performed to distinguish signals of the respective terminals, a constant amplitude zero autocorrelation (CAZAC) sequence having a length of 12 is primary used. Since the CAZAC sequence has a characteristic to maintain a predetermined amplitude in the time domain and the frequency domain, the CAZAC sequence has a property suitable for increasing coverage by decreasing a peak-to-average power ratio (PAPR) or cubic metric (CM) of the terminal. Further, the ACK/NACK information for downlink data transmission performed through the PUCCH is covered by using an orthogonal sequence or an orthogonal cover (OC).

Further, the control information transmitted on the PUCCH may be distinguished by using a cyclically shifted sequence having different cyclic shift (CS) values. The cyclically shifted sequence may be generated by cyclically shifting a base sequence by a specific cyclic shift (CS) amount. The specific CS amount is indicated by the cyclic shift (CS) index. The number of usable cyclic shifts may vary depending on delay spread of the channel. Various types of sequences may be used as the base sequence the CAZAC sequence is one example of the corresponding sequence.

Further, the amount of control information which the terminal may transmit in one subframe may be determined according to the number (that is, SC-FDMA symbols other an SC-FDMA symbol used for transmitting a reference signal (RS) for coherent detection of the PUCCH) of SC-FDMA symbols which are usable for transmitting the control information.

In the 3GPP LTE system, the PUCCH is defined as a total of 7 different formats according to the transmitted control information, a modulation technique, the amount of control information, and the like and an attribute of the uplink control information (UCI) transmitted according to each PUCCH format may be summarized as shown in Table 2 given below.

TABLE 2

| PUCCH Format | Uplink Control Information(UCI) |
| --- | --- |
| Format 1 | Scheduling Request(SR)(unmodulated waveform) |
| Format 1a | 1-bit HARQ ACK/NACK with/without SR |
| Format 1b | 2-bit HARQ ACK/NACK with/without SR |
| Format 2 | CQI (20 coded bits) |
| Format 2 | CQI and 1- or 2-bit HARQ ACK/NACK (20 bits) for extended CP only |
| Format 2a | CQI and 1-bit HARQ ACK/NACK (20 + 1 coded bits) |
| Format 2b | CQI and 2-bit HARQ ACK/NACK (20 + 2 coded bits) |
| Format 3 | HARQ ACK/NACK, SR, CSI (48 coded bits) |

PUCCH format 1 is used for transmitting only the SR. A waveform which is not modulated is adopted in the case of transmitting only the SR and this will be described below in detail.

PUCCH format 1a or 1b is used for transmitting the HARQ ACK/NACK. PUCCH format 1a or 1b may be used when only the HARQ ACK/NACK is transmitted in a predetermined subframe. Alternatively, the HARQ ACK/NACK and the SR may be transmitted in the same subframe by using PUCCH format 1a or 1b.

PUCCH format 2 is used for transmitting the CQI and PUCCH format 2a or 2b is used for transmitting the CQI and the HARQ ACK/NACK. In the case of an extended CP, PUCCH format 2 may be transmitted for transmitting the CQI and the HARQ ACK/NACK.

PUCCH format 3 is used for carrying encoded UCI of 48 bits. The PUCCH format 3 may carry HARQ ACK/NACK of a plurality of serving cells, SR (when existing), and CSI report of one serving cell.

Figure 5:
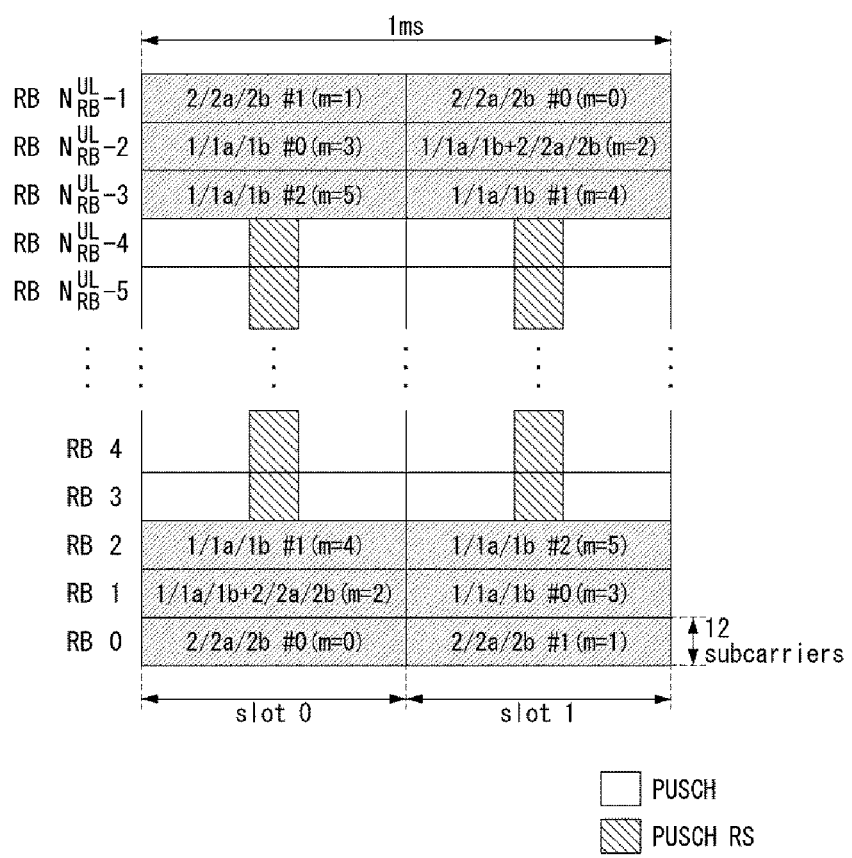
FIG. 5 illustrates an example of the shape in which PUCCH formats are mapped to the PUCCH region of uplink physical resource block in a wireless communication system to which the present invention may be applied.

FIG. 5 illustrates one example of a type in which PUCCH formats are mapped to a PUCCH region of an uplink physical resource block in the wireless communication system to which the present invention can be applied.

In FIG. 5, $N_{RB}^{UL}$ represents the number of resource blocks in the uplink and 0, 1, . . . , $N_{RB}^{UL}-1$ mean numbers of physical resource blocks. Basically, the PUCCH is mapped to both edges of an uplink frequency block. As illustrated in FIG. 5, PUCCH format 2/2a/2b is mapped to a PUCCH region expressed as m=0, 1 and this may be expressed in such a manner that PUCCH format 2/2a/2b is mapped to resource blocks positioned at a band edge. Further, both PUCCH format 2/2a/2b and PUCCH format 1/1a/1b may be mixedly mapped to a PUCCH region expressed as m=2. Next, PUCCH format 1/1a/1b may be mapped to a PUCCH region expressed as m=3, 4, and 5. The number ($N_{RB}^{(2)}$) of PUCCH RBs which are usable by PUCCH format 2/2a/2b may be indicated to terminals in the cell by broadcasting signaling.

PUCCH format 2/2a/2b is described. PUCCH format 2/2a/2b is a control channel for transmitting channel measurement feedback (CQI, PMI, and RI).

A reporting period of the channel measurement feedbacks (hereinafter, collectively expressed as CQI information) and a frequency wise (alternatively, a frequency resolution) to be measured may be controlled by the base station. In the time domain, periodic and aperiodic CQI reporting may be supported. PUCCH format 2 may be used for only the periodic reporting and the PUSCH may be used for aperiodic reporting. In the case of the aperiodic reporting, the base station may instruct the terminal to transmit a scheduling resource loaded with individual CQI reporting for the uplink data transmission.

Figure 6:
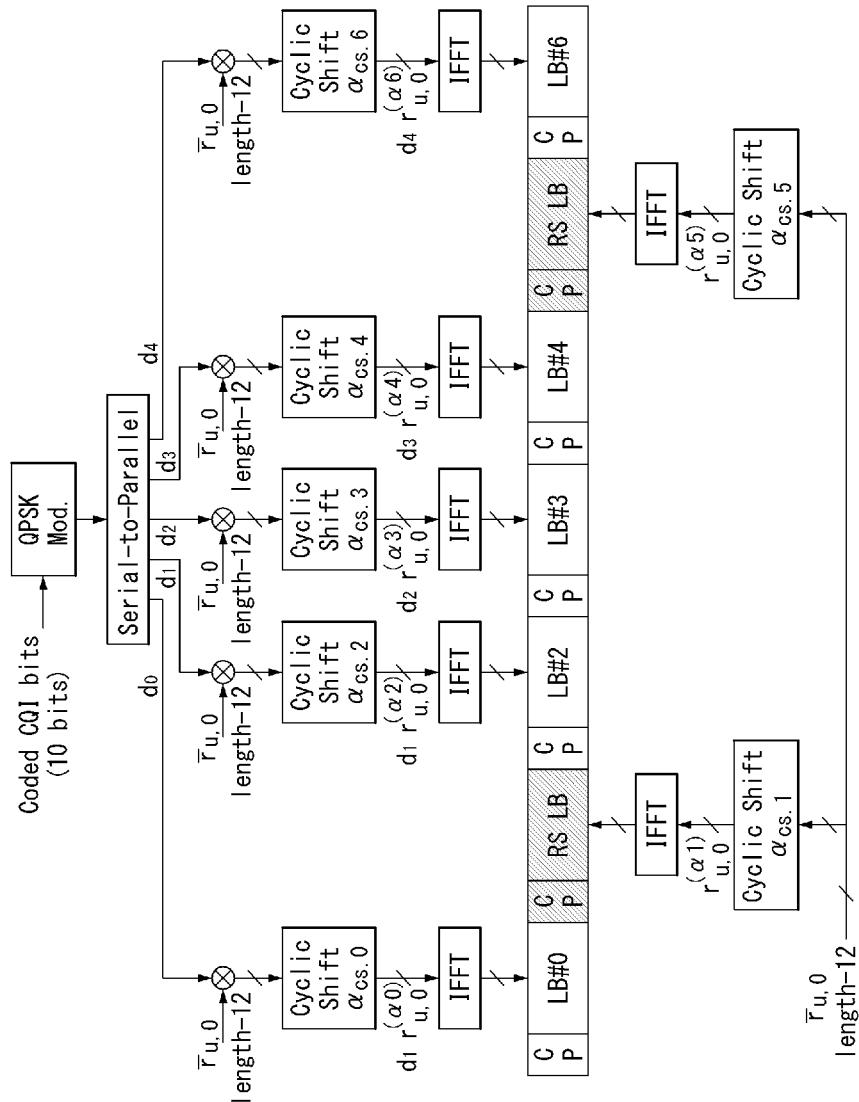
FIG. 6 illustrates a structure of CQI channel in the case of normal CP in a wireless communication system to which the present invention may be applied.

FIG. 6 illustrates a structure of a CQI channel in the case of a general CP in the wireless communication system to which the present invention can be applied.

In SC-FDMA symbols 0 to 6 of one slot, SC-FDMA symbols 1 and 5 (second and sixth symbols) may be used for transmitting a demodulation reference signal and the CQI information may be transmitted in the residual SC-FDMA symbols. Meanwhile, in the case of the extended CP, one SC-FDMA symbol (SC-FDMA symbol 3) is used for transmitting the DMRS.

In PUCCH format 2/2a/2b, modulation by the CAZAC sequence is supported and the CAZAC sequence having the length of 12 is multiplied by a QPSK-modulated symbol. The cyclic shift (CS) of the sequence is changed between the symbol and the slot. The orthogonal covering is used with respect to the DMRS.

The reference signal (DMRS) is loaded on two SC-FDMA symbols separated from each other by 3 SC-FDMA symbols among 7 SC-FDMA symbols included in one slot and the CQI information is loaded on 5 residual SC-FDMA symbols. Two RSs are used in one slot in order to support a high-speed terminal. Further, the respective terminals are distinguished by using the CS sequence. CQI information symbols are modulated and transferred to all SC-FDMA symbols and the SC-FDMA symbol is constituted by one sequence. That is, the terminal modulates and transmits the CQI to each sequence.

The number of symbols which may be transmitted to one TTI is 10 and modulation of the CQI information is determined up to QPSK. When QPSK mapping is used for the SC-FDMA symbol, since a CQI value of 2 bits may be loaded, a CQI value of 10 bits may be loaded on one slot. Therefore, a CQI value of a maximum of 20 bits may be loaded on one subframe. A frequency domain spread code is used for spreading the CQI information in the frequency domain.

The CAZAC sequence (for example, ZC sequence) having the length of 12 may be used as the frequency domain spread code. CAZAC sequences having different CS values may be applied to the respective control channels to be distinguished from each other. IFFT is performed with respect to the CQI information in which the frequency domain is spread.

12 different terminals may be orthogonally multiplexed on the same PUCCH RB by a cyclic shift having 12 equivalent intervals. In the case of a general CP, a DMRS sequence on SC-FDMA symbol 1 and 5 (on SC-FDMA symbol 3 in the case of the extended CP) is similar to a CQI signal sequence on the frequency domain, but the modulation of the CQI information is not adopted.

The terminal may be semi-statically configured by upper-layer signaling so as to periodically report different CQI, PMI, and RI types on PUCCH resources indicated as PUCCH resource indexes ($n_{PUCCH}^{(1,\tilde{p})}$, $n_{PUCCH}^{(2,\tilde{p})}$, and $n_{PUCCH}^{(3,\tilde{p})}$). Herein, the PUCCH resource index ($n_{PUCCH}^{(2,\tilde{p})}$) is information indicating the PUCCH region used for PUCCH format 2/2a/2b and a CS value to be used.

Hereinafter, PUCCH formats 1a and 1b will be described.

In the PUCCH format 1a/1b, a symbol modulated using a BPSK or QPSK modulation method is multiplied with a CAZAC sequence of a length 12. For example, a result in which a CAZAC sequence r (n) (n=0, 1, 2, . . . , N−1) of a length N is multiplied to a modulation symbol d(0) becomes y(0), y(1), y(2), . . . , y(N−1). y(0), y(1), y(2), . . . , y(N−1) symbols may be referred to as a block of symbol. After a CAZAC sequence is multiplied to a modulation symbol, block-wise diffusion using an orthogonal sequence is applied.

A Hadamard sequence of a length 4 is used for general ACK/NACK information, and a Discrete Fourier Transform (DFT) sequence of a length 3 is used for shortened ACK/NACK information and a reference signal.

A Hadamard sequence of a length 2 is used for a reference signal of an extended CP.

Figure 7:
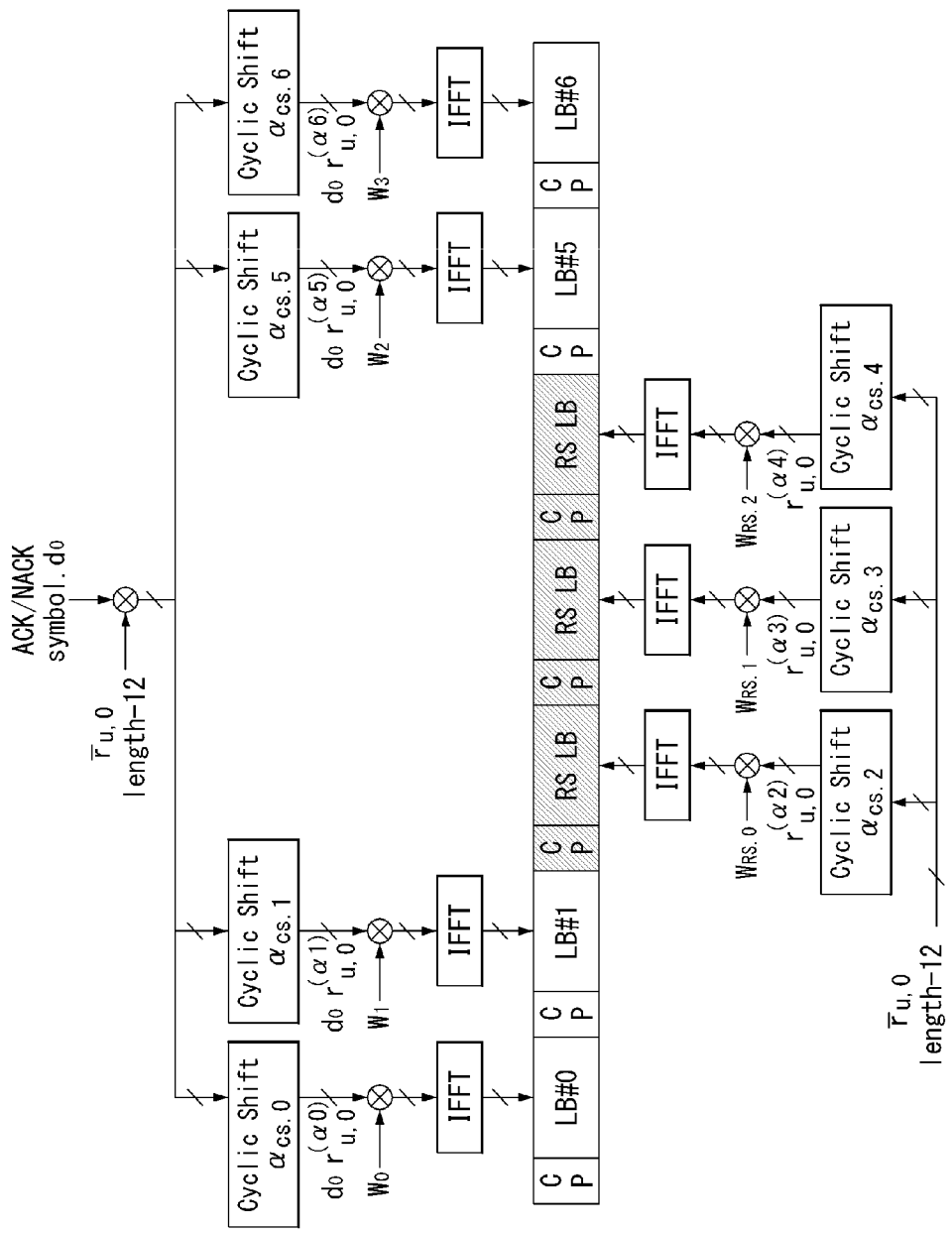
FIG. 7 illustrates a structure of ACK/NACK channel in the case of normal CP in a wireless communication system to which the present invention may be applied.

FIG. 7 illustrates a structure of an ACK/NACK channel in the case of a general CP in the wireless communication system to which the present invention can be applied.

In FIG. 7, a PUCCH channel structure for transmitting the HARQ ACK/NACK without the CQI is exemplarily illustrated.

The reference signal (DMRS) is loaded on three consecutive SC-FDMA symbols in a middle part among 7 SC-FDMA symbols and the ACK/NACK signal is loaded on 4 residual SC-FDMA symbols.

Meanwhile, in the case of the extended CP, the RS may be loaded on two consecutive symbols in the middle part. The number of and the positions of symbols used in the RS may vary depending on the control channel and the numbers and the positions of symbols used in the ACK/NACK signal associated with the positions of symbols used in the RS may also correspondingly vary depending on the control channel.

Acknowledgment response information (not scrambled status) of 1 bit and 2 bits may be expressed as one HARQ ACK/NACK modulated symbol by using the BPSK and QPSK modulation techniques, respectively. A positive acknowledgement response (ACK) may be encoded as '1' and a negative acknowledgment response (NACK) may be encoded as '0'.

When a control signal is transmitted in an allocated band, 2-dimensional (D) spread is adopted in order to increase a multiplexing capacity. That is, frequency domain spread and time domain spread are simultaneously adopted in order to increase the number of terminals or control channels which may be multiplexed.

A frequency domain sequence is used as the base sequence in order to spread the ACK/NACK signal in the frequency domain. A Zadoff-Chu (ZC) sequence which is one of the CAZAC sequences may be used as the frequency domain sequence. For example, different CSs are applied to the ZC sequence which is the base sequence, and as a result, multiplexing different terminals or different control channels may be applied. The number of CS resources supported in an SC-FDMA symbol for PUCCH RBs for HARQ ACK/NACK transmission is set by a cell-specific upper-layer signaling parameter ($\Delta_{shift}^{PUCCH}$).

The ACK/NACK signal which is frequency-domain spread is spread in the time domain by using an orthogonal spreading code. As the orthogonal spreading code, a Walsh-Hadamard sequence or DFT sequence may be used. For example, the ACK/NACK signal may be spread by using an orthogonal sequence (w0, w1, w2, and w3) having the length of 4 with respect to 4 symbols. Further, the RS is also spread through an orthogonal sequence having the length of 3 or 2. This is referred to as orthogonal covering (OC).

Multiple terminals may be multiplexed by a code division multiplexing (CDM) scheme by using the CS resources in the frequency domain and the OC resources in the time domain described above. That is, ACK/NACK information and RSs of a lot of terminals may be multiplexed on the same PUCCH RB.

In respect to the time-domain spread CDM, the number of spreading codes supported with respect to the ACK/NACK information is limited by the number of RS symbols. That is, since the number of RS transmitting SC-FDMA symbols is smaller than that of ACK/NACK information transmitting SC-FDMA symbols, the multiplexing capacity of the RS is smaller than that of the ACK/NACK information.

For example, in the case of the general CP, the ACK/NACK information may be transmitted in four symbols and not 4 but 3 orthogonal spreading codes are used for the ACK/NACK information and the reason is that the number of RS transmitting symbols is limited to 3 to use only 3 orthogonal spreading codes for the RS.

In the case of the subframe of the general CP, when 3 symbols are used for transmitting the RS and 4 symbols are used for transmitting the ACK/NACK information in one slot, for example, if 6 CSs in the frequency domain and 3 orthogonal cover (OC) resources may be used, HARQ acknowledgement responses from a total of 18 different terminals may be multiplexed in one PUCCH RB. In the case of the subframe of the extended CP, when 2 symbols are used for transmitting the RS and 4 symbols are used for transmitting the ACK/NACK information in one slot, for example, if 6 CSs in the frequency domain and 2 orthogonal cover (OC) resources may be used, the HARQ acknowledgement responses from a total of 12 different terminals may be multiplexed in one PUCCH RB.

Next, PUCCH format 1 is described. The scheduling request (SR) is transmitted by a scheme in which the terminal requests scheduling or does not request the scheduling. An SR channel reuses an ACK/NACK channel structure in PUCCH format 1a/1b and is configured by an on-off keying (OOK) scheme based on an ACK/NACK channel design. In the SR channel, the reference signal is not transmitted. Therefore, in the case of the general CP, a sequence having a length of 7 is used and in the case of the extended CP, a sequence having a length of 6 is used. Different cyclic shifts (CSs) or orthogonal covers (OCs) may be allocated to the SR and the ACK/NACK. That is, the terminal transmits the HARQ ACK/NACK through a resource allocated for the SR in order to transmit a positive SR. The terminal transmits the HARQ ACK/NACK through a resource allocated for the ACK/NACK in order to transmit a negative SR.

Next, an enhanced-PUCCH (e-PUCCH) format is described. An e-PUCCH may correspond to PUCCH format 3 of an LTE-A system. A block spreading technique may be applied to ACK/NACK transmission using PUCCH format 3.

Figure 8:
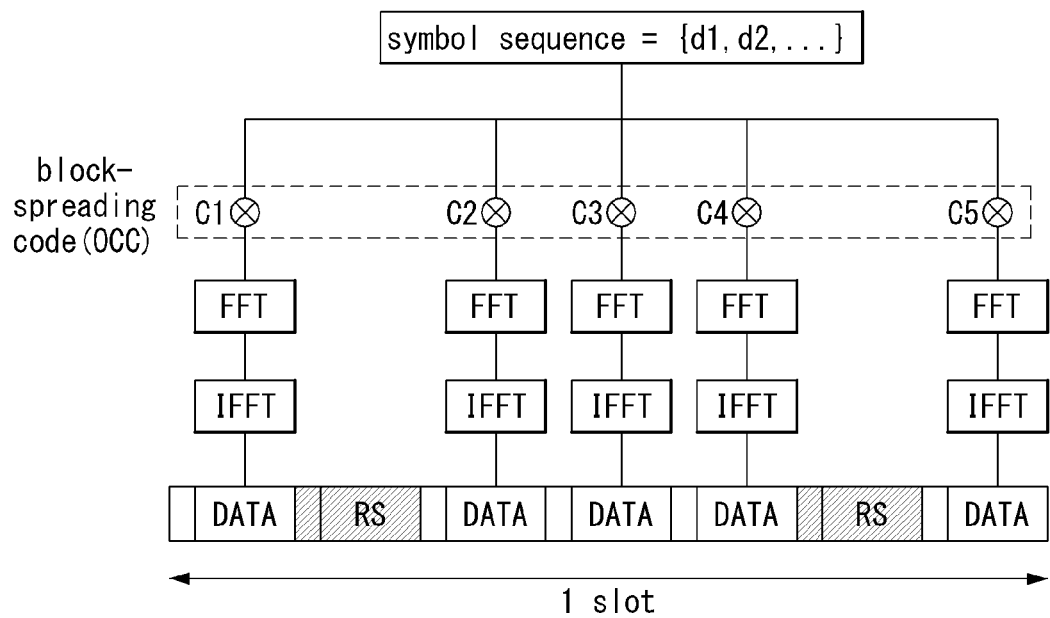
FIG. 8 illustrates an example of generating and transmitting five SC-FDMA symbols during a slot in a wireless communication system to which the present invention may be applied.

The block spreading technique is a scheme that modulates transmission of the control signal by using the SC-FDMA scheme unlike the existing PUCCH format 1 series or 2 series. As illustrated in FIG. 8, a symbol sequence may be spread and transmitted on the time domain by using an orthogonal cover code (OCC). The control signals of the plurality of terminals may be multiplexed on the same RB by using the OCC. In the case of PUCCH format 2 described above, one symbol sequence is transmitted throughout the time domain and the control signals of the plurality of terminals are multiplexed by using the cyclic shift (CS) of the CAZAC sequence, while in the case of a block spreading based on PUCCH format (for example, PUCCH format 3), one symbol sequence is transmitted throughout the frequency domain and the control signals of the plurality of terminals are multiplexed by using the time domain spreading using the OCC.

FIG. 8 illustrates one example of generating and transmitting 5 SC-FDMA symbols during one slot in the wireless communication system to which the present invention can be applied.

In FIG. 8, an example of generating and transmitting 5 SC-FDMA symbols (that is, data part) by using an OCC having the length of 5 (alternatively, SF=5) in one symbol sequence during one slot. In this case, two RS symbols may be used during one slot.

In the example of FIG. 8, the RS symbol may be generated from a CAZAC sequence to which a specific cyclic shift value is applied and transmitted in a type in which a predetermined OCC is applied (alternatively, multiplied) throughout a plurality of RS symbols. Further, in the example of FIG. 8, when it is assumed that 12 modulated symbols are used for each OFDM symbol (alternatively, SC-FDMA symbol) and the respective modulated symbols are generated by QPSK, the maximum bit number which may be transmitted in one slot becomes 24 bits (=12×2). Accordingly, the bit number which is transmittable by two slots becomes a total of 48 bits. When a PUCCH channel structure of the block spreading scheme is used, control information having an extended size may be transmitted as compared with the existing PUCCH format 1 series and 2 series.

General Carrier Aggregation

A communication environment considered in embodiments of the present invention includes multi-carrier supporting environments. That is, a multi-carrier system or a carrier aggregation system used in the present invention means a system that aggregates and uses one or more component carriers (CCs) having a smaller bandwidth smaller than a target band at the time of configuring a target wideband in order to support a wideband.

In the present invention, multi-carriers mean aggregation of (alternatively, carrier aggregation) of carriers and in this case, the aggregation of the carriers means both aggregation between continuous carriers and aggregation between non-contiguous carriers. Further, the number of component carriers aggregated between the downlink and the uplink may be differently set. A case in which the number of downlink component carriers (hereinafter, referred to as 'DL CC') and the number of uplink component carriers (hereinafter, referred to as 'UL CC') are the same as each other is referred to as symmetric aggregation and a case in which the number of downlink component carriers and the number of uplink component carriers are different from each other is referred to as asymmetric aggregation. The carrier aggregation may be used mixedly with a term such as the carrier aggregation, the bandwidth aggregation, spectrum aggregation, or the like.

The carrier aggregation configured by combining two or more component carriers aims at supporting up to a bandwidth of 100 MHz in the LTE-A system. When one or more carriers having the bandwidth than the target band are combined, the bandwidth of the carriers to be combined may be limited to a bandwidth used in the existing system in order to maintain backward compatibility with the existing IMT system. For example, the existing 3GPP LTE system supports bandwidths of 1.4, 3, 5, 10, 15, and 20 MHz and a 3GPP LTE-advanced system (that is, LTE-A) may be configured to support a bandwidth larger than 20 MHz by using on the bandwidth for compatibility with the existing system. Further, the carrier aggregation system used in the preset invention may be configured to support the carrier aggregation by defining a new bandwidth regardless of the bandwidth used in the existing system.

The LTE-A system uses a concept of the cell in order to manage a radio resource.

The carrier aggregation environment may be called a multi-cell environment. The cell is defined as a combination of a pair of a downlink resource (DL CC) and an uplink resource (UL CC), but the uplink resource is not required. Therefore, the cell may be constituted by only the downlink resource or both the downlink resource and the uplink resource. When a specific terminal has only one configured serving cell, the cell may have one DL CC and one UL CC, but when the specific terminal has two or more configured serving cells, the cell has DL CCs as many as the cells and the number of UL CCs may be equal to or smaller than the number of DL CCs.

Alternatively, contrary to this, the DL CC and the UL CC may be configured. That is, when the specific terminal has multiple configured serving cells, a carrier aggregation environment having UL CCs more than DL CCs may also be supported. That is, the carrier aggregation may be appreciated as aggregation of two or more cells having different carrier frequencies (center frequencies). Herein, the described 'cell' needs to be distinguished from a cell as an area covered by the base station which is generally used.

The cell used in the LTE-A system includes a primary cell (PCell) and a secondary cell (SCell). The P cell and the S cell may be used as the serving cell. In a terminal which is in an RRC_CONNECTED state, but does not have the configured carrier aggregation or does not support the carrier aggregation, only one serving constituted by only the P cell is present. On the contrary, in a terminal which is in the RRC_CONNECTED state and has the configured carrier aggregation, one or more serving cells may be present and the P cell and one or more S cells are included in all serving cells.

The serving cell (P cell and S cell) may be configured through an RRC parameter. PhysCellId as a physical layer identifier of the cell has integer values of 0 to 503. SCellIndex as a short identifier used to identify the S cell has integer values of 1 to 7. ServCellIndex as a short identifier used to identify the serving cell (P cell or S cell) has the integer values of 0 to 7. The value of 0 is applied to the P cell and SCellIndex is previously granted for application to the S cell. That is, a cell having a smallest cell ID (alternatively, cell index) in ServCellIndex becomes the P cell.

The P cell means a cell that operates on a primary frequency (alternatively, primary CC). The terminal may be used to perform an initial connection establishment process or a connection re-establishment process and may be designated as a cell indicated during a handover process. Further, the P cell means a cell which becomes the center of control associated communication among serving cells configured in the carrier aggregation environment. That is, the terminal may be allocated with and transmit the PUCCH only in the P cell thereof and use only the P cell to acquire the system information or change a monitoring procedure.

An evolved universal terrestrial radio access (E-UTRAN) may change only the P cell for the handover procedure to the terminal supporting the carrier aggregation environment by using an RRC connection reconfiguration message (RRC-ConnectionReconfigutaion) message of an upper layer including mobile control information (mobilityControlInfo).

The S cell means a cell that operates on a secondary frequency (alternatively, secondary CC). Only one P cell may be allocated to a specific terminal and one or more S cells may be allocated to the specific terminal. The S cell may be configured after RRC connection establishment is achieved and used for providing an additional radio resource. The PUCCH is not present in residual cells other than the P cell, that is, the S cells among the serving cells configured in the carrier aggregation environment. The E-UTRAN may provide all system information associated with a related cell which is in an RRC_CONNECTED state through a dedicated signal at the time of adding the S cells to the terminal that supports the carrier aggregation environment. A change of the system information may be controlled by releasing and adding the related S cell and in this case, the RRC connection reconfiguration (RRCConnectionReconfigutaion) message of the upper layer may be used. The E-UTRAN may perform having different parameters for each terminal rather than broadcasting in the related S cell.

After an initial security activation process starts, the E-UTRAN adds the S cells to the P cell initially configured during the connection establishment process to configure a network including one or more S cells. In the carrier aggregation environment, the P cell and the S cell may operate as the respective component carriers. In an embodiment described below, the primary component carrier (PCC) may be used as the same meaning as the P cell and the secondary component carrier (SCC) may be used as the same meaning as the S cell.

Figure 9:
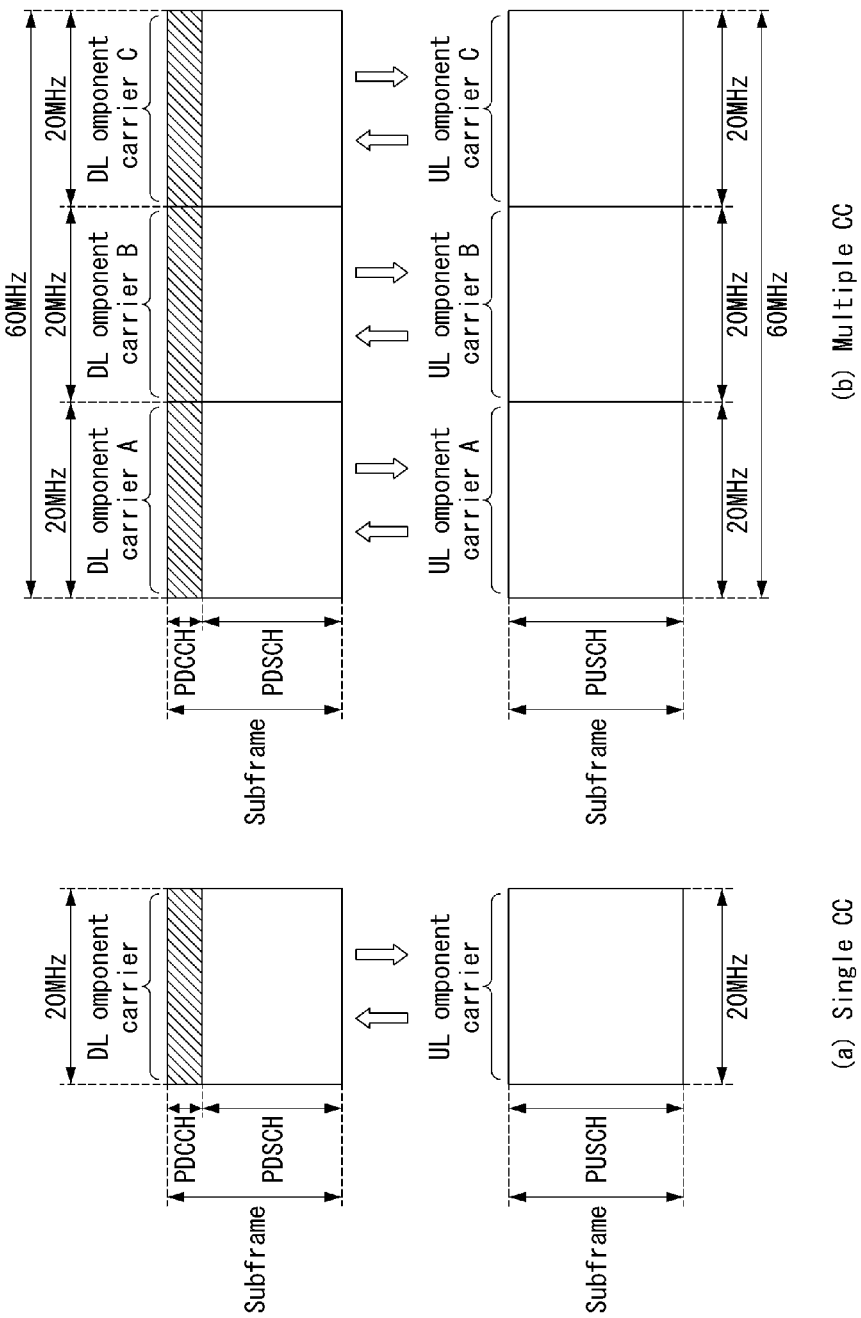
FIG. 9 illustrates an example of component carrier and carrier aggregation in a wireless communication system to which the present invention may be applied.

FIG. 9 illustrates examples of a component carrier and carrier aggregation in the wireless communication system to which the present invention can be applied.

FIG. 9(a) illustrates a single carrier structure used in an LTE system. The component carrier includes the DL CC and the UL CC. One component carrier may have a frequency range of 20 MHz.

FIG. 9(b) illustrates a carrier aggregation structure used in the LTE system. In the case of FIG. 9(b), a case is illustrated, in which three component carriers having a frequency magnitude of 20 MHz are combined. Each of three DL CCs and three UL CCs is provided, but the number of DL CCs and the number of UL CCs are not limited. In the case of carrier aggregation, the terminal may simultaneously monitor three CCs, and receive downlink signal/data and transmit uplink signal/data.

When N DL CCs are managed in a specific cell, the network may allocate M (M≤N) DL CCs to the terminal. In this case, the terminal may monitor only M limited DL CCs and receive the DL signal. Further, the network gives L (L≤M≤N) DL CCs to allocate a primary DL CC to the terminal and in this case, UE needs to particularly monitor L DL CCs. Such a scheme may be similarly applied even to uplink transmission.

A linkage between a carrier frequency (alternatively, DL CC) of the downlink resource and a carrier frequency (alternatively, UL CC) of the uplink resource may be indicated by an upper-layer message such as the RRC message or the system information. For example, a combination of the DL resource and the UL resource may be configured by a linkage defined by system information block type 2 (SIB2). In detail, the linkage may mean a mapping relationship between the DL CC in which the PDCCH transporting a UL grant and a UL CC using the UL grant and mean a mapping relationship between the DL CC (alternatively, UL CC) in which data for the HARQ is transmitted and the UL CC (alternatively, DL CC) in which the HARQ ACK/NACK signal is transmitted.

Cross Carrier Scheduling

In the carrier aggregation system, in terms of scheduling for the carrier or the serving cell, two types of a self-scheduling method and a cross carrier scheduling method are provided. The cross carrier scheduling may be called cross component carrier scheduling or cross cell scheduling.

The cross carrier scheduling means transmitting the PDCCH (DL grant) and the PDSCH to different respective DL CCs or transmitting the PUSCH transmitted according to the PDCCH (UL grant) transmitted in the DL CC through other UL CC other than a UL CC linked with the DL CC receiving the UL grant.

Whether to perform the cross carrier scheduling may be UE-specifically activated or deactivated and semi-statically known for each terminal through the upper-layer signaling (for example, RRC signaling).

When the cross carrier scheduling is activated, a carrier indicator field (CIF) indicating through which DL/UL CC the PDSCH/PUSCH the PDSCH/PUSCH indicated by the corresponding PDCCH is transmitted is required. For example, the PDCCH may allocate the PDSCH resource or the PUSCH resource to one of multiple component carriers by using the CIF. That is, the CIF is set when the PDSCH or PUSCH resource is allocated to one of DL/UL CCs in which the PDCCH on the DL CC is multiply aggregated. In this case, a DCI format of LTE-A Release-8 may extend according to the CIF. In this case, the set CIF may be fixed to a 3-bit field and the position of the set CIF may be fixed regardless of the size of the DCI format. Further, a PDCCH structure (the same coding and the same CCE based resource mapping) of the LTE-A Release-8 may be reused.

On the contrary, when the PDCCH on the DL CC allocates the PDSCH resource on the same DL CC or allocates the PUSCH resource on a UL CC which is singly linked, the CIF is not set. In this case, the same PDCCH structure (the same coding and the same CCE based resource mapping) and DCI format as the LTE-A Release-8 may be used.

When the cross carrier scheduling is possible, the terminal needs to monitor PDCCHs for a plurality of DCIs in a control region of a monitoring CC according to a transmission mode and/or a bandwidth for each CC. Therefore, a configuration and PDCCH monitoring of a search space which may support monitoring the PDCCHs for the plurality of DCIs are required.

In the carrier aggregation system, a terminal DL CC aggregate represents an aggregate of DL CCs in which the terminal is scheduled to receive the PDSCH and a terminal UL CC aggregate represents an aggregate of UL CCs in which the terminal is scheduled to transmit the PUSCH. Further, a PDCCH monitoring set represents a set of one or more DL CCs that perform the PDCCH monitoring. The PDCCH monitoring set may be the same as the terminal DL CC set or a subset of the terminal DL CC set. The PDCCH monitoring set may include at least any one of DL CCs in the terminal DL CC set. Alternatively, the PDCCH monitoring set may be defined separately regardless of the terminal DL CC set. The DL CCs included in the PDCCH monitoring set may be configured in such a manner that self-scheduling for the linked UL CC is continuously available. The terminal DL CC set, the terminal UL CC set, and the PDCCH monitoring set may be configured UE-specifically, UE group-specifically, or cell-specifically.

When the cross carrier scheduling is deactivated, the deactivation of the cross carrier scheduling means that the PDCCH monitoring set continuously means the terminal DL CC set and in this case, an indication such as separate signaling for the PDCCH monitoring set is not required. However, when the cross carrier scheduling is activated, the PDCCH monitoring set is preferably defined in the terminal DL CC set. That is, the base station transmits the PDCCH through only the PDCCH monitoring set in order to schedule the PDSCH or PUSCH for the terminal.

Figure 10:
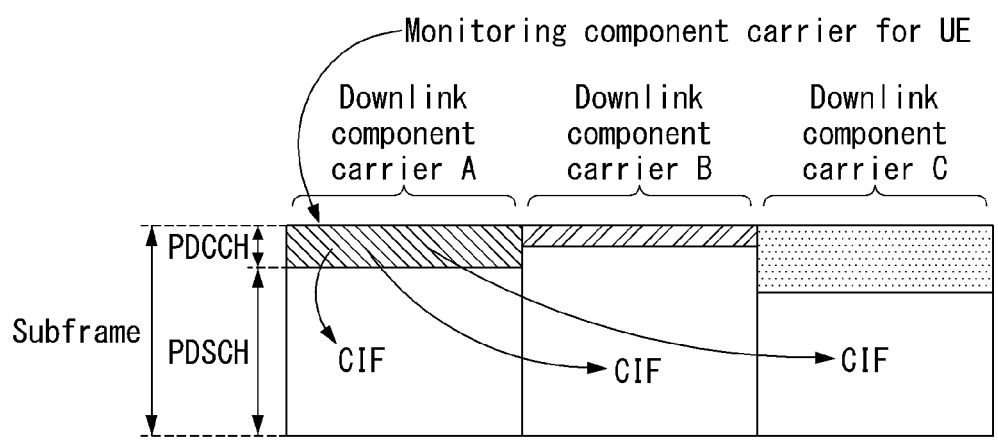
FIG. 10 illustrates an example of subframe structure according to cross carrier scheduling in a wireless communication system to which the present invention may be applied.

FIG. 10 illustrates one example of a subframe structure depending on cross carrier scheduling in the wireless communication system to which the present invention can be applied.

Referring to FIG. 10, a case is illustrated, in which three DL CCs are associated with a DL subframe for an LTE-A terminal and DL CC 'A' is configured as a PDCCH monitoring DL CC. When the CIF is not used, each DL CC may transmit the PDCCH scheduling the PDSCH thereof without the CIF. On the contrary, when the CIF is used through the upper-layer signaling, only one DL CC 'A' may transmit the PDCCH scheduling the PDSCH thereof or the PDSCH of another CC by using the CIF. In this case, DL CC 'B' and 'C' in which the PDCCH monitoring DL CC is not configured does not transmit the PDCCH.

ACK/NACK Multiplexing Method

In a situation in which the terminal simultaneously needs to transmit multiple ACKs/NACKs corresponding to multiple data units received from an eNB, an ACK/NACK multiplexing method based on PUCCH resource selection may be considered in order to maintain a single-frequency characteristic of the ACK/NACK signal and reduce ACK/NACK transmission power.

Together with ACK/NACK multiplexing, contents of ACK/NACK responses for multiple data units may be identified by combining a PUCCH resource and a resource of QPSK modulation symbols used for actual ACK/NACK transmission.

For example, when one PUCCH resource may transmit 4 bits and four data units may be maximally transmitted, an ACK/NACK result may be identified in the eNB as shown in Table 3 given below.

TABLE 3

| HARQ-ACK(0), HARQ-ACK(1), HARQ-ACK(2), HARQ-ACK(3) | $n_{PUCCH}^{(1)}$ | b(0), b(1) |
|---|---|---|
| ACK, ACK, ACK, ACK | $n_{PUCCH,1}^{(1)}$ | 1, 1 |
| ACK, ACK, ACK, NACK/DTX | $n_{PUCCH,1}^{(1)}$ | 1, 0 |
| NACK/DTX, NACK/DTX, NACK, DTX | $n_{PUCCH,2}^{(1)}$ | 1, 1 |
| ACK, ACK, NACK/DTX, ACK | $n_{PUCCH,1}^{(1)}$ | 1, 0 |
| NACK, DTX, DTX, DTX | $n_{PUCCH,0}^{(1)}$ | 1, 0 |
| ACK, ACK, NACK/DTX, NACK/DTX | $n_{PUCCH,1}^{(1)}$ | 1, 0 |
| ACK, NACK/DTX, ACK, ACK | $n_{PUCCH,3}^{(1)}$ | 0, 1 |
| NACK/DTX, NACK/DTX, NACK/DTX, NACK | $n_{PUCCH,3}^{(1)}$ | 1, 1 |
| ACK, NACK/DTX, ACK, NACK/DTX | $n_{PUCCH,2}^{(1)}$ | 0, 1 |
| ACK, NACK/DTX, NACK/DTX, ACK | $n_{PUCCH,0}^{(1)}$ | 0, 1 |
| ACK NACK/DTX, NACK/DTX, NACK/DTX | $n_{PUCCH,0}^{(1)}$ | 1, 1 |
| NACK/DTX, ACK, ACK, ACK | $n_{PUCCH,3}^{(1)}$ | 0, 1 |
| NACK/DTX, NACK, DTX, DTX | $n_{PUCCH,1}^{(1)}$ | 0, 0 |
| NACK/DTX, ACK, ACK, NACK/DTX | $n_{PUCCH,2}^{(1)}$ | 1, 0 |
| NACK/DTX, ACK, NACK/DTX, ACK | $n_{PUCCH,3}^{(1)}$ | 1, 0 |
| NACK/DTX, ACK, NACK/DTX, NACK/DTX | $n_{PUCCH,1}^{(1)}$ | 0, 1 |
| NACK/DTX, NACK/DTX, ACK, ACK | $n_{PUCCH,3}^{(1)}$ | 0, 1 |
| NACK/DTX, NACK/DTX, ACK, NACK/DTX | $n_{PUCCH,2}^{(1)}$ | 0, 0 |
| NACK/DTX, NACK/DTX, NACK/DTX, ACK | $n_{PUCCH,3}^{(1)}$ | 0, 0 |
| DTX, DTX, DTX, DTX | N/A | N/A |

In Table 3 given above, HARQ-ACK(i) represents an ACK/NACK result for an i-th data unit. In Table 3 given above, discontinuous transmission (DTX) means that there is no data unit to be transmitted for the corresponding HARQ-ACK(i) or that the terminal may not detect the data unit corresponding to the HARQ-ACK(i).

According to Table 3 given above, a maximum of four PUCCH resources ($n_{PUCCH,0}^{(1)}$, $n_{PUCCH,1}^{(1)}$, $n_{PUCCH,2}^{(1)}$, and $n_{PUCCH,3}^{(1)}$) are provided and b(0) and b(1) are two bits transmitted by using a selected PUCCH.

For example, when the terminal successfully receives all of four data units, the terminal transmits 2 bits (1,1) by using $n_{PUCCH,1}^{(1)}$.

When the terminal fails to decoding in first and third data units and succeeds in decoding in second and fourth data units, the terminal transmits bits (1,0) by using $n_{PUCCH,3}^{(1)}$.

In ACK/NACK channel selection, when there is at least one ACK, the NACK and the DTX are coupled with each other. The reason is that a combination of the PUCCH resource and the QPSK symbol may not all ACK/NACK states. However, when there is no ACK, the DTX is decoupled from the NACK.

In this case, the PUCCH resource linked to the data unit corresponding to one definite NACK may also be reserved to transmit signals of multiple ACKs/NACKs.

Semi-Persistent Scheduling

Semi-persistent scheduling (SPS) is a scheduling scheme that allocates the resource to the terminal to be persistently maintained during a specific time interval.

When a predetermined amount of data is transmitted for a specific time like a voice over Internet protocol (VoIP), since the control information need not be transmitted every data transmission interval for the resource allocation, the waste of the control information may be reduced by using the SPS scheme. In a so-called semi-persistent scheduling (SPS) method, a time resource domain in which the resource may be allocated to the terminal is preferentially allocated.

In this case, in a semi-persistent allocation method, a time resource domain allocated to a specific terminal may be configured to have periodicity. Then, a frequency resource domain is allocated as necessary to complete allocation of the time-frequency resource. Allocating the frequency resource domain may be designated as so-called activation. When the semi-persistent allocation method is used, since the resource allocation is maintained during a predetermined period by one-time signaling, the resource need not be repeatedly allocated, and as a result, signaling overhead may be reduced.

Thereafter, since the resource allocation to the terminal is not required, signaling for releasing the frequency resource allocation may be transmitted from the base station to the terminal. Releasing the allocation of the frequency resource domain may be designated as deactivation.

In current LTE, in which subframes the SPS is first transmitted/received through radio resource control (RRC) signaling for the SPS for the uplink and/or downlink is announced to the terminal. That is, the time resource is preferentially designated among the time and frequency resources allocated for the SPS through the RRC signaling. In order to announce a usable subframe, for example, a period and an offset of the subframe may be announced.

However, since the terminal is allocated with only the time resource domain through the RRC signaling, even though the terminal receives the RRC signaling, the terminal does not immediately perform transmission and reception by the SPS and the terminal allocates the frequency resource domain as necessary to complete the allocation of the time-frequency resource. Allocating the frequency resource domain may be designated as deactivation and releasing the allocation of the frequency resource domain may be designated as deactivation.

Therefore, the terminal receives the PDCCH indicating the activation and thereafter, allocate the frequency resource according to RB allocation information included in the received PDCCH and applies modulation and code rate depending on modulation and coding scheme (MCS) information to start transmission and reception according to the period and the offset of the subframe allocated through the RRC signaling.

Next, when the terminal receives the PDCCH announcing the deactivation from the base station, the terminal stops transmission and reception. When the terminal receives the PDCCH indicating the activation or reactivation after stopping the transmission and reception, the terminal resumes the transmission and reception again with the period and the offset of the subframe allocated through the RRC signaling by using the RC allocation, the MCS, and the like designated by the PDCCH. That is, the time resource is performed through the RRC signaling, but the signal may be actually transmitted and received after receiving the PDCCH indicating the activation and reactivation of the SPS and the signal transmission and reception stop after receiving the PDCCH indicating the deactivation of the SPS.

When all conditions described below are satisfied, the terminal may validate a PDCCH including an SPS indication. First, a CRC parity bit added for a PDCCH payload needs to be scrambled with an SPS C-RNTI and second, a new data indicator (NDI) field needs to be set to 0. Herein, in the case of DCI formats 2, 2A, 2B, and 2C, the new data indicator field indicates one activated transmission block.

In addition, when each field used in the DCI format is set according to Tables 4 and 5 given below, the validation is completed. When the validation is completed, the terminal recognizes that received DCI information is valid SPS activation or deactivation (alternatively, release). On the contrary, when the validation is not completed, the terminal recognizes that a non-matching CRC is included in the received DCI format.

Table 4 shows a field for validating the PDCCH indicating the SPS activation.

TABLE 4

|  | DCI format 0 | DCI format 1/1A | DCI format 2/2A/2B |
|---|---|---|---|
| TPC command for scheduled PUSCH | set to '00' | N/A | N/A |
| Cyclic shift DM RS | set to '000' | N/A | N/A |
| Modulation and coding scheme and redundancy version | MSB is set to '0' | N/A | N/A |
| HARQ process number | N/A | FDD: set to '000' TDD: set to '0000' | FDD: set to '000' TDD: set to '0000' |
| Modulation and coding scheme | N/A | MSB is set to '0' | For the enabled transport block: MSB is set to '0' |

TABLE 4-continued

|  | DCI format 0 | DCI format 1/1A | DCI format 2/2A/2B |
|---|---|---|---|
| Redundancy version | N/A | set to '00' | For the enabled transport block: set to '00' |

Table 5 shows a field for validating the PDCCH indicating the SPS deactivation (alternatively, release).

TABLE 5

|  | DCI format 0 | DCI format 1A |
|---|---|---|
| TPC command for scheduled PUSCH | set to '00' | N/A |
| Cyclic shift DM RS | set to '000' | N/A |
| Modulation and coding scheme and redundancy version | set to '11111' | N/A |
| Resource block assignment and hopping resource allocation | Set to all '1's | N/A |
| HARQ process number | N/A | FDD: set to '000' TDD: set to '0000' |
| Modulation and coding scheme | N/A | set to '11111' |
| Redundancy version | N/A | set to '00' |
| Resource block assignment | N/A | Set to all '1's |

When the DCI format indicates SPS downlink scheduling activation, a TPC command value for the PUCCH field may be used as indexes indicating four PUCCH resource values set by the upper layer.

PUCCH Piggybacking

Figure 11:
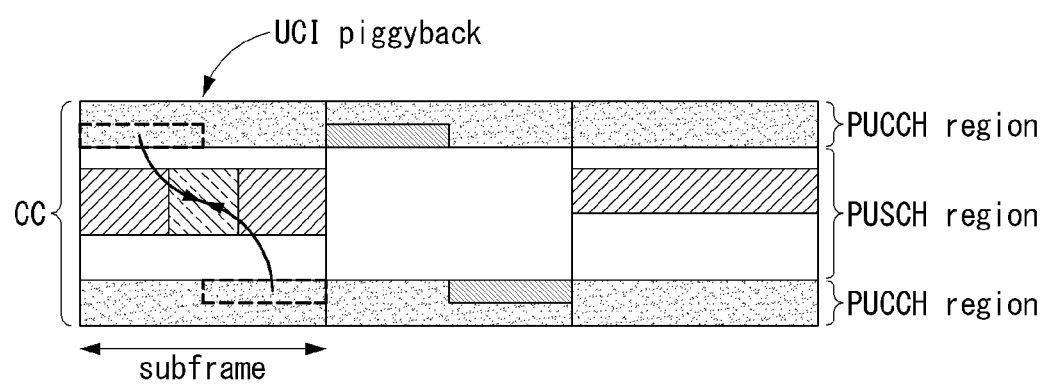
FIG. 11 illustrates an example of transmission channel processing of UL-SCH in a wireless communication system to which the present invention may be applied.

FIG. 11 illustrates one example of transport channel processing of a UL-SCH in the wireless communication system to which the present invention can be applied.

In a 3GPP LTE system (=E-UTRA, Rel. 8), in the case of the UL, single carrier transmission having an excellent peak-to-average power ratio (PAPR) or cubic metric (CM) characteristic which influences the performance of a power amplifier is maintained for efficient utilization of the power amplifier of the terminal. That is, in the case of transmitting the PUSCH of the existing LTE system, data to be transmitted may maintain the single carrier characteristic through DFT-precoding and in the case of transmitting the PUCCH, information is transmitted while being loaded on a sequence having the single carrier characteristic to maintain the single carrier characteristic. However, when the data to be DFT-precoded is non-contiguously allocated to a frequency axis or the PUSCH and the PUCCH are simultaneously transmitted, the single carrier characteristic deteriorates. Therefore, when the PUSCH is transmitted in the same subframe as the transmission of the PUCCH as illustrated in FIG. 11, uplink control information (UCI) to be transmitted to the PUCCH is transmitted (piggyback) together with data through the PUSCH.

Since the PUCCH and the PUSCH may not be simultaneously transmitted as described above, the existing LTE terminal uses a method that multiplexes uplink control information (UCI) (CQI/PMI, HARQ-ACK, RI, and the like) to the PUSCH region in a subframe in which the PUSCH is transmitted.

As one example, when the channel quality indicator (CQI) and/or precoding matrix indicator (PMI) needs to be transmitted in a subframe allocated to transmit the PUSCH, UL-SCH data and the CQI/PMI are multiplexed after DFT-spreading to transmit both control information and data. In this case, the UL-SCH data is rate-matched by considering a CQI/PMI resource. Further, a scheme is used, in which the control information such as the HARQ ACK, the RI, and the like punctures the UL-SCH data to be multiplexed to the PUSCH region.

Figure 12:
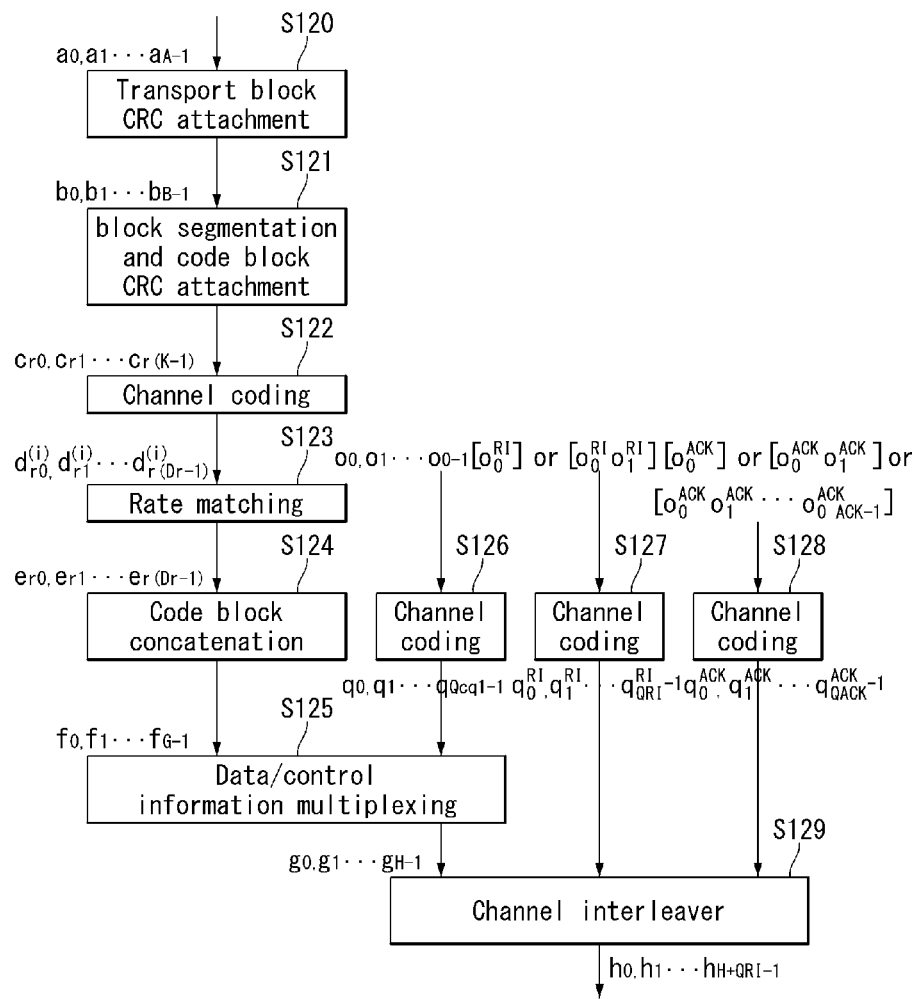
FIG. 12 illustrates an example of signal processing process of uplink shared channel which is a transport channel in a wireless communication system to which the present invention may be applied.

FIG. 12 illustrates one example of a signal processing process of an uplink share channel of a transport channel in the wireless communication system to which the present invention can be applied.

Herein, the signal processing process of the uplink share channel (hereinafter, referred to as "UL-SCH") may be applied to one or more transport channels or control information types.

Referring to FIG. 12, the UL-SCH transfers data to a coding unit in the form of a transport block (TB) once every transmission time interval (TTI).

A CRC parity bit $p_0, p_1, p_2, p_3, \ldots, p_{L-1}$ is attached to a bit of the transport block received from the upper layer (S1202). In this case, A represents the size of the transport block and L represents the number of parity bits. Input bits to which the CRC is attached are shown in $b_0, b_1, b_2, b_3, \ldots, b_{B-1}$. In this case, B represents the number of bits of the transport block including the CRC.

$b_0, b_1, b_2, b_3, \ldots, b_{B-1}$ is segmented into multiple code blocks (CBs) according to the size of the TB and the CRC is attached to multiple segmented CBs (S1204). Bits after the code block segmentation and the CRC attachment are shown in $c_{r0}, c_{r1}, c_{r2}, c_{r3}, \ldots, c_{r(K_r-1)}$. Herein, r represents No. (r=0, . . . , C−1) of the code block and Kr represents the bit number depending on the code block r. Further, C represents the total number of code blocks.

Subsequently, channel coding is performed (S1206). Output bits after the channel coding are shown in $d_{r0}^{(i)}, d_{r1}^{(i)}, d_{r2}^{(i)}, d_{r3}^{(i)}, \ldots, d_{r(D_r-1)}^{(i)}$. In this case, i represents an encoded stream index and may have a value of 0, 1, or 2. Dr represents the number of bits of the i-th encoded stream for the code block r. r represents the code block number (r=0, . . . , C−1) and C represents the total number of code blocks. Each code block may be encoded by turbo coding.

Subsequently, rate matching is performed (S1208). Bits after the rate matching are shown in $e_{r0}, e_{r1}, e_{r2}, e_{r3}, \ldots, e_{r(e_r-1)}$. In this case, r represents the code block number (r=0, . . . , C−1) and C represents the total number of code blocks. Er represents the number of rate-matched bits of the r-th code block.

Subsequently, concatenation among the code blocks is performed again (S1210). Bits after the concatenation of the code blocks is performed are shown in $f_0, f_1, f_2, f_3, \ldots, f_{G-1}$. In this case, G represents the total number of bits encoded for transmission and when the control information is multiplexed with the UL-SCH, the number of bits used for transmitting the control information is not included.

Meanwhile, when the control information is transmitted in the PUSCH, channel coding of the CQI/PMI, the RI, and the ACK/NACK which are the control information is independently performed (S1214, S1216, and S1218). Since different encoded symbols are allocated for transmitting each control information, the respective control information has different coding rates.

In time division duplex (TDD), as an ACK/NACK feedback mode, two modes of ACK/NACK bundling and ACK/NACK multiplexing are supported by an upper-layer configuration. ACK/NACK information bits for the ACK/NACK bundling are constituted by 1 bit or 2 bits and ACK/NACK information bits for the ACK/NACK multiplexing are constituted by 1 to 4 bits.

After the concatenation among the code blocks in step S134, encoded bits $f_0, f_1, f_2, f_3, \ldots, f_{G-1}$ of the UL-SCH data and encoded bits $q_0, q_1, q_2, q_3, \ldots, Q$ of the CQI/PMI are multiplexed (S125). A multiplexed result of the data and the CQI/PMI is shown in $g_0, g_1, g_2, g_3, \ldots, g_{H'-1}$. In this case, $g_i$ (i=0, . . . , H'−1) represents a column vector having a length of ($Q_m \cdot N_L$). H=(G+$N_L \cdot Q_{CQI}$) and H'=H/($N_L \cdot Q_m$).

$N_L$ represents the number of layers mapped to a UL-SCH transport block and H represents the total number of encoded bits allocated to $N_L$ transport layers mapped with the transport block for the UL-SCH data and the CQI/PMI information.

Subsequently, the multiplexed data and CQI/PMI, a channel encoded RI, and the ACK/NACK are channel-interleaved to generate an output signal (S1220).

MIMO (Multi-Input Multi-Output)

An MIMO technology uses multiple transmitting (Tx) antennas and multiple receiving (Rx) antennas by breaking from generally one transmitting antenna and one receiving antenna up to now. In other words, the MIMO technology is a technology for achieving capacity increment or capability enhancement by using a multiple input multiple output antenna at a transmitter side or a receiver side of the wireless communication system. Hereinafter, "MIMO" will be referred to as "multiple input multiple output antenna".

In more detail, the MIMO technology does not depend on one antenna path in order to receive one total message and completes total data by collecting a plurality of data pieces received through multiple antennas. Consequently, the MIMO technology may increase a data transfer rate within in a specific system range and further, increase the system range through a specific data transfer rate.

In next-generation mobile communication, since a still higher data transfer rate than the existing mobile communication is required, it is anticipated that an efficient multiple input multiple output technology is particularly required. In such a situation, an MIMO communication technology is a next-generation mobile communication technology which may be widely used in a mobile communication terminal and a relay and attracts a concern as a technology to overcome a limit of a transmission amount of another mobile communication according to a limit situation due to data communication extension, and the like.

Meanwhile, the multiple input multiple output (MIMO) technology among various transmission efficiency improvement technologies which have been researched in recent years as a method that may dramatically improve a communication capacity and transmission and reception performance without additional frequency allocation or power increment has the largest attention in recent years.

Figure 13:
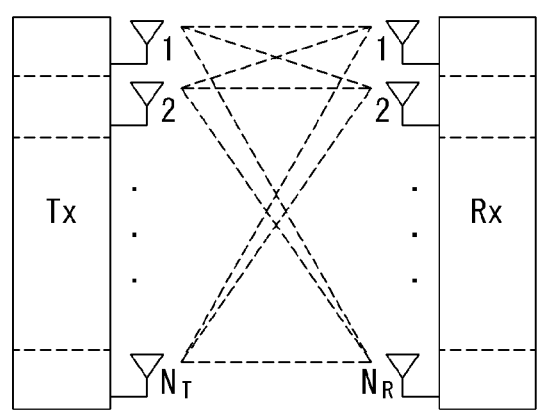
FIG. 13 is a diagram of a general multiple input multiple output (MIMO) antenna communication system.

FIG. 13 is a configuration diagram of a general multiple input multiple output (MIMO) communication system.

Referring to FIG. 13, when the number of transmitting antennas increases to $N_T$ and the number of receiving antennas increases to $N_R$ at the same time, since a theoretical channel transmission capacity increases in proportion to the number of antennas unlike a case using multiple antennas only in a transmitter or a receiver, a transfer rate may be improved and frequency efficiency may be epchally improved. In this case, the transfer rate depending on an increase in channel transmission capacity may theoretically increase to a value acquired by multiplying a maximum transfer rate (Ro) in the case using one antenna by a rate increase rate (Ri) given below.

$$R_i = \min(N_T, N_R) \qquad \text{[Equation 1]}$$

That is, for example, in an MIMO communication system using four transmitting antennas and four receiving antennas, a transfer rate which is four times higher than a single antenna system may be acquired.

Such an MIMO antenna technology may be divided into a spatial diversity scheme increasing transmission reliability by using symbols passing through various channel paths and a spatial multiplexing scheme improving the transfer rate by simultaneously transmitting multiple data symbols by using multiple transmitting antennas. Further, a research into a scheme that intends to appropriately acquire respective advantages by appropriately combining two schemes is also a field which has been researched in recent years.

The respective schemes will be described below in more detail.

First, the spatial diversity scheme includes a space-time block coding series and a space-time Trelis coding series scheme simultaneously using a diversity gain and a coding gain. In general, the Trelis is excellent in bit error rate enhancement performance and code generation degree of freedom, but the space-time block code is simple in operational complexity. In the case of such a spatial diversity gain, an amount corresponding to a multiple ($N_T \times N_R$) of the number ($N_T$) of transmitting antennas and the number ($N_R$) of receiving antennas may be acquired.

Second, the spatial multiplexing technique is a method that transmits different data arrays in the respective transmitting antennas and in this case, mutual interference occurs among data simultaneously transmitted from the transmitter in the receiver. The receiver receives the data after removing the interference by using an appropriate signal processing technique. A noise removing scheme used herein includes a maximum likelihood detection (MLD) receiver, a zero-forcing (ZF) receiver, a minimum mean square error (MMSE) receiver, a diagonal-bell laboratories layered space-time (D-BLAST), a vertical-bell laboratories layered space-time), and the like and in particular, when channel information may be known in the transmitter side, a singular value decomposition (SVD) scheme, and the like may be used.

Third, a technique combining the space diversity and the spatial multiplexing may be provided. When only the spatial diversity gain is acquired, the performance enhancement gain depending on an increase in diversity degree is gradually saturated and when only the spatial multiplexing gain is acquired, the transmission reliability deteriorates in the radio channel. Schemes that acquire both two gains while solving the problem have been researched and the schemes include a space-time block code (Double-STTD), a space-time BICM (STBICM), and the like.

In order to describe a communication method in the MIMO antenna system described above by a more detailed method, when the communication method is mathematically modeled, the mathematical modeling may be shown as below.

First, it is assumed that $N_T$ transmitting antennas and $N_R$ receiving antennas are present as illustrated in FIG. 13.

First, in respect to a transmission signal, when $N_T$ transmitting antennas are provided, since the maximum number of transmittable information is $N_T$, $N_T$ may be expressed as a vector given below.

$$s=[s_1, s_2, \ldots, s_{N_T}]^T \quad \text{[Equation 2]}$$

Meanwhile, transmission power may be different in the respective transmission information $s_T$ and in this case, when the respective transmission power is $P_1, P_2, \ldots, P_{N_T}$, the transmission information of which the transmission power is adjusted may be expressed as a vector given below.

$$\hat{s}=[\hat{s}_1, \hat{s}_2, \ldots, \hat{s}_{N_T}]^T=[P_1 s_1, P_2 s_2, \ldots, P_{N_T} s_{N_T}]^T \quad \text{[Equation 3]}$$

Further, $\hat{s}$ may be expressed as described below as a diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Meanwhile, the information vector $\hat{s}$ of which the transmission power is adjusted is multiplied by a weight matrix W to constitute $N_T$ transmission signals $x_1, x_2, \ldots, x_{N_T}$ which are actually transmitted. Herein, the weight matrix serves to appropriately distribute the transmission information to the respective antennas according to a transmission channel situation, and the like. The transmission signals $x_1, x_2, \ldots, x_{N_T}$ may be expressed as below by using a vector x.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{21} & w_{22} & \ldots & w_{2N_T} \\ \vdots & & \ddots & \\ w_{i1} & w_{i2} & \ldots & w_{iN_T} \\ \vdots & & \ddots & \\ w_{N_T 1} & w_{N_T 2} & \ldots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \quad \text{[Equation 5]}$$

$$W\hat{s} = WPs$$

Herein, $w_{ij}$ represents a weight between the i-th transmitting antenna and j-th transmission information and W represents the weight as the matrix. The matrix W is called a weight matrix or a precoding matrix.

Meanwhile, the transmission signal x described above may be divided into transmission signals in a case using the spatial diversity and a case using the spatial multiplexing.

In the case using the spatial multiplexing, since different signals are multiplexed and sent, all elements of an information vector s have different values, while when the spatial diversity is used, since the same signal is sent through multiple channel paths, all of the elements of the information vector s have the same value.

Of course, a method mixing the spatial multiplexing and the spatial diversity may also be considered. That is, for example, a case may also be considered, which transmits the same signal by using the spatial diversity through three transmitting antennas and different signals are sent by the spatial multiplexing through residual transmitting antennas.

Next, when $N_R$ receiving antennas are provided, received signals $y_1, y_2, \ldots, y_{N_R}$ of the respective antennas are expressed as a vector y as described below.

$$y=[y_1, y_2, \ldots, y_{N_R}]^T \quad \text{[Equation 6]}$$

Meanwhile, in the case of modeling the channel in the MIMO antenna communication system, respective channels may be distinguished according to transmitting and receiving antenna indexes and a channel passing through a receiving antenna i from a transmitting antenna j will be represented as $h_{ij}$. Herein, it is noted that in the case of the order of the index of $h_{ij}$, the receiving antenna index is earlier and the transmitting antenna index is later.

The multiple channels are gathered into one to be expressed even as vector and matrix forms. An example of expression of the vector will be described below.

Figure 14:
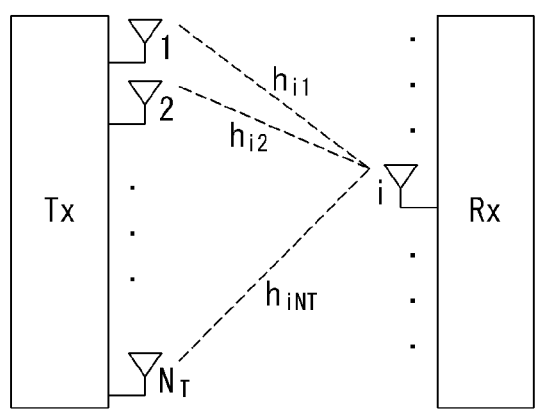
FIG. 14 is a diagram illustrating the channel from multiple transmission antennas to a single reception antenna.

FIG. 14 is a diagram illustrating a channel from multiple transmitting antennas to one receiving antenna.

As illustrated in FIG. 14, a channel which reaches receiving antenna I from a total of $N_T$ transmitting antennas may be expressed as below.

$$h_i^T = [h_{i1}, h_{i2}, \ldots, h_{iN_T}] \quad \text{[Equation 7]}$$

Further, all of channels passing through $N_R$ receiving antennas from $N_T$ transmitting antennas may be shown as below through matrix expression shown in Equation given above.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \quad \text{[Equation 8]}$$

Meanwhile, since additive white Gaussian noise (AWGN) is added after passing through a channel matrix H given above in an actual channel, white noises $n_1, n_2, \ldots, n_{N_R}$ added to $N_R$ receiving antennas, respectively are expressed as below.

$$n = [n_1, n_2, \ldots, n_{N_R}]^T \quad \text{[Equation 9]}$$

Each of the transmission signal, the reception signal, the channel, and the white noise in the MIMO antenna communication system may be expressed through a relationship given below by modeling the transmission signal, the reception signal, the channel, and the white noise.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{[Equation 10]}$$

$$Hx + n$$

The numbers of rows and columns of the channel matrix H representing the state of the channel are determined by the numbers of transmitting and receiving antennas. In the case of the channel matrix H, the number of rows becomes equivalent to $N_R$ which is the number of receiving antennas and the number of columns becomes equivalent to $N_R$ which is the number of transmitting antennas. That is, the channel matrix H becomes an $N_R \times N_R$ matrix.

In general, a matrix rank is defined to the minimum number among the number of independent rows or columns. Therefore, a matrix rank may not be larger than the number of rows or columns. Mathematically, for example, a rank H of a channel matrix H is limited as follows.

$$\text{rank}(H) \leq \min(N_T, N_R) \quad \text{[Equation 11]}$$

Further, when the matrix is subjected to Eigen value decomposition, the rank may be defined as not 0 but the number of Eigen values among the Eigen values. By a similar method, when the rank is subjected to singular value decomposition, the rank may be defined as not 0 but the number of singular values. Accordingly, a physical meaning of the rank in the channel matrix may be the maximum number which may send different information in a given channel.

In the present specification, a 'rank' for MIMO transmission represents the number of paths to independently transmit the signal at a specific time and in a specific frequency resource and 'the number of layers' represents the number of signal streams transmitted through each path. In general, since the transmitter side transmits layers of the number corresponding to the number of ranks used for transmitting the signal, the rank has the same meaning as the number layers if not particularly mentioned.

Reference Signal (RS)

In the wireless communication system, since the data is transmitted through the radio channel, the signal may be distorted during transmission. In order for the receiver side to accurately receive the distorted signal, the distortion of the received signal needs to be corrected by using channel information. In order to detect the channel information, a signal transmitting method know by both the transmitter side and the receiver side and a method for detecting the channel information by using a distortion degree when the signal is transmitted through the channel are primarily used. The aforementioned signal is referred to as a pilot signal or a reference signal (RS).

When the data is transmitted and received by using the MIMO antenna, a channel state between the transmitting antenna and the receiving antenna need to be detected in order to accurately receive the signal. Therefore, the respective transmitting antennas need to have individual reference signals.

The downlink reference signal includes a common RS (CRS) shared by all terminals in one cell and a dedicated RS (DRS) for a specific terminal. Information for demodulation and channel measurement may be provided by using the reference signals.

The receiver side (that is, terminal) measures the channel state from the CRS and feeds back the indicators associated with the channel quality, such as the channel quality indicator (CQI), the precoding matrix index (PMI), and/or the rank indicator (RI) to the transmitting side (that is, base station). The CRS is also referred to as a cell-specific RS. On the contrary, a reference signal associated with a feed-back of channel state information (CSI) may be defined as CSI-RS.

The DRS may be transmitted through resource elements when data demodulation on the PDSCH is required. The terminal may receive whether the DRS is present through the upper layer and is valid only when the corresponding PDSCH is mapped. The DRS may be referred to as the UE-specific RS or the demodulation RS (DMRS).

Figure 15:
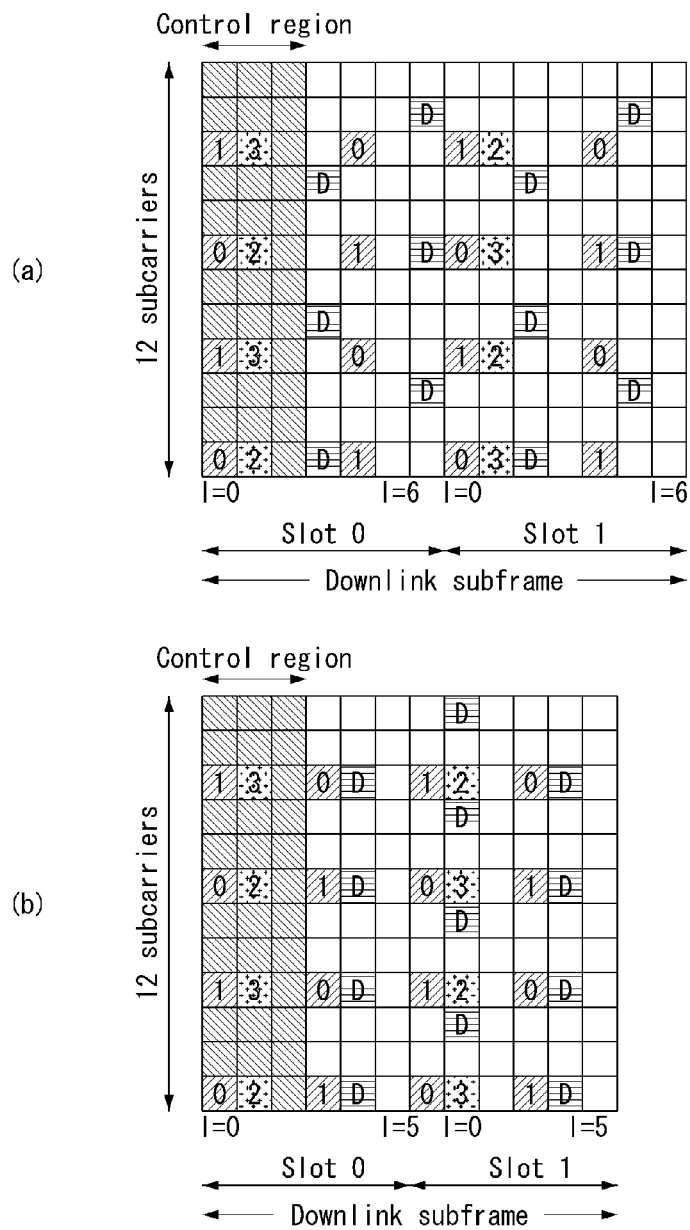
FIG. 15 illustrates a reference signal pattern mapped to a downlink resource block pair in a wireless communication system to which the present invention may be applied.

FIG. 15 illustrates a reference signal pattern mapped to a downlink resource block pair in the wireless communication system to which the present invention can be applied.

Referring to FIG. 15, as a wise in which the reference signal is mapped, the downlink resource block pair may be expressed by one subframe in the time domain×12 subcarriers in the frequency domain. That is, one resource block pair has a length of 14 OFDM symbols in the case of a normal cyclic prefix (CP) (FIG. 15a) and a length of 12 OFDM symbols in the case of an extended cyclic prefix (CP) (FIG. 15b). Resource elements (REs) represented as '0', '1', '2', and '3' in a resource block lattice mean the positions of the CRSs of antenna port indexes '0', '1', '2', and '3', respectively and resource elements represented as 'D' means the position of the DRS.

Hereinafter, when the CRS is described in more detail, the CRS is used to estimate a channel of a physical antenna and distributed in a whole frequency band as the reference signal which may be commonly received by all terminals positioned in the cell. Further, the CRS may be used to demodulate the channel quality information (CSI) and data.

The CRS is defined as various formats according to an antenna array at the transmitter side (base station). The 3GPP LTE system (for example, release-8) supports various antenna arrays and a downlink signal transmitting side has three types of antenna arrays of three single transmitting antennas, two transmitting antennas, and four transmitting antennas. When the base station uses the single transmitting antenna, a reference signal for a single antenna port is arrayed. When the base station uses two transmitting antennas, reference signals for two transmitting antenna ports are arrayed by using a time division multiplexing (TDM) scheme and/or a frequency division multiplexing (FDM) scheme. That is, different time resources and/or different frequency resources are allocated to the reference signals for two antenna ports which are distinguished from each other.

Moreover, when the base station uses four transmitting antennas, reference signals for four transmitting antenna ports are arrayed by using the TDM and/or FDM scheme. Channel information measured by a downlink signal receiving side (terminal) may be used to demodulate data transmitted by using a transmission scheme such as single transmitting antenna transmission, transmission diversity, closed-loop spatial multiplexing, open-loop spatial multiplexing, or multi-user MIMO.

In the case where the MIMO antenna is supported, when the reference signal is transmitted from a specific antenna port, the reference signal is transmitted to the positions of specific resource elements according to a pattern of the reference signal and not transmitted to the positions of the specific resource elements for another antenna port. That is, reference signals among different antennas are not duplicated with each other.

A rule of mapping the CRS to the resource block is defined as below.

$$k = 6m + (v + v_{shift}) \bmod 6 \quad \text{[Equation 12]}$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

$$v_{shift} = N_{ID}^{cell} \bmod 6$$

In Equation 12, k and l represent the subcarrier index and the symbol index, respectively and p represents the antenna port. $N_{symb}^{DL}$ represents the number of OFDM symbols in one downlink slot and $N_{RB}^{DL}$ represents the number of radio resources allocated to the downlink. ns represents a slot index and, $N_{ID}^{cell}$ represents a cell ID. mod represents a modulo operation. The position of the reference signal varies depending on the $v_{shift}$ value in the frequency domain. Since $v_{shift}$ is subordinated to the cell ID, the position of the reference signal has various frequency shift values according to the cell.

In more detail, the position of the CRS may be shifted in the frequency domain according to the cell in order to improve channel estimation performance through the CRS. For example, when the reference signal is positioned at an interval of three subcarriers, reference signals in one cell are allocated to a 3k-th subcarrier and a reference signal in another cell is allocated to a 3k+1-th subcarrier. In terms of one antenna port, the reference signals are arrayed at an interval of six resource elements in the frequency domain and separated from a reference signal allocated to another antenna port at an interval of three resource elements.

In the time domain, the reference signals are arrayed at a constant interval from symbol index 0 of each slot. The time interval is defined differently according to a cyclic shift length. In the case of the normal cyclic shift, the reference signal is positioned at symbol indexes 0 and 4 of the slot and in the case of the extended CP, the reference signal is positioned at symbol indexes 0 and 3 of the slot. A reference signal for an antenna port having a maximum value between two antenna ports is defined in one OFDM symbol. Therefore, in the case of transmission of four transmitting antennas, reference signals for reference signal antenna ports 0 and 1 are positioned at symbol indexes 0 and 4 (symbol indexes 0 and 3 in the case of the extended CP) and reference signals for antenna ports 2 and 3 are positioned at symbol index 1 of the slot. The positions of the reference signals for antenna ports 2 and 3 in the frequency domain are exchanged with each other in a second slot.

Hereinafter, when the DRS is described in more detail, the DRS is used for demodulating data. A precoding weight used for a specific terminal in the MIMO antenna transmission is used without a change in order to estimate a channel associated with and corresponding to a transmission channel transmitted in each transmitting antenna when the terminal receives the reference signal.

The 3GPP LTE system (for example, release-8) supports a maximum of four transmitting antennas and a DRS for rank 1 beamforming is defined. The DRS for the rank 1 beamforming also means a reference signal for antenna port index 5.

A rule of mapping the DRS to the resource block is defined as below. Equation 13 shows the case of the normal CP and Equation 14 shows the case of the extended CP.

$$k = (k') \bmod N_{sc}^{RB} + N_{sc}^{RB} \cdot n_{PRB} \quad \text{[Equation 13]}$$

$$k' = \begin{cases} 4m' + v_{shift} & \text{if } l \in \{2, 3\} \\ 4m' + (2 + v_{shift}) \bmod 4 & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

$$l' = \begin{cases} 0, 1 & \text{if } n_s \bmod 2 = 0 \\ 2, 3 & \text{if } n_s \bmod 2 = 1 \end{cases}$$

$$m' = 0, 1, \ldots, 3N_{RB}^{PDSCH} - 1$$

$$v_{shift} = N_{ID}^{cell} \bmod 3$$

-continued $$k = (k') \bmod N_{sc}^{RB} + N_{sc}^{RB} \cdot n_{PRB} \quad \text{[Equation 14]}$$

$$k' = \begin{cases} 3m' + v_{shift} & \text{if } l = 4 \\ 3m' + (2 + v_{shift}) \bmod 3 & \text{if } l = 1 \end{cases}$$

$$l = \begin{cases} 4 & l' \in \{0, 2\} \\ 1 & l' = 1 \end{cases}$$

$$l' = \begin{cases} 0 & \text{if } n_s \bmod 2 = 0 \\ 1, 2 & \text{if } n_s \bmod 2 = 1 \end{cases}$$

$$m' = 0, 1, \ldots, 4N_{RB}^{PDSCH} - 1$$

$$v_{shift} = N_{ID}^{cell} \bmod 3$$

In Equations 12 to 14 given above, k and p represent the subcarrier index and the antenna port, respectively. $N_{RB}^{DL}$, ns, and $N_{ID}^{cell}$ represent the number of RBs, the number of slot indexes, and the number of cell IDs allocated to the downlink, respectively. The position of the RS varies depending on the $v_{shift}$ value in terms of the frequency domain.

In Equations 13 and 14, k and l represent the subcarrier index and the symbol index, respectively and p represents the antenna port. $N_{SC}^{RB}$ represents the size of the resource block in the frequency domain and is expressed as the number of subcarriers. $n_{PRB}$ represents the number of physical resource blocks. $N_{RB}^{PDSCH}$ represents a frequency band of the resource block for the PDSCH transmission. ns represents the slot index and $N_{ID}^{cell}$ represents the cell ID. mod represents the modulo operation. The position of the reference signal varies depending on the $v_{shift}$ value in the frequency domain. Since $v_{shift}$ is subordinated to the cell ID, the position of the reference signal has various frequency shift values according to the cell.

Sounding Reference Signal (SRS)

The SRS is primarily used for the channel quality measurement in order to perform frequency-selective scheduling and is not associated with transmission of the uplink data and/or control information. However, the SRS is not limited thereto and the SRS may be used for various other purposes for supporting improvement of power control and various start-up functions of terminals which have not been scheduled. One example of the start-up function may include an initial modulation and coding scheme (MCS), initial power control for data transmission, timing advance, and frequency semi-selective scheduling. In this case, the frequency semi-selective scheduling means scheduling that selectively allocates the frequency resource to the first slot of the subframe and allocates the frequency resource by pseudo-randomly hopping to another frequency in the second slot.

Further, the SRS may be used for measuring the downlink channel quality on the assumption that the radio channels between the uplink and the downlink are reciprocal. The assumption is valid particularly in the time division duplex in which the uplink and the downlink share the same frequency spectrum and are divided in the time domain.

Subframes of the SRS transmitted by any terminal in the cell may be expressed by a cell-specific broadcasting signal. A 4-bit cell-specific 'srsSubframeConfiguration' parameter represents 15 available subframe arrays in which the SRS may be transmitted through each radio frame. By the arrays, flexibility for adjustment of the SRS overhead is provided according to a deployment scenario.

A 16-th array among them completely turns off a switch of the SRS in the cell and is suitable primarily for a serving cell that serves high-speed terminals.

Figure 16:
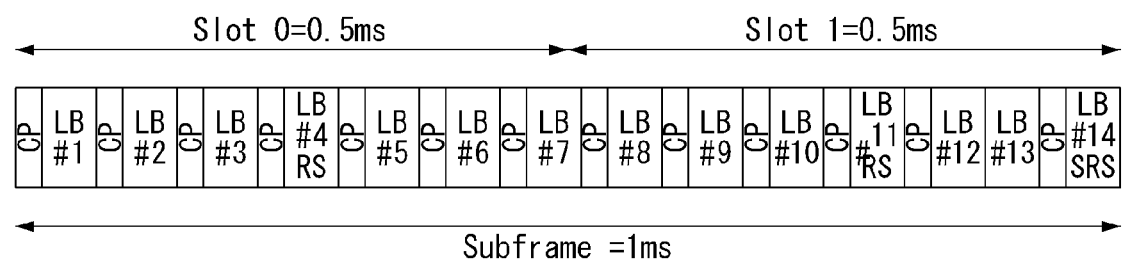
FIG. 16 illustrates an uplink subframe including a sounding reference signal symbol in a wireless communication system to which the present invention may be applied.

FIG. 16 illustrates an uplink subframe including a sounding reference signal symbol in the wireless communication system to which the present invention can be applied.

Referring to FIG. 16, the SRS is continuously transmitted through a last SC FDMA symbol on the arrayed subframes. Therefore, the SRS and the DMRS are positioned at different SC-FDMA symbols.

The PUSCH data transmission is not permitted in a specific SC-FDMA symbol for the SRS transmission and consequently, when sounding overhead is highest, that is, even when the SRS symbol is included in all subframes, the sounding overhead does not exceed approximately 7%.

Each SRS symbol is generated by a base sequence (random sequence or a sequence set based on Zadoff-Ch (ZC)) associated with a given time wise and a given frequency band and all terminals in the same cell use the same base sequence. In this case, SRS transmissions from a plurality of terminals in the same cell in the same frequency band and at the same time are orthogonal to each other by different cyclic shifts of the base sequence to be distinguished from each other.

SRS sequences from different cells may be distinguished from each other by allocating different base sequences to respective cells, but orthogonality among different base sequences is not assured.

COMP (Coordinated Multi-Point Transmission and Reception)

According to a demand of LTE-advanced, CoMP transmission is proposed in order to improve the performance of the system. The CoMP is also called co-MIMO, collaborative MIMO, network MIMO, and the like. It is anticipated that the CoMP will improves the performance of the terminal positioned at a cell edge and improve an average throughput of the cell (sector).

In general, inter-cell interference decreases the performance and the average cell (sector) efficiency of the terminal positioned at the cell edge in a multi-cell environment in which a frequency reuse index is 1. In order to alleviate the inter-cell interference, the LTE system adopts a simple passive method such as fractional frequency reuse (FFR) in the LTE system so that the terminal positioned at the cell edge has appropriate performance efficiency in an interference-limited environment. However, a method that reuses the inter-cell interference or alleviates the inter-cell interference as a signal (desired signal) which the terminal needs to receive is more preferable instead of reduction of the use of the frequency resource for each cell. The CoMP transmission scheme may be adopted in order to achieve the aforementioned object.

The CoMP scheme which may be applied to the downlink may be classified into a joint processing (JP) scheme and a coordinated scheduling/beamforming (CS/CB) scheme.

In the JP scheme, the data may be used at each point (base station) in a CoMP wise. The CoMP wise means a set of base stations used in the CoMP scheme. The JP scheme may be again classified into a joint transmission scheme and a dynamic cell selection scheme.

The joint transmission scheme means a scheme in which the signal is simultaneously transmitted through a plurality of points which are all or fractional points in the CoMP wise. That is, data transmitted to a single terminal may be simultaneously transmitted from a plurality of transmission points. Through the joint transmission scheme, the quality of the signal transmitted to the terminal may be improved regardless of coherently or non-coherently and interference with another terminal may be actively removed.

The dynamic cell selection scheme means a scheme in which the signal is transmitted from the single point through the PDSCH in the CoMP wise. That is, data transmitted to the single terminal at a specific time is transmitted from the single point and data is not transmitted to the terminal at another point in the CoMP wise. The point that transmits the data to the terminal may be dynamically selected.

According to the CS/CB scheme, the CoMP wise performs beamforming through coordination for transmitting the data to the single terminal. That is, the data is transmitted to the terminal only in the serving cell, but user scheduling/beamforming may be determined through coordination of a plurality of cells in the CoMP wise.

In the case of the uplink, CoMP reception means receiving the signal transmitted by the coordination among a plurality of points which are geographically separated. The CoMP scheme which may be applied to the uplink may be classified into a joint reception (JR) scheme and the coordinated scheduling/beamforming (CS/CB) scheme.

The JR scheme means a scheme in which the plurality of points which are all or fractional points receives the signal transmitted through the PDSCH in the CoMP wise. In the CS/CB scheme, only the single point receives the signal transmitted through the PDSCH, but the user scheduling/beamforming may be determined through the coordination of the plurality of cells in the CoMP wise.

Relay Node (RN)

The relay node transfers data transmitted and received between the base station and the terminal through two different links (a backhaul link and an access link). The base station may include a donor cell. The relay node is wirelessly connected to a wireless access network through the donor cell.

Meanwhile, in respect to the use of a band (spectrum) of the relay node, a case in which the backhaul link operates in the same frequency band as the access link is referred to as 'in-band' and a case in which the backhaul link and the access link operate in different frequency bands is referred to as 'out-band'. In both the cases of the in-band and the out-band, a terminal (hereinafter, referred to as a legacy terminal) that operates according to the existing LTE system (for example, release-8) needs to be able to access the donor cell.

The relay node may be classified into a transparent relay node or a non-transparent relay node according to whether the terminal recognizing the relay node. Transparent means a case in which it may not be recognized whether the terminal communicates with the network through the relay node and non-transparent means a case in which it is recognized whether the terminal communicates with the network through the relay node.

In respect to control of the relay node, the relay node may be divided into a relay node which is constituted as a part of the donor cell or a relay node that autonomously controls the cell.

The relay node which is constituted as a part of the donor cell may have a relay node identity (ID), but does not have a cell identity thereof.

When at least a part of radio resource management (RRM) is controlled by a base station to which the donor cell belongs, even though residual parts of the RRM are positioned at the relay node, the relay node is referred to as the relay node which is constituted as a part of the donor cell. Preferably, the relay node may support the legacy terminal. For example, various types including smart repeaters, decode-and-forward relay nodes, L2 (second layer) relay nodes, and the like and a type-2 relay node correspond to the relay node.

In the case of the relay node that autonomously controls the cell, the relay node controls one or a plurality of cells and unique physical layer cell identities are provided to the respective cells controlled by the relay node. Further, the respective cells controlled by the relay node may use the same RRM mechanism. In terms of the terminal, there is no difference between accessing the cell controlled by the relay node and accessing a cell controlled by a general base station. The cell controlled by the relay node may support the legacy terminal. For example, a self-backhauling relay node, an L3 (third layer) relay node, a type-1 relay node, and a type-1a relay node correspond to the relay node.

The type-1 relay node as the in-band relay node controls a plurality of cells and the plurality of respective cells are recognized as separate cells distinguished from the donor cell in terms of the terminal. Further, the plurality of respective cells may have physical cell IDs (they are defined in the LTE release-8) and the relay node may transmit a synchronization channel, the reference signal, and the like thereof. In the case of a single-cell operation, the terminal may receive scheduling information and an HARQ feedback directly from the relay node and transmit control channels (scheduling request (SR), CQI, ACK/NACK, and the like) thereof to the relay node. Further, the type-1 relay node is shown as a legacy base station (a base station that operates according to the LTE release-8 system) to the legacy terminals (terminal that operate according to the LTE release-8 system). That is, the type-1 relay node has the backward compatibility. Meanwhile, the terminals that operate according to the LTE-A system recognize the type-1 relay node as a base station different from the legacy base station to provide performance improvement.

The type-1a relay node has the same features as the type-1 relay node including operating as the out-band. The operation of the type-1a relay node may be configured so that an influence on an L1 (first layer) operation is minimized or is not present.

The type-2 relay node as the in-band relay node does not have a separate physical cell ID, and as a result, a new cell is not formed. The type-2 relay node is transparent with respect to the legacy terminal and the legacy terminal may not recognize the presence of the type-2 relay node. The type-2 relay node may transmit the PDSCH, but at least does not transmit the CRS and the PDCCH.

Meanwhile, in order for the relay node to operate as the in-band, some resources in the time-frequency space needs to be reserved for the backhaul link and the resources may be configured not to be used for the access link. This is referred to as resource partitioning.

A general principle in the resource partitioning in the relay node may be described as below. Backhaul downlink and access downlink may be multiplexed in the time division multiplexing scheme on one carrier frequency (that is, only one of the backhaul downlink and the access downlink is activated at a specific time). Similarly, backhaul uplink and access uplink may be multiplexed in the time division multiplexing scheme on one carrier frequency (that is, only one of the backhaul uplink and the access uplink is activated at a specific time).

In the backhaul link multiplexing in the FDD, backhaul downlink transmission may be performed in a downlink frequency band and backhaul uplink transmission may be performed in an uplink frequency band. In the backhaul link multiplexing in the TDD, THE backhaul downlink transmission may be performed in the downlink subframe of the base station and the relay node and the backhaul uplink transmission may be performed in the uplink subframe of the base station and the relay node.

In the case of the in-band relay node, for example, when both backhaul downlink reception from the base station and access downlink transmission to the terminal are performed in the same frequency band, signal interference may occur at a receiver side of the relay node by a signal transmitted from a transmitter side of the relay node. That is, the signal interference or RF jamming may occur at an RF front-end of the relay node. Similarly, even when both the backhaul uplink transmission to the base station and the access uplink reception from the terminal are performed in the same frequency band, the signal interference may occur.

Therefore, in order for the relay node to simultaneously transmit and receive the signal in the same frequency band, when sufficient separation (for example, the transmitting antenna and the receiving antenna are installed to be significantly geographically spaced apart from each other like installation on the ground and underground) between a received signal and a transmitted signal is not provided, it is difficult to implement the transmission and reception of the signal.

As one scheme for solving a problem of the signal interference, the relay node operates not transmit the signal to the terminal while receiving the signal from the donor cell. That is, a gap is generated in transmission from the relay node to the terminal and the terminal may be configured not to expect any transmission from the relay node during the gap. The gap may be configured to constitute a multicast broadcast single frequency network (MBSFN) subframe.

Figure 17:
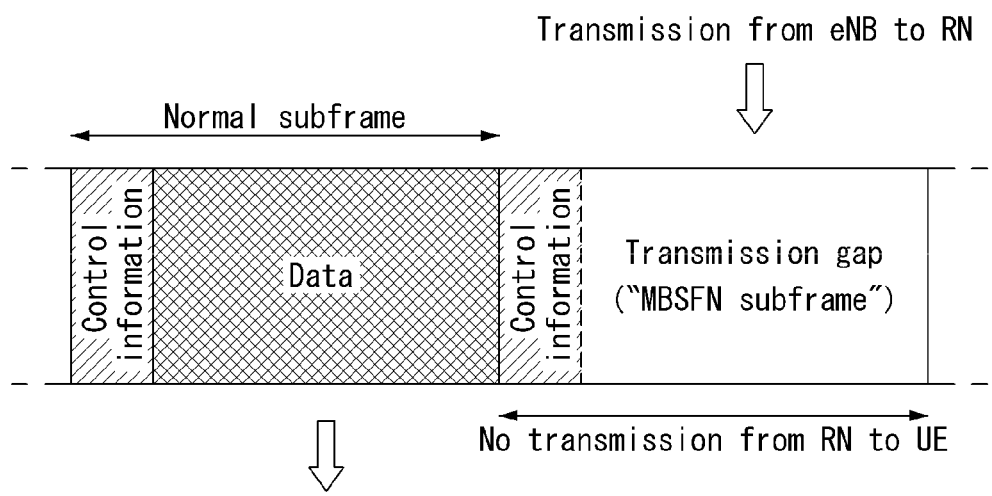
FIG. 17 illustrates a relay node resource partition in a wireless communication system to which the present invention may be applied.

FIG. 17 illustrates a structure of relay resource partitioning in the wireless communication system to which the present invention can be applied.

In FIG. 17, in the case of a first subframe as a general subframe, a downlink (that is, access downlink) control signal and downlink data are transmitted from the relay node and in the case of a second subframe as the MBSFN subframe, the control signal is transmitted from the relay node from the terminal in the control region of the downlink subframe, but no transmission is performed from the relay node to the terminal in residual regions. Herein, since the legacy terminal expects transmission of the PDCCH in all downlink subframes (in other words, since the relay node needs to support legacy terminals in a region thereof to perform a measurement function by receiving the PDCCH every subframe), the PDCCH needs to be transmitted in all downlink subframes for a correct operation of the legacy terminal. Therefore, eve on a subframe (second subframe) configured for downlink (that is, backhaul downlink) transmission from the base station to the relay node, the relay does not receive the backhaul downlink but needs to perform the access downlink transmission in first N (N=1, 2, or 3) OFDM symbol intervals of the subframe. In this regard, since the PDCCH is transmitted from the relay node to the terminal in the control region of the second subframe, the backward compatibility to the legacy terminal, which is served by the relay node may be provided. In residual regions of the second subframe, the relay node may receive transmission from the base station while no transmission is performed from the relay node to the terminal. Therefore, through the resource partitioning scheme, the access downlink transmission and the backhaul downlink reception may not be simultaneously performed in the in-band relay node.

The second subframe using the MBSFN subframe will be described in detail. The control region of the second subframe may be referred to as a relay non-hearing interval. The relay non-hearing interval means an interval in which the relay node does not receive the backhaul downlink signal and transmits the access downlink signal. The interval may be configured by the OFDM length of 1, 2, or 3 as described above. In the relay node non-hearing interval, the relay node may perform the access downlink transmission to the terminal and in the residual regions, the relay node may receive the backhaul downlink from the base station. In this case, since the relay node may not simultaneously perform transmission and reception in the same frequency band, it takes a time for the relay node to switch from a transmission mode to a reception mode. Therefore, in a first partial interval of a backhaul downlink receiving region, a guard time (GT) needs to be set so that the relay node switches to the transmission/reception mode. Similarly, even when the relay node operates to receive the backhaul downlink from the base station and transmit the access downlink to the terminal, the guard time for the reception/transmission mode switching of the relay node may be set. The length of the guard time may be given as a value of the time domain and for example, given as a value of k (k≥1) time samples (Ts) or set to the length of one or more OFDM symbols. Alternatively, when the relay node backhaul downlink subframes are consecutively configured or according to a pre-determines subframe timing alignment relationship, a guard time of a last part of the subframe may not be defined or set. The guard time may be defined only in the frequency domain configured for the backhaul downlink subframe transmission in order to maintain the backward compatibility (when the guard time is set in the access downlink interval, the legacy terminal may not be supported). In the backhaul downlink reception interval other than the guard time, the relay node may receive the PDCCH and the PDSCH from the base station. This may be expressed as a relay (R)-PDCCH and a relay-PDSCH (R-PDSCH) in a meaning of a relay node dedicated physical channel.

Channel State Information (CSI) Feed-Back

The MIMO scheme may be divided into an open-loop scheme and a closed-loop scheme. The open-loop MIMO scheme means that the transmitter side performs MIMO transmission without a feed-back of the channel state information from the MIMO receiver side. The closed-loop MIMO scheme means that the transmitter side performs the MIMO transmission by receiving the feed-back of the channel state information from the MIMO receiver side. In the closed-loop MIMO scheme, each of the transmitter side and the receiver side may perform the beamforming based on the channel state information in order to acquire a multiplexing gain of the MIMO transmitting antenna. The transmitter side (for example, the base station) may allocate an uplink control channel or an uplink share channel to the receiver side (for example, the terminal).

The channel state information (CSI) which is fed back may include the rank indicator (RI), the precoding matrix index (PMI), and the channel quality indicator (CQI).

The RI is information on the rank of the channel. The rank of the channel means the maximum number of layers (alternatively, streams) which may send different information through the same time-frequency resource. Since a rank value is primary determined by long-time fading of the channel, the RI may be generally fed back according to a longer period (that is, less frequently) than the PMI and the CQI.

The PMI is information on the precoding matrix used for transmission from the transmitter side and a value acquired by reflecting spatial characteristics of the channel. Precoding means mapping the transmission layer to the transmitting antenna and a layer-antenna mapping relationship may be determined by a precoding matrix. The PMI corresponds to a precoding matrix index of the base station, which the terminal prefers to base on a measurement value (metric) such as a signal-to-interference plus noise ratio (SINR), or the like. In order to reduce feed-back overhead of precoding information, a scheme may be used, in which the transmitter side and the receiver side previously share a codebook including various precoding matrices and feed back only an index indicating a specific precoding matrix.

The CQI is information indicating the channel quality or a channel intensity. The CQI may be expressed as a predetermined MCS combination. That is, the CQI which is fed back indicates a corresponding modulation scheme and a corresponding code rate. In general, the CQI becomes a value acquired by reflecting a received SINR which may be acquired when the base station configures a spatial channel by using the PMI.

In the system (for example, LTE-A system) supporting the extended antenna configuration, acquiring additional multi-user diversity by using a multi-user-MIMO (MU-MIMO) scheme is considered. In the MU-MIMO scheme, since an interference channel between terminals multiplexed in an antenna domain is present, when the base station performs downlink transmission by using the channel state information which one terminal among the multi users feeds back, the interference in another terminal needs to be prevented. Therefore, channel state information having higher accuracy needs to be fed back than a single-user-MIMO (SU-MIMO) scheme in order to correctly perform the MU-MIMO operation.

A new CSI feed-back scheme that enhances the CSI constituted by the RI, the PMI, and the CQI may be adopted in order to measure and report the more accurate channel state information. For example, the precoding information which the receiver side feeds back may be indicated by combining two PMIs. One (first PMI) among two PMIs may have an attribute of a long term and/or a wideband and be designated as W1. The other one (second PMI) among two PMIs may have an attribute of a short term and/or a subband and be designated as W2. A final PMI may be determined by a combination (alternatively, function) of W1 and W2. For example, when the final PMI is referred to as W, W may be defined as W=W1*W2 or W=W2*W1.

Herein, W1 reflects average frequency and/or temporal characteristics of the channel. In other words, W may be defined as the channel state information reflecting a characteristic of a long term channel on the time, reflecting a characteristic of a wideband channel on the frequency, or reflecting the characteristics of the long term channel on the time and the wideband channel on the frequency. In order to express the characteristics of W1 in brief, W1 is referred to as the channel state information (alternatively, long term-wideband PMI) of the long term and wideband attributes.

Meanwhile, W2 reflects a relatively more instantaneous channel characteristic than W1. In other words, W2 may be defined as the channel state information reflecting a characteristic of a short-term channel on the time, reflecting a characteristic of a subband channel on the frequency, or reflecting the characteristics of the short term channel on the time and the subband channel on the frequency. In order to express the characteristics of W2 in brief, W2 is referred to as the channel state information (alternatively, short term-subband PMI) of the short term and subband attributes.

In order to determine one final precoding matrix W from the information (for example, W1 and W2) of two different attributes indicating the channel state, separate codebooks (that is, a first codebook for W1 and a second codebook for W2) constituted by the precoding matrixes indicating the channel information of the respective attributes need to be configured. A type of the codebook configured as above may be referred to as a hierarchical codebook. Further, determining a codebook to be finally used by using the hierarchical codebook may be referred to as hierarchical codebook transformation.

In the case of using the code book, higher-accuracy channel feed-back is possible than in the case of using a single codebook. Single-cell MU-MIMO and/or multi-cell coordinated communication may be supported by using the high-accuracy channel feed-back.

Enhanced PMI for MU-MIMO or CoMP

In a next-generation communication standard such as LTE-A, in order to achieve high transmission rate, transmission schemes such as MU-MIMO and CoMP were proposed. In order to implement the improved transmission schemes, the UE needs to feedback complicated and various CSIs to the base station.

For example, in the MU-MIMO, when UE-A selects the PMI, a CSI feedback scheme which uploads desired PMI of the UE-A and the PMI (hereinafter, referred to as best companion PMI (BCPMI)) of the UE scheduled with the UE-A.

That is, in the precoding matrix codebook, when co-scheduled UE is used as a precoder, the BCPMI which gives less interference to the UE-A is calculated and additionally fed-back to the base station.

The base station MU-MIMO-schedules another UE preferring UE-A and best companion precoding matrix (BCPM) (precoding matrix corresponding to the BCPMI) precoding by using the information.

The BCPMI feedback scheme is divided into two of an explicit feedback and an implicit feedback according to presence and absence of the feedback payload.

First, there is the explicit feedback scheme with the feedback payload.

In the explicit feedback scheme, the UE-A determines the BCPMI in the precoding matrix codebook and then feedbacks the determined BCPMI to the base station through a control channel. As one scheme, the UE-A selects an interference signal precoding matrix in which estimated SINR is maximized in the codebook and feedbacks the selected interference signal precoding matrix as the BCPMI value.

As an advantage of the explicit feedback, the BCPMI with more effective interference removal may be selected and transmitted. The UE determines the most effective value in the interference removal as the BCPMI by assuming all the codewords in the codebook one by one as the interference beam and comparing the metric such as SINR. However, as the codebook size is increased, the candidates of the BCPMI are increased, and thus the larger feedback payload size is required.

Second, there is the explicit feedback scheme without the feedback payload.

The implicit feedback scheme is a scheme that the UE-A does not search a codeword which receives less interference in the codebook to select the searched codeword as the BCPMI, but statically determines the BCPMI corresponding to the desired PMI when the desired PMI is determined. In this case, it may be preferred that the BCPM is constituted by orthogonal vectors in the determined desired PMI.

The reason is that the desired PM is set in a direction to maximize the channel gain of the channel H in order to maximize the received SINR and thus, it is effective in mitigating the interference the interference signal is selected by avoiding in the direction of the PM. When the channel H is analyzed as the plurality of independent channels through the singular value decomposition (SVD), the BCPMI determination scheme is further justified. 4×4 channel H may be decomposed through the SVD like the following Equation 15.

$$H = ULV^H + \begin{bmatrix} u_1 & u_2 & u_3 & u_4 \end{bmatrix} \begin{bmatrix} \lambda_1 & 0 & 0 & 0 \\ 0 & \lambda_2 & 0 & 0 \\ 0 & 0 & \lambda_3 & 0 \\ 0 & 0 & 0 & \lambda_4 \end{bmatrix} \begin{bmatrix} v_1^H \\ v_2^H \\ v_3^H \\ v_4^H \end{bmatrix} \quad \text{[Equation 15]}$$

In Equation 15, U, V are unitary matrices, ui, vi, and $\lambda_i$ represent a 4×1 left singular vector, a 4×1 right singular vector, and a singular value of the channel H, respectively and arranged in descending order of $\lambda_i > \lambda_{i+1}$. In the case of using the beamforming matrix V in the transmission terminal and the beamforming matrix $U^H$ in the reception terminal, all channel gains which may be theoretically obtained may be obtained without loss.

In the case of Rank 1, using the transmission beamforming vector v1 and the reception beamforming vector u1 may obtain the channel $|\lambda_1|^2$ to gain obtain optimal performance in terms of the SNR. For example, it is advantageous that the UE-A selects the most similar PM to v1 in the case of rank 1. Ideally, when the desired PM completely coincides with v1, the reception beam is set to u1 and the transmission beam of the interference signal is set to the PM in the orthogonal direction to completely remove the interference signal without loss in the desired signal. Actually, due to the quantization error, when the desired PM has a slight difference from v1, the transmission beam of the interference signal set in the orthogonal direction to the PM is no longer equal to the orthogonal beam to v1, and thus, the desired signal may not completely remove the interference signal without loss of the desired signal, but when the quantization error is small to help in controlling the interference signal.

As an example of the implicit feedback, in the case of using the LTE codebook, the BCPMI may be statically determined as the vector index orthogonal to the PMI.

It is assumed that the transmission antennas are four and the reception rank of the UE feedbacking the PMI is 1, three vectors orthogonal to the desired PMI are expressed as three BCPMIs.

For example, in the case of PMI=3, BCPMI=0,1,2. The PMI and the BCPMI represent the index of the 4×01 vector codeword in the codebook. The base station uses some or all as the precoder of the co-schedule UE by considering the BCPMI set(BCPMI=0,1,2) as the effective precoding index in the interference removal.

The implicit PMI has an advantage in that there is no additional feedback overhead because the desired PMI and the BCPMI set are mapped to 1:1. However, due to the quantization error of the desired PM (PM: precoding matrix corresponding to the PMI), the BCPM subordinated thereto may have optimal beam direction and error for the interference removal. When there is no quantization error, three BCPMs represent interference beam (ideal interference beam) which completely removes all the interference, but when there is the error, each BCPM occurs a difference from the ideal interference beam.

Further, the difference from the ideal interference beam of each BCPM is averagely the same, but may be different at a certain moment. For example, when desired PMI=3, it may be effective in removing the interference signal in order of BCPMI 0, 1, and 2, and the base station which does not know a relative error of BCPMI 0, 1, and 2 may communicate while the strong interference between the co-scheduled UEs is present by determining BCPMI 2 with the largest error with the ideal interference beam as the beam of the interference signal.

General D2D Communication

In general, D2D communication is used limitedly to refer to communication between objects or intelligent D2D communication. However, D2D communication according to the present invention may include communication between various forms of devices equipped with a communication function, such as smartphones or personal computers, as well as simple devices equipped with a communication function.

Figure 18:
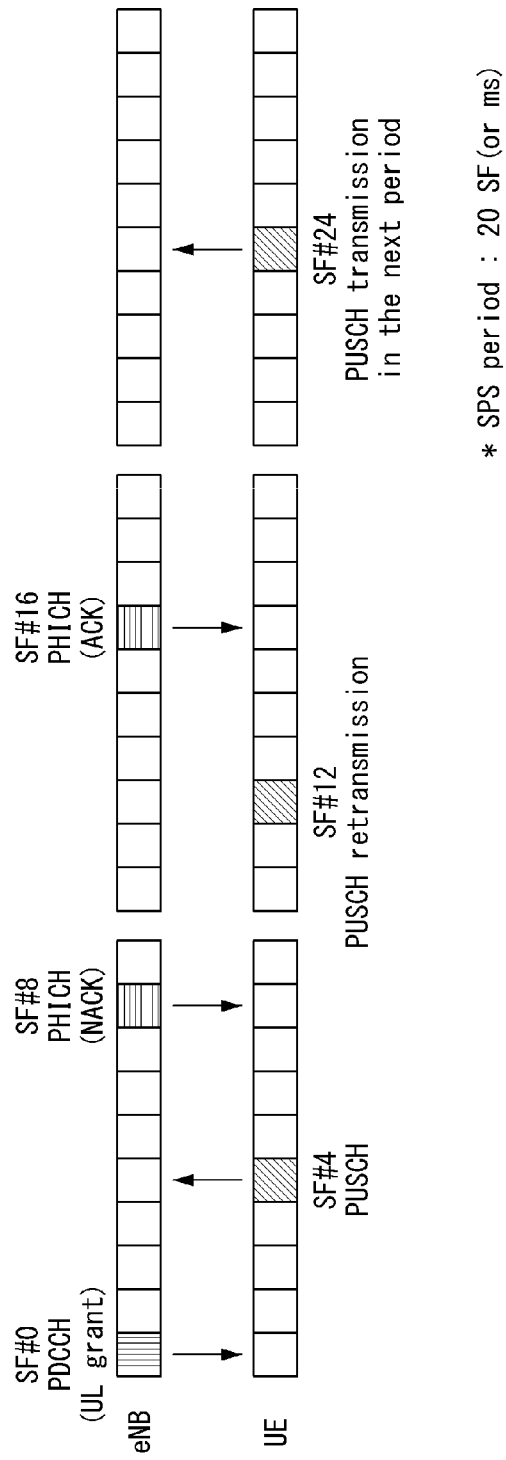
FIG. 18 illustrates a mechanism of uplink SPS (Semi-Persistent Scheduling) to which the present invention may be applied.

FIG. 18 illustrates a mechanism of uplink SPS (Semi-Persistent Scheduling) to which the present invention may be applied.

In general, resources for unicast data are allocated dynamically by scheduling for each subframe. Differently from the unicast data case, SPS is a mechanism to reserve resources for periodically generated traffic with a requested data rate of medium/low speed such as VoIP (Voice over Internet Protocol) or streaming. SPS may reduce scheduling overhead and allocate resources in a reliable manner by reserving resources for specific traffic.

In the case of DL/UL (Downlink/Uplink) SPS of the LTE, information about a subframe that has to perform SPS transmission (Tx) and reception (Rx) is given by RRC signaling; and activation, reactivation, and release of SPS is performed through the PDCCH. Subframe information for SPS includes a subframe interval and subframe offset. For the convenience of description, the PDCCH for indicating SPS activation/reactivation/release is called an SPS PDCCH. The SPS PDCCH carries RB allocation information for SPS Tx/Rx and MCS (Modulation and Coding Scheme) information.

Also, the SPS PDCCH masks the CRC (Cyclic Redundancy Check) with an SPS C-RNTI (Cell Radio Network Temporary Identifier). Therefore, even if a UE receives information about a subframe that has to receive SPS through RRC signaling, the UE does not immediately perform the SPS Tx/Rx. When a UE receives an SPS PDCCH that informs of SPS activation (or reactivation), the UE performs SPS Tx (for example, PUSCH transmission) or SPS Rx (for example, PDSCH reception) in a subframe allocated by the RRC signaling.

Within the corresponding subframe, SPS Tx/Rx is performed by using RB allocation information and MCS information within the SPS PDCCH. Meanwhile, if receiving a PDCCH that informs of SPS release, the UE stops SPS Tx/Rx. When an SPS PDCCH informing of activation (or reactivation) of the stopped SPS Tx/Rx is received, the SPS Tx/Rx is resumed by using RB allocation and MCS specified by the SPS PDCCH at the subframe allocated by the RRC signaling. Also, for activated SPS, SPS transmission timing, allocation of RBs to be used, and MCS may be changed by commanding "reactivation" through the PDCCH. Also, for activated SPS, the resources to be used for retransmission of the PDSCH/PUSCH and MCS may be changed through the PDCCH ("reallocation").

FIG. 18 assumes that the resource allocation interval of SPS is set to 20 ms through upper layer (for example, RRC) signaling. An eNB transmits an SPS PDCCH that indicates SPS activation to a UE at the subframe #0, for example. In the present example, the SPS PDCCH includes UL grant information. In this case, the UE receives a specific RB and MCS designated by the SPS PDCCH for uplink transmission every 20 ms after receiving a UL grant message from SPS signaling. Therefore, the UE may perform uplink transmission by using the RB and MCS designated by the SPS PDCCH every 20 ms. Meanwhile, when the UL synchronous HARQ method is used, resources for retransmission are reserved every 8 ms after the initial transmission. More specifically, the UE performs retransmission at the subframe #12 through the reserved resources for retransmission of HARQ when the UE receives NACK (Negative Acknowledgement) at the subframe #8 with respect to the uplink data transmitted at the subframe #4. When the UE receives ACK (Acknowledgement) at the subframe #16 with respect to the uplink data transmitted at the subframe #12, the resources reserved for retransmission of HARQ may be used by another UE. The UE may perform uplink transmission at the subframe #24 by using the scheduling information received through the SPS PDCCH at the subframe #0.

Figure 19:
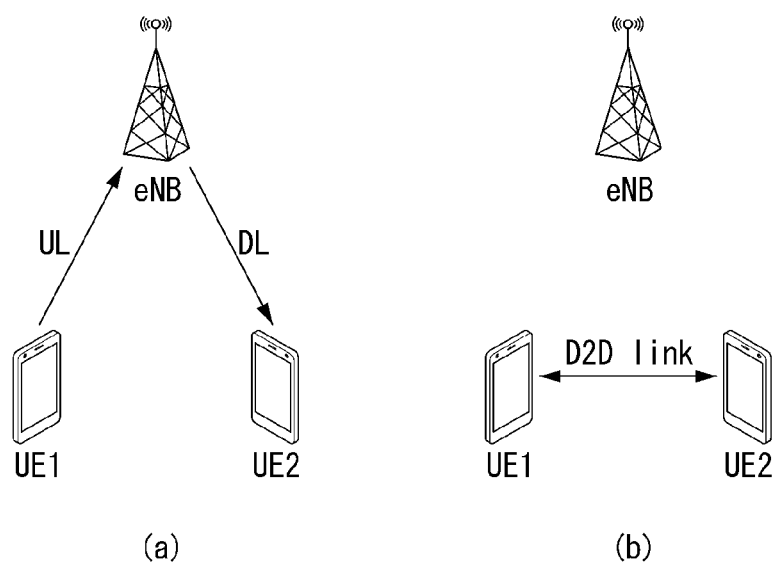
FIG. 19 illustrates D2D communication in a wireless communication system to which the present invention may be applied.

FIG. 19 illustrates D2D communication in a wireless communication system to which the present invention may be applied.

FIG. 19(a) illustrates a conventional communication method relying on coordination of an eNB, where UE 1 may transmit data to the eNB via an uplink, and the eNB may transmit data to UE 2 via a downlink. Such kind of communication methods may be regarded as an indirect communication method via an eNB. The indirect communication method may involve an Un link (which refers to a link between eNBs or a link between an eNB and a relay and may be called a backhaul link) and/or an Uu link (which refers to a link between an eNB and a UE or a link between a relay and a UE and may be called an access link), which are defined in the conventional wireless communication system.

FIG. 19(b) is one example of D2D communication, illustrating a UE-to-UE communication method where data exchange between UEs may be performed without involving an eNB. Such kind of communication methods may be regarded as a direct communication method between devices. Compared with the indirect communication method utilizing an eNB, the D2D direct communication method reduces latency and requires much less radio resources.

In what follows, general operation of D2D communication is described. In the GPP LTE-A, services based on D2D operation are called Proximity based Services (ProSe). In what follows, ProSe is considered to be equivalent to the D2D operation and may be used interchangeably with the D2D operation. In the following, ProSe will be described.

ProSe supports ProSe direct communication and ProSe direct discovery. ProSe direct communication refers to the communication performed between two or more adjacent UEs. The UEs may perform communication by using the protocol of a user plane. A ProSe-enabled UE refers to a UE that supports a procedure related to the requirements of the ProSe.

Unless otherwise specified, a ProSe-enabled UE includes both of a public safety UE and a non-public safety UE. A public safety UE supports both of the function specific to public safety and the ProSe process while a non-public safety UE supports the ProSe process but does not support the function specific to public safety.

ProSe direct discovery is a process in which a ProSe-enabled UE discovers another ProSe-enabled UE adjacent thereto and uses only the capabilities of the two ProSe-enabled UEs. EPC-level ProSe discovery is a process in which an EPC determines whether two ProSe-enabled UEs are adjacent to each other and informs the two ProSe-enabled UEs of their proximity to each other.

In what follows, for the convenience of description, ProSe direct communication may be called D2D communication, and ProSe direct discovery may be called D2D discovery.

Figure 20:
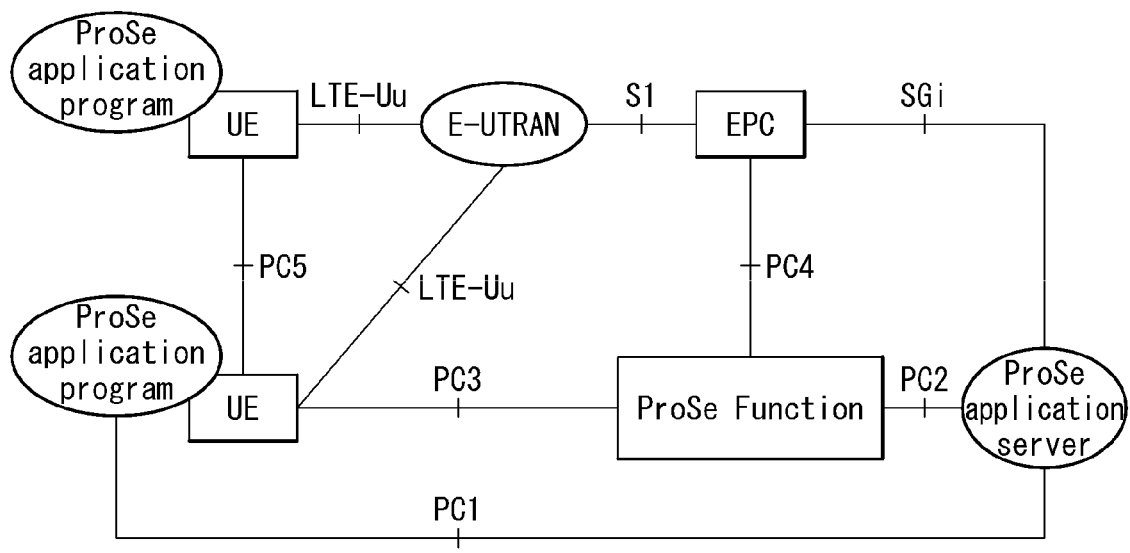
FIG. 20 illustrates a reference structure for ProSe to which the present invention may be applied.

FIG. 20 illustrates a reference structure for ProSe to which the present invention may be applied.

Referring to FIG. 20, the reference structure for ProSe includes E-UTRAN, EPC, a plurality of UEs including a ProSe application program, ProSe APP server, and ProSe function.

An EPC represents the E-UTRAN core network architecture. An EPC may include an MME, S-GW, P-GW, policy and charging rules function (PCRF), and home subscriber server (HSS).

A ProSe application server is a user of ProSe capability for making an application function. The ProSe application server may communicate with an application program within a UE. The application program within a UE may use the ProSe capability for making an application function.

The ProSe function may include at least one of the following functions but is not limited thereto.

Interworking via a reference point towards the $3^{rd}$ party applications.

Authorization and configuration of the UE for discovery and direct communication Enable the functionality of the EPC level ProSe discovery ProSe related new subscriber data and handling of data storage, and handling of ProSe identities Security related functionality Provide control towards the EPC for policy related functionality Provide functionality for charging (via or outside of EPC, for example, offline charging)

In what follows, a reference point and a reference interface in the reference structure for ProSe will be described.

PC1: a reference point between a ProSe application program within a UE and a ProSe application program within a ProSe application server. PC1 is used for defining an application-level requirement condition for signaling.

PC2: a reference point between the ProSe application server and the ProSe function. PC2 is used for defining interaction between the ProSe application server and the ProSe function. One example of the interaction may be the update of application data of the ProSe database by the ProSe function.

PC3: a reference point between a UE and the ProSe function. PC3 is used for defining interaction between a UE and the ProSe function. One example of the interaction may be configuration for ProSe discovery and communication.

PC4: a reference point between the EPC and the ProSe function. PC4 is used for defining interaction between the EPC and the ProSe function. The interaction may occur when a path for 1-to-1 communication between UEs is determined or when a ProSe service for real-time session management or mobility management is authenticated.

PC5: a reference point for using a control/user plane for discovery, communication, relay, and 1-to-1 communication between UEs.

PC6: a reference point for using a function such as ProSe discovery among users belonging to different PLMNs.

SGi: may be used for exchange of application data and application-level control information.

Figure 21:
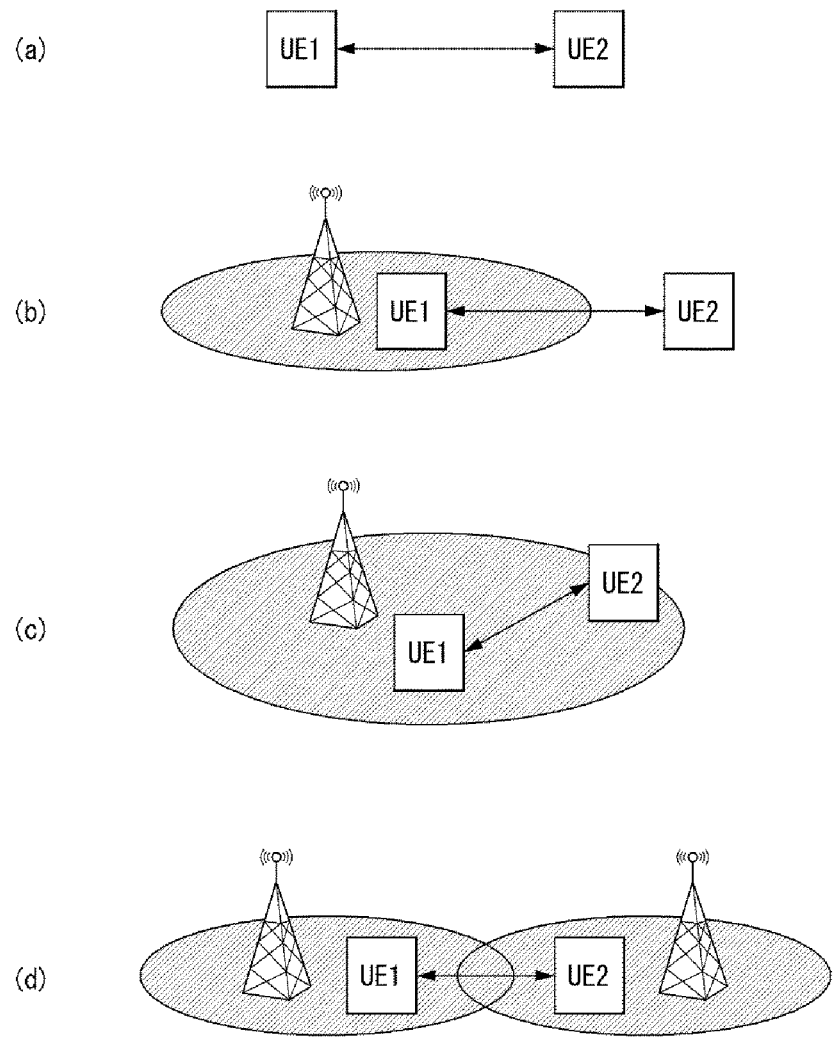
FIG. 21 illustrates various use case scenarios of D2D communication to which the present invention may be applied.

FIG. 21 illustrates various use case scenarios of D2D communication to which the present invention may be applied.

The scenario of D2D communication may be largely divided into three cases depending on whether the UE 1 and the UE 2 are located within cell coverage (in-coverage)/out of cell coverage (out-of-coverage): (1) Out-of-Coverage Network, (2) Partial-Coverage Network, and (3) In-Coverage Network.

In-Coverage Network may be divided into In-Coverage-Single-Cell and In-Coverage-Multi-Cell depending on the number of cells belonging to the coverage of an eNB.

FIG. 21(a) illustrates one example of the Out-of-Coverage Network scenario of D2D communication.

The Out-of-Coverage Network scenario refers to performing D2D communication between D2D UEs without control of an eNB.

From FIG. 21(a), it may be seen that only the UE 1 and the UE 2 exist and they communicate directly with each other.

FIG. 21(b) illustrates one example of the Partial-Coverage Network scenario of D2D communication.

The Partial-Coverage Scenario refers to performing D2D communication between a D2D UE located within the network coverage and a D2D UE located out of the network coverage.

From FIG. 21(b), it may be seen that the UE 1 located within the network coverage communicates with the UE 2 located out of the network coverage.

FIG. 21(c) illustrates one example of the In-Coverage-Single-Cell scenario, and FIG. 21(d) illustrates one example of In-Coverage-Multi-Cell scenario.

The In-Coverage Network scenario refers to the situation in which D2D UE perform D2D communication within the network coverage under the control of an eNB.

In FIG. 21(c), the UE 1 and the UE 2 are located within the same network coverage (or cell) and perform D2D communication under the control of an eNB.

In FIG. 21(d), the UE 1 and the UE 2 are located within network coverage but are located within different network coverage from each other. And the UE 1 and the UE 2 perform D2D communication under the control of the respective eNBs that manage their own network coverage.

In what follows, D2D communication will be described in more detail.

D2D communication may be performed according to the scenarios of FIG. 21 but may be generally divided into in-coverage communication and out-of-coverage communication. A link used for D2D communication (direct communication between UEs) may be called a D2D link, direct link, or side link but is collectively called a side link for the convenience of description.

In the case of FDD, side link transmission operates in the uplink spectrum while in the case of TDD, the side link transmission may operate in the uplink (or downlink) subframe. For multiplexing of sidelink transmission and uplink transmission, TDM (Time Division Multiplexing) may be employed.

Side link transmission and uplink transmission do not occur simultaneously. Side link transmission does not occur at an uplink subframe used for uplink transmission or a side link subframe overlapping partially or entirely with the UpPTS. Also, transmission and reception of a side link do not occur simultaneously.

The structure of an uplink physical resource may be the same as that of a physical resource used for side link transmission. However, the last symbol of a side link subframe is composed of a guard period and is not used for side link transmission.

A side link subframe may be composed of an extended CP or a normal CP.

D2D communication may be largely divided into discovery, direct communication, and synchronization.

1) D2D (Device-to-Device) Discovery

D2D discovery may be applied within network coverage (including inter-cell and intra-cell discovery). In the inter-cell discovery, both of synchronous and asynchronous cell disposition may be considered. D2D discovery may be employed for various commercial uses such as advertisement, issuing a coupon, and friend finding for a UE in a neighborhood area.

When the UE 1 takes the role of transmitting a discovery message, the UE 1 transmits a discovery message, and the UE 2 receives the discovery message. The roles of the UE 1 and the UE 2 may be changed. A message transmitted from the UE 1 may be received by one or more UEs such as the UE 2.

A discovery message may include one MAC PDU, where one MAC PDU may include a UE ID and an application ID.

A PSDCH (Physical Sidelink Discovery Channel) may be defined as a channel for transmitting a discovery message. The structure of the PSDCH channel may reuse the PUSCH structure.

Two types of resource allocation methods may be used for D2D discovery: Type 1 and Type 2.

In the case of Type 1, an eNB may allocate resources for transmission of a discovery message in a non-UE specific manner.

More specifically, a radio resource pool for discovery transmission and reception composed of a plurality of subframe sets and a plurality of resource block sets is allocated within a specific period (in what follows, 'discovery period'), and a discovery transmission UE selects a specific resource in a random fashion within the radio resource pool and transmits a discovery message.

Such a periodic discovery resource pool may be allocated in a semi-static manner for transmission of a discovery signal. Configuration information of a discovery resource pool for discovery transmission includes a discovery period and information about a subframe set and a resource block set that may be used for transmission of a discovery signal within the discovery period. The configuration information of a discovery resource pool may be transmitted by a UE through upper layer signaling. In the case of an in-coverage UE, the discovery resource pool for discovery transmission may be configured by the eNB and may be informed to the UE through RRC signaling (for example, SIB (System Information Block)).

The discovery resource pool allocated for discovery within one discovery period is a time-frequency resource block of the same size and may be multiplexed according to TDM and/or FDM scheme. The time-frequency resource block of the same size may be called a 'discovery resource'. A discovery resource may be distinguished by one subframe unit, and each subframe may include two physical resource blocks (PRBs) for each subframe. One discovery resource may be used for transmission of a discovery MAC PDU by one UE.

Also, a UE may transmit a discovery signal repeatedly within a discovery period for transmission of one transport block. Transmission of the MAC PDU performed by one UE may be repeated (for example, four times) contiguously or non-contiguously within the discovery period (namely, within a radio resource pool). The number of transmission of a discovery signal for one transport block may be transmitted to the UE by upper layer signaling.

The UE may randomly select a first discovery resource from among the discovery resource set that may be used for repeated transmission of the MAC PDU and determine other discovery resources with respect to the first discovery resource. For example, a predetermined pattern is set beforehand, and according to the location of a discovery resource selected as the first discovery resource by the UE, the next discovery resource may be determined by the predetermined pattern. Also, the UE may randomly select a discovery resource from within the discovery resource set that may be used for repeated transmission of the MAC PDU.

In the case of Type 2, a resource for transmission of a discovery message is allocated in a UE-specific manner. Type 2 is further divided into Type-2A and Type-2B. The Type-2A refers to a method for an eNB to allocate a resource every instance that a UE transmits a discovery message within a discovery period, and Type-2B refers to a method for the eNB to allocate a resource in a semi-persistent manner.

In the case of Type-2B, the UE in the RRC_CONNECTED state requests allocation of a resource for transmission of a D2D discovery message from the eNB through RRC signaling. And the eNB may allocate a resource through RRC signaling. The UE releases the most recently allocated transmission resource when the UE transitions to the RRC_IDLE state or when the eNB withdraws resource allocation through RRC signaling. Thus, in the case of Type 2B, a radio resource may be allocated by RRC signaling and activation/deactivation of the radio resource may be determined by the PDCCH.

The eNB may configure the radio resource pool for receiving a discovery message and inform the UE of the radio resource pool by using RRC signaling (for example, SIB (System Information Block)).

The discovery message receiving UE monitors both of the Type 1 and Type 2 discovery resource pool for reception of a discovery message.

2) D2D (Device-to-Device) Direct Communication

The application area of D2D direct communication includes not only the in-coverage and out-of-coverage of the network but also the edge-of-coverage of the network. D2D direct communication may be used for the purpose of Public Safety (PS).

When the UE 1 takes the role of transmission of direct communication data, the UE 1 transmits direct communication data, and the UE 2 receives the direct communication data. The roles of the UE 1 and the UE 2 may be changed. Direct communication transmission from the UE 1 may be received by one or more UE(s) such as the UE 2.

D2D discovery and D2D communication may be defined independently without being associated with each other. In other words, D2D discovery is not required for groupcast and broadcast direct communication. In this way, when D2D discovery and D2D direct communication is defined independently, UEs do not have to recognize neighboring UEs. In other words, in the case of groupcast and broadcast direct communication, it is not required for all of the receiving UEs within the group to be adjacent to each other.

A PSSCH (Physical Sidelink Shared Channel) may be defined as a channel for transmitting D2D direct communication data. Also, a PSCCH (Physical Sidelink Control Channel) may be defined as a channel for transmitting control information (for example, scheduling assignment (SA) for transmission of direct communication data and transmission type) for D2D direct communication. The PSSCH and PSCCH may reuse the structure of the PUSCH.

A method for allocating resources for D2D direct communication may have two modes: mode 1 and mode 2.

Mode 1 refers to a method for scheduling resources used by the eNB to transmit data or control information for D2D direct communication. Mode 1 is applied for in-coverage network.

The eNB configures a resource pool required for D2D direct communication. Here, the resource pool required for D2D communication may be divided into a control information pool and a D2D data pool. If the eNB schedules control information and D2D data transmission resource within the pool configured for a transmitting D2D UE by using the PDCCH or ePDCCH, a transmitting D2D UE transmits the control information and D2D data by using allocated resources.

The transmitting UE requests a transmission resource from the eNB, and the eNB schedules resources for transmission of control information and D2D direct communication data. In other words, in the case of mode 1, the transmitting UE needs to be in the RRC_CONNECTED state for performing D2D direct communication. The transmitting UE transmits a scheduling request to the eNB, and the BSR (Buffer Status Report) procedure is performed so that the eNB may determine the amount of resources requested by the transmitting UE.

Receiving UEs may monitor the control information pool, decode control information related to the receiving UEs, and selectively decode D2D data transmission related to the control information. The receiving UE may not decode the D2D data pool according to the control information recoding result.

Mode 2 refers to a method for randomly selecting a specific resource from among the resource pool so that a UE may transmit data for D2D direct communication or control information. Mode 2 is applied for out-of-coverage and/or edge-of-coverage network.

In the mode 2, the resource pool for transmission of control information and/or the resource pool for transmission of D2D direct communication data may be pre-configured or configured semi-statically. A UE receives a configured resource pool (time and frequency) and selects resources for transmission of D2D communication data from among the resource pool. In other words, the UE may select a resource for transmission of control information from among the control information resource pool to transmit control information. Also, the UE may select a resource from the data resource pool for transmission of D2D direct communication data.

In the D2D broadcast communication, control information is transmitted by a broadcasting UE. Control information indicates the position of a resource for data reception explicitly and/or implicitly with respect to a physical channel carrying D2D direct communication data (namely, PSSCH).

3) Synchronization

A D2D synchronization signal (or sidelink synchronization signal) may be used by a UE for acquiring time-frequency synchronization. In particular, since control by an eNB outside network coverage is not possible, a new signal and procedure for establishing synchronization between UEs may be defined.

A UE transmitting a D2D synchronization signal periodically may be called a D2D synchronization source. When the D2D synchronization source is an eNB, the structure of a transmitted D2D synchronization signal may be the same as that of PSS/SSS. When the D2D synchronization source is not an eNB (for example, a UE or GNSS (Global Navigation Satellite System)), the structure of a transmitted D2D synchronization signal may be newly defined.

A D2D synchronization signal is transmitted periodically with a period of not smaller than 40 ms. Each UE may have multiple physical layer sidelink synchronization identities. A D2D synchronization signal includes a primary D2D synchronization signal (or primary sidelink synchronization signal) and a secondary D2D synchronization signal (or secondary sidelink synchronization signal).

Before transmitting a D2D synchronization signal, a UE may first search for a D2D synchronization source. And if a D2D synchronization source is found, the UE may acquire time-frequency synchronization through the D2D synchronization signal received from the D2D synchronization source. And the corresponding UE may transmit the D2D synchronization signal.

In what follows, for the clarity of the description, it is assumed that two devices participate in direct communication. However, the present invention is not limited to the assumption, and the same technical principles of the present invention may be applied to D2D communication involving two or more devices.

One of D2D discovery methods controls all of the UEs to perform discovery in a distributed manner (in what follows, it is called a 'distributed discovery'). The method performing D2D discovery in a distributed manner refers to a method in which all of the UEs selects a discovery resource and transmits and receives a discovery message autonomously in a distributed manner rather than resource selection within one device (for example, eNB, UE, or D2D scheduling device) as in the centralized method.

In what follows, this document may refer to a signal (or message) that UEs send periodically for D2D discovery as a discovery message, discovery signal, and beacon. In what follows, for the convenience of description, it is called collectively a discovery message.

In the distributed discovery, a dedicated resource may be allocated periodically to the UE as a resource for transmitting and receiving a discovery message, separately from the cellular resources.

Figure 22:
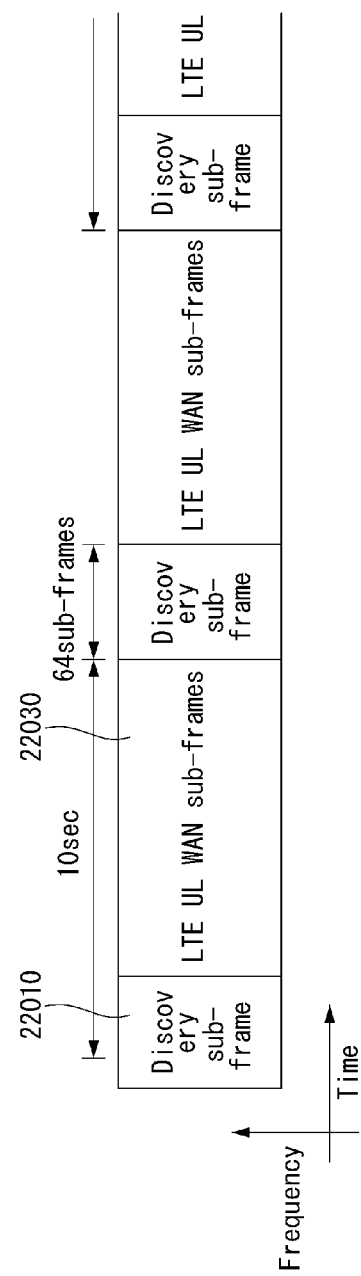
FIG. 22 illustrates one example of a frame structure to which a discovery resource is allocated, for which methods proposed in the present document may be applied.

FIG. 22 illustrates one example of a frame structure to which a discovery resource is allocated, for which methods proposed in the present document may be applied.

Referring to FIG. 22, in the distributed discovery method, a discovery subframe (namely discovery resource pool) 21010 is allocated statically (or exclusively) from among the entire cellular uplink frequency-time resources, and the remaining area is composed of the conventional LTE uplink WAN (Wide Area Network) subframe area 21030. The discovery resource pool may include one or more subframes.

The discovery resource pool may be allocated periodically at regular intervals (namely 'discovery period'). Also, the discovery resource pool may be configured repeatedly within one discovery period.

In the case of FIG. 22, the discovery resource pool is allocated with a discovery period of 10 sec, and 64 consecutive subframes are allocated for each discovery resource pool. However, it should be noted that the discovery period and size of the time/frequency resource of the discovery resource pool are not limited to the example of FIG. 22.

The UE itself selects a resource (namely 'discovery resource') for transmitting the UE's own discovery message from within the discovery pool allocated exclusively to the UE and transmits a discovery message through the selected resource. This operation will be described with reference to FIG. 23.

Figure 23:
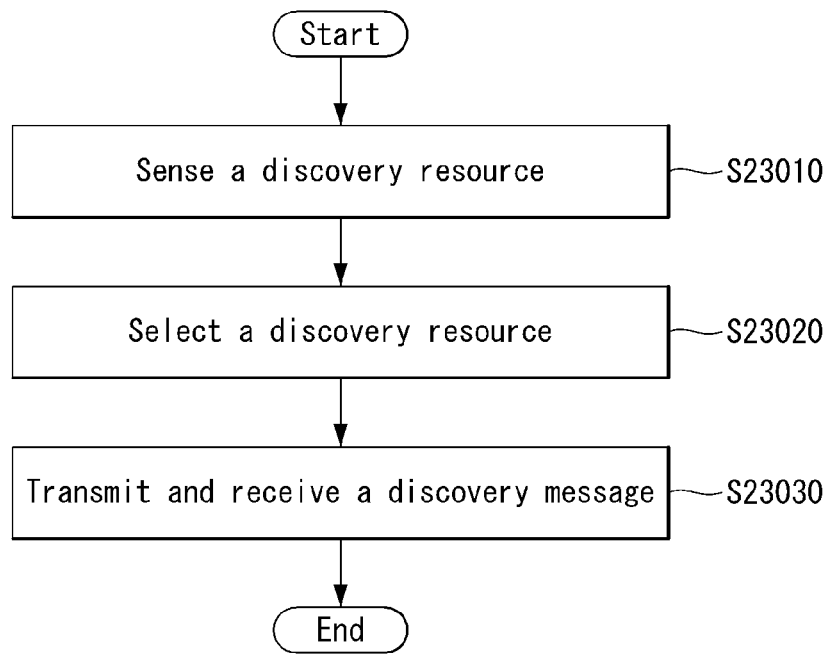
FIG. 23 illustrates a discovery process to which the present invention may be applied.

FIG. 23 illustrates a discovery process to which the present invention may be applied.

Referring to FIG. 23, the discovery method is largely composed of three steps: resource sensing for transmission of a discovery message S23010, resource selection for transmission of a discovery message S23020, and transmission and reception of a discovery message S23030.

First, in the resource sensing step for transmission of a discovery message S23010, all of the UEs performing D2D discovery receive (namely sense) all of the discovery messages during one period of a D2D discovery resource (namely, discovery resource pool) in a distributed manner (namely, autonomously). For example, given that the uplink bandwidth of FIG. 20 is 10 MHz, all of the UEs receive (namely sense) all of the discovery messages transmitted from N=44 RBs (since the total uplink bandwidth is 10 MHz, 6 RBs are used for PUCCH transmission out of a total of 50 RBs) during the period of K=64 msec (64 subframes).

And in the resource selection step for transmission of a discovery message S22020, the UE classifies resources of low energy level from among sensed resources and randomly selects a discovery resource belonging to a predetermined range (for example, in the lower x %, where x is an arbitrary integer, such as 5, 7, 10, . . . ) within the classified resources.

The discovery resource may be composed of one or more resource blocks of the same size and may be multiplexed within the discovery resource pool according to the TDM and/or FDM.

And, in the last step of discovery message transmission and reception S23030, the UE transmits and receives a discovery message on the basis of a discovery resource selected after one discovery period (in the example of FIG. 22, after P=10 sec) and in the subsequent discovery periods, transmits and receives a discovery message periodically according to a random resource hopping pattern.

The D2D discovery procedure is performed continuously not only in the RRC_CONNECTED state in which the UE is connected to the eNB but also in the RRC_IDLE state in which the UE is not connected to the eNB.

Considering the discovery method described above, all of the UEs sense all of the resources (namely the discovery resource pool) that are transmitted by neighboring UEs and randomly select a discovery resource that belong to a predetermined range (for example, in the lower x %) of the resources.

D2D Resource Pool Configuration and Scheduling Assignment

Figure 24:
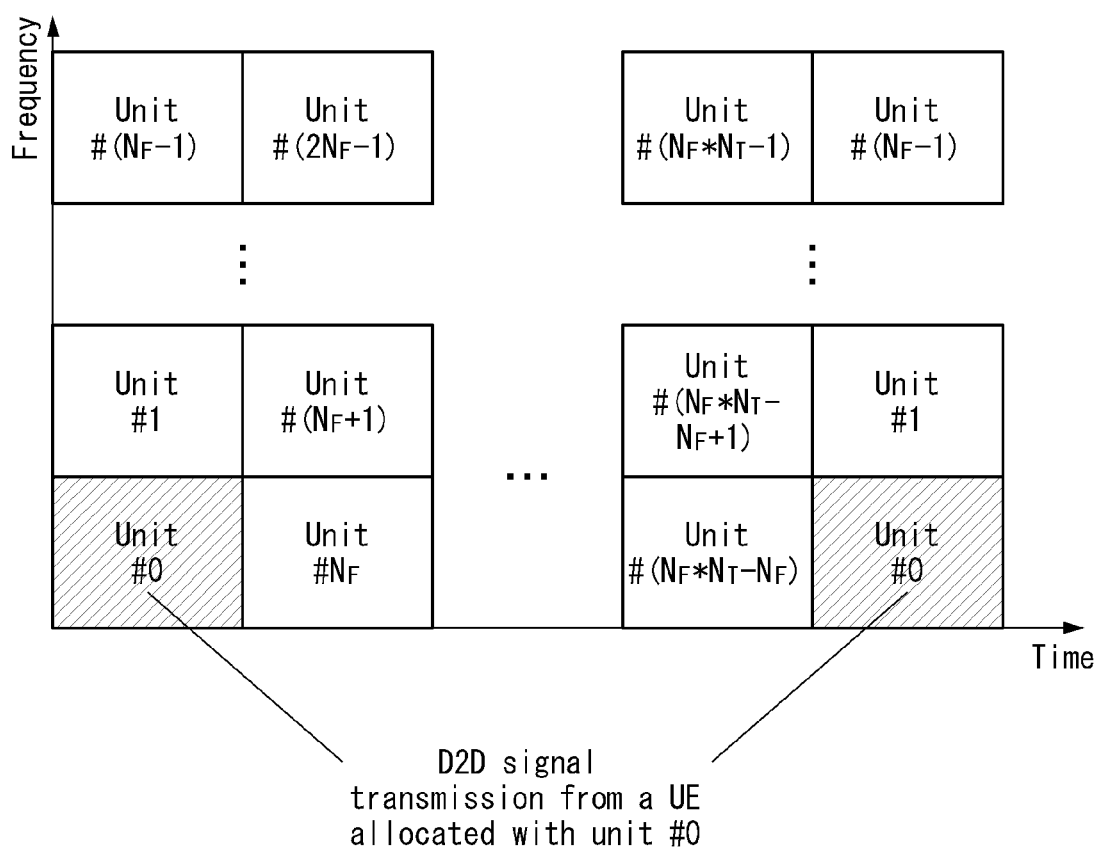
FIGS. 24 and 25 illustrate one example of a method for allocating resources in D2D communication to which the present invention may be applied.
Figure 25:
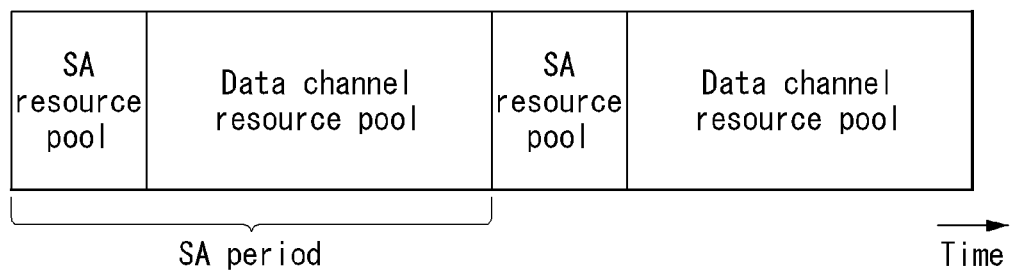

FIGS. 24 and 25 illustrate one example of a method for allocating resources in D2D communication to which the present invention may be applied.

FIG. 24 illustrates one example of how resource units are configured for communication between UEs, where the total frequency resources are divided into NF units and the total time resources are divided into NT units, thereby defining a total of NF×NT resource units. Here, it is assumed that the corresponding resource pool is repeated with a period of NT subframes.

For example, as shown in FIG. 24, one resource unit may appear periodically. Similarly, to obtain a diversity effect from the time or frequency aspect, the index of a physical resource unit to which one logical resource unit is mapped may change according to a predetermined pattern as time goes on.

In the resource unit structure, a resource pool may refer to a set of resource units used for transmission by a UE attempting to transmit a D2D signal.

The resource pool may be further divided into several types. First, the resource pool may be identified by the contents of a D2D signal transmitted from each resource pool. For example, the contents of a D2D signal may be distinguished as described below, and a separate resource pool may be configured for each type of contents.

Scheduling assignment (SA): a signal including information about the position of a resource used by each transmitting UE for transmission of a succeeding D2D data channel, modulation required for demodulation of a data channel, coding scheme (MCS), or MIMO transmission scheme. The signal may be transmitted being multiplexed with D2D data on the same resource unit, and in this case, an SA resource pool may refer to a resource pool to which SA is transmitted being multiplexed with D2D data.

D2D data channel: a resource pool holding resources designed by SA, which are used by a transmitting UE to transmit user data. If a D2D data channel may be transmitted being multiplexed with D2D data on the same resource unit, only the D2D data channel excluding SA information may be transmitted in a resource pool for the D2D data channel. In other words, the resource element used for transmitting SA information on a separate resource unit within the SA resource pool may still be used for transmitting D2D data in a D2D data channel resource pool.

Discovery Message: a resource pool for a message that enables a transmitting UE to transmit information such as the transmitting UE's own ID and enables a neighboring UE to discover the transmitting UE.

In addition to the above, even when the contents of a D2D signal are the same, a different resource pool may be used depending on the transmission and reception properties of a D2D signal. For example, even if the contents hold the same D2D data channel or the same discovery message, the corresponding resource pool may be again regarded as being different from the others depending on a transmission timing determination method of a D2D signal (for example, a case where the D2D signal may be transmitted at the time a synchronization reference signal is received, or the D2D signal may be transmitted at the time the synchronization reference signal is received by applying a predetermined timing advance), resource allocation method (for example, a case where an eNB designates a transmission resource of an individual signal for an individual transmitting UE, or an individual transmitting UE itself selects an individual signal transmission resource within the resource pool), or signal format (for example, the number of symbols occupied by each D2D signal in one subframe or the number of subframes used for transmission of one D2D signal).

A UE attempting to transmit D2D data first selects an appropriate resource from the SA pool and transmits the SA of the UE. At this time, an SA resource, which is associated with a resource for which no SA transmission of other UEs is expected and/or no data transmission in a subframe following the SA of other UE is expected, may be considered with the highest priority as a criterion of SA resource selection. In addition, the UE may select an SA resource associated with a data transmission resource expected to have a low interference level.

In general, an SA resource pool precedes a series of D2D data channel resource pool, and a receiving UE first attempts detection of SA, and it is not until the receiving UE discovers data that need to be received that the receiving UE attempts to receive the data through an associated data resource.

FIG. 25 illustrates a case in which an SA resource pool and a succeeding data channel resource pool are disposed in a periodic pattern, and in what follow, the period at which the SA resource pool appears is called an SA period.

The present invention provides a method for selecting a resource for transmitting a relay signal when a relay operation is performed for D2D communication.

Figure 26:
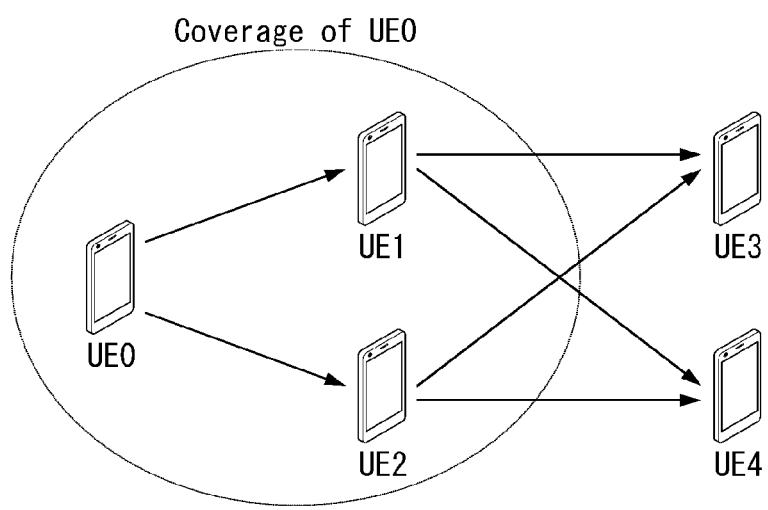
FIGS. 26 to 28 illustrate one example of a relay process and resources for relay to which the present invention may be applied.
Figure 27:
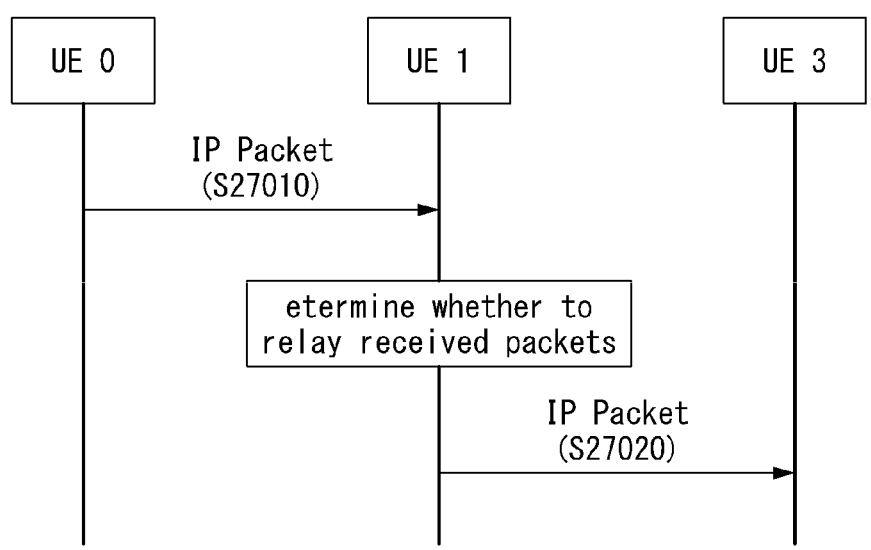
Figure 28:
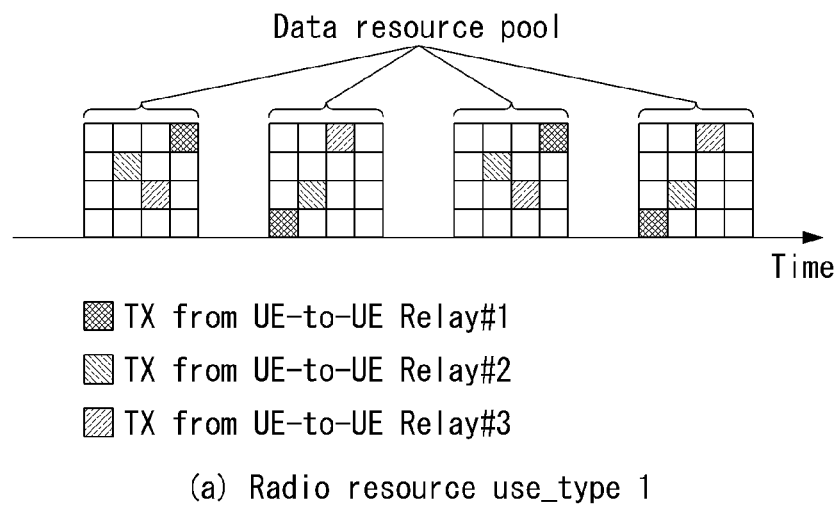
Figure 28:
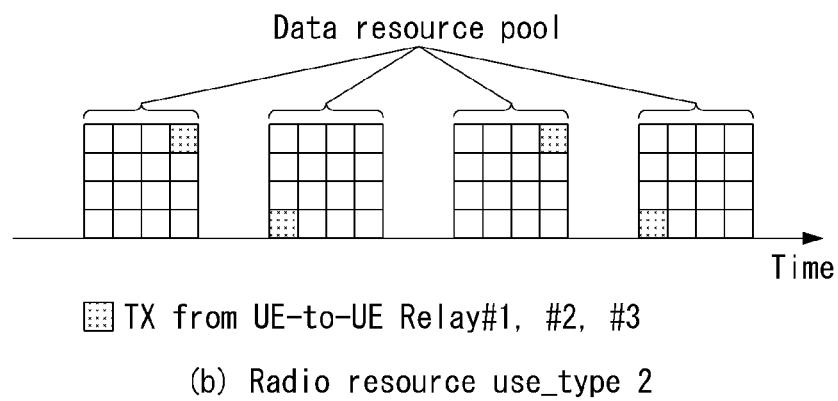

FIGS. 26 to 28 illustrate one example of a relay process and resources for relay to which the present invention may be applied.

Referring to FIGS. 26 to 28, in a communication system supporting D2D communication, a UE may actually extend network coverage by transmitting data through a relay to another UE beyond the coverage.

More specifically, as shown in FIG. 26, UE 1 and/or UE 2, which are located within the coverage of UE 0, may receive a message that the UE 0 has transmitted.

However, the UE 0 is unable to transmit a message directly to the UE 3 or UE 4 located outside the coverage. Therefore, in this case, a relay operation may be performed to transmit a message even to the UE 3 and UE 4 located outside the coverage of the UE 0.

The relay operation refers to an operation performed by the UEs located within network coverage to transmit a message to a UE located outside the coverage.

FIG. 27 illustrates one example of the relay operation; when the UE 0 attempts to transmit a data packet to the UE 3 located outside the coverage, the UE 0 may transmit the data packet to the UE 2 via the UE 1.

More specifically, when the UE 0 attempts to transmit the data packet to the UE 3, the UE 0 transmits the data packet by configuring the parameter indicating whether to relay the data packet S27010.

The UE 1 receives the data packet and determines whether to relay the data packet through the parameter.

When the parameter indicates performing the relay operation, the UE 1 transmits the received data packet to the UE 3 S27020; otherwise, the UE 1 does not transmit the data packet to the UE 3.

Through the method above, the UE 0 may transmit a message to a UE located outside the network coverage.

FIG. 28 illustrates one example of a method for selecting a resource for the relay operation.

Referring to FIG. 28(a), a UE may relay a message by selecting a resource from a resource pool autonomously. In other words, the UEs (UE1, UE2, UE3) may relay the same message by selecting a resource randomly from the resource pool.

However, in this case, a receiving UE that receives a message has to receive the same message repeatedly through different resources.

Therefore, as shown in FIG. 28(b), when a resource pool allocates resources for the relay operation, and each relaying UE transmits a message through the allocated resources, a receiving UE is allowed to receive the same message through the same resource, thereby reducing waste of resources.

Part of the D2D technology described with reference to FIGS. 19 to 28 may also be used for Vehicle-to-everything (V2X) communication and Vehicle-to-Vehicle (V2V) communication.

Figure 29:
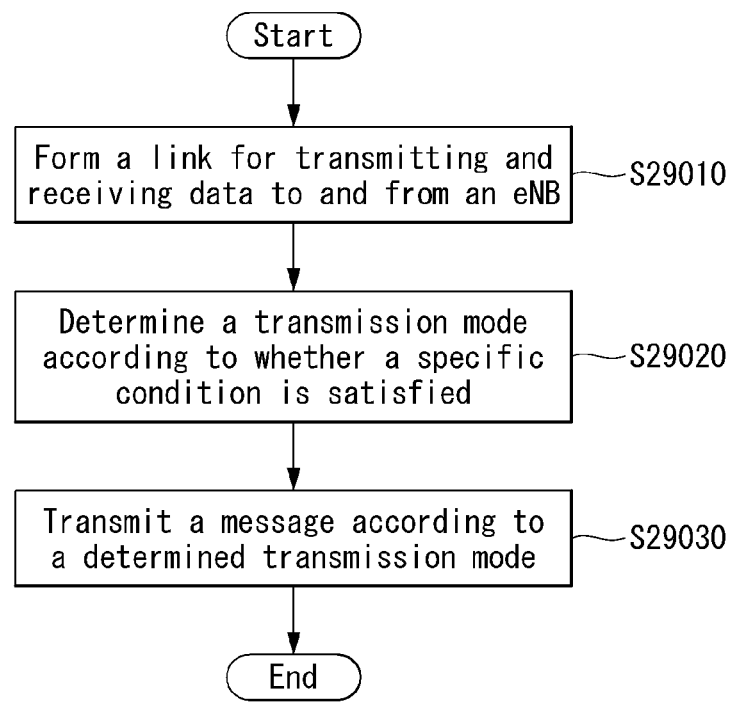
FIG. 29 is a flow diagram illustrating one example of transmitting and receiving messages between a device and a base station to which the present invention may be applied.

FIG. 29 is a flow diagram illustrating one example of transmitting and receiving messages between a device and an eNB to which the present invention may be applied.

Referring to FIG. 29, a device (for example, a vehicle) may establish a link for transmission and reception of data to and from an eNB and transmit and receive data by using the established link according to a specific operation mode.

More specifically, when V2X or V2V communication is performed, a device (for example, a vehicle or a device) may perform direct communication between devices or transmit data to the eNB through an uplink band.

When the device transmits data to the eNB, the device establishes a link (for example, V2X link) for transmitting and receiving data through a connection procedure in association with the eNB S29010.

While forming a connection to the eNB, the device may transmit uplink data (for example, PUSCH) by using the resource (first resource) received through scheduling of the eNB.

However, when the scheduling is not received or data size is larger than that reported by the BSR (Buffer Status Report), the device may transmit data to the eNB through the contention-based resource (second resource) belonging to a contention-based resource set (or contention based resource pool) representing the resource area for a plurality of devices to transmit data to the eNB.

At this time, the device may not form a connection with the eNB for transmitting data to the eNB through the contention based resources.

Also, when the device attempts to transmit data to the eNB after the connection to the eNB is released, the device may transmit data by reconnecting to the eNB or transmit data through the contention based resources.

In what follows, according to the present invention, transmission of data employing the first resource allocated by scheduling of the eNB after a connection to the eNB is formed is called a first transmission mode while transmission of data employing the second resource (contention based (CB) PUSCH transmission) belonging to the contention based resource set (or contention based resource pool) is called a second transmission mode.

At this time, whether to perform transmission according to the first transmission mode or the second transmission mode may be determined by according to whether a specific condition is satisfied. The specific condition will be described in more detail below.

In other words, the device may determine the transmission mode for transmitting the data to the eNB according to whether a specific condition is satisfied S29020 and transmit the data through the determined transmission mode (the first or the second transmission mode) S29030.

Through the method above, data may still be transmitted through V2X or V2V communication even after a connection of a device to the eNB is released.

Figure 30:
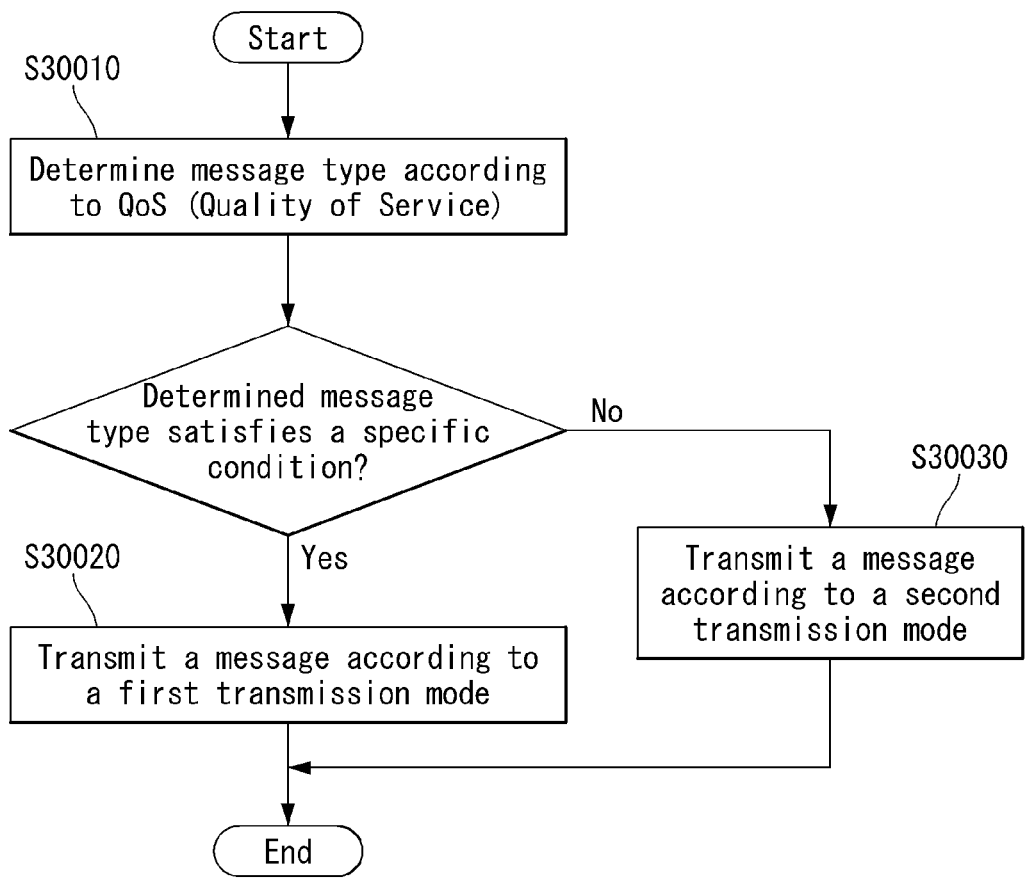
FIG. 30 is a flow diagram to which the present invention may be applied, illustrating one example in which a device in the idle state transmits and receives messages to and from a base station.

FIG. 30 is a flow diagram to which the present invention may be applied, illustrating one example in which a device in the idle state transmits and receives messages to and from an eNB.

Referring to FIG. 30, even if a link for transmitting data between the device and the eNB is released, the device may still transmit data to the eNB by re-establishing a connection to the eNB depending on the message type or through a contention-based resource without involving a connection.

More specifically, when the UE have new data to transmit to the eNB after the UE enters the idle state as the connection to the eNB is released in V2X or V2V communication, the UE has to re-establish a connection to the eNB and perform data transmission through scheduling for transmission of the data.

However, when data transmission is always performed by forming a connection, in the case of data requiring low latency, the required latency may not be satisfied, and if data size is large or handover occurs frequently, data may not be transmitted efficiently.

Therefore, the UE may determine the message type to determine in which mode to transmit a message to the eNB while the UE is in the idle state S30010.

The UE may determine the message type through the QoS (Quality of Service) parameter of the message (for example, required latency and target error rate). At this time, a plurality of QoS parameters may be involved, and the message type may be determined by one or more QoS parameters.

Depending on whether the determined message type satisfies a specific condition, the UE may transmit the message to the eNB through the first or the second transmission mode S30020, S30030.

For example, when the QoS parameter corresponds to the latency requirement value representing the latency required for transmission of a message, the message type may be determined by the latency requirement. If the message requires low latency, the UE may use the second transmission mode to quickly transmit the message.

In other words, when the latency requirement is higher than a threshold value, the UE may transmit the message according to the first transmission mode while, if the required latency is lower than the threshold value, the UE may transmit the message through the second transmission mode.

At this time, the threshold value may represent the largest time period required for the UE until it forms a connection to the eNB, receives a resource, and transmits data.

When the QoS parameter is the target error rate, namely, when high reception performance is required, the UE may transmit a message through the first transmission mode to achieve reliable scheduling and data transmission but may transmit a message through the second transmission mode, otherwise.

Although the message is transmitted in the second transmission mode according to another embodiment of the present invention, there are chances that the eNB may fail to receive the message. For example, the UE may receive a response indicating a failure of receiving a message from the eNB.

In this case, the UE may transmit the message directly via another resource rather than the contention based resource or re-transmit the message through scheduling of the eNB.

Similarly, the UE may retransmit the message according to the second transmission mode by lowering the MCS (Modulation and Coding Scheme) or by using the same method.

Figure 31:
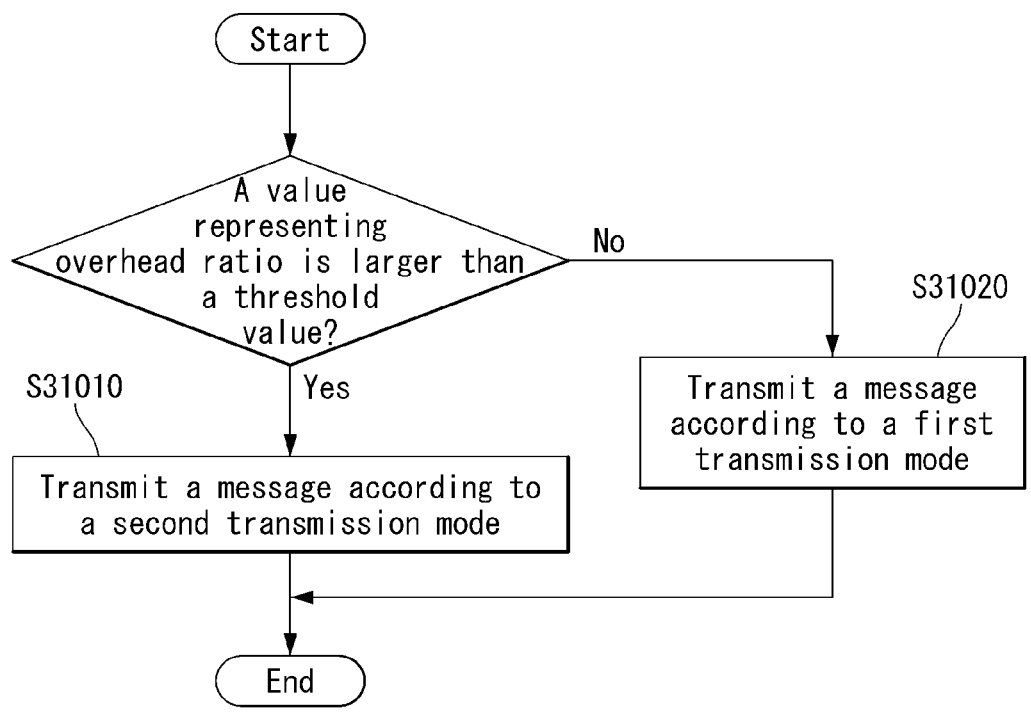
FIG. 31 is a flow diagram according to the present invention, illustrating another example in which a device in the idle state transmits and receives messages to and from a base station.

FIG. 31 is a flow diagram according to the present invention, illustrating another example in which a device in the idle state transmits and receives messages to and from an eNB.

Referring to FIG. 31, as another embodiment of FIG. 30, even if a link for transmitting data to the eNB is released, data may be transmitted by re-establishing a link to the eNB depending on the message size, or a message may be transmitted to the eNB through a contention-based resource without involving a connection to the eNB.

More specifically, transmission mode may be determined according to the size of a message that a device attempts to transmit. In other words, when the size of a resource for forming a connection to the eNB is relatively larger than the size of a message to be transmitted, the message may be transmitted through the second transmission mode while the message may be transmitted through the first transmission mode when the size of a resource for forming a connection to the eNB is relatively smaller than the size of a message to be transmitted.

For example, suppose a resource required for forming a connection (for example, time and/or frequency resource) is called a connection resource, a resource used as overhead each time a message is transmitted after a connection is formed is called an overhead resource, and a resource used for transmitting the message is called a transmission resource. Then the total amount of resources required for transmitting the message once is equal to the sum of the connection resource, overhead resource, and transmission resource.

Also, from the total amount of resources, the amount of resources used as overhead is equal to the sum of the connection resource and the overhead resource.

At this time, after a connection is formed, the ratio of overhead used for transmitting a message to the eNB for one time is given by Eq. 15 below.

$$r_{OH} = \frac{\text{Connection resource} + \text{Overhead resource}}{\text{Connection resource} + \text{Overhead resource} + \text{Transmisison resource}} \quad [\text{Eq. 15}]$$

If transmission is performed n times on average until the connection is released, the ratio of the overhead used for transmission of a message having the same overhead size and data size is given by Eq. 16 below.

$$r_{OH} = \frac{\text{Connection resource} + \text{Overhead resource}}{\text{Connection resource} + n \times (\text{Overhead resource} + \text{Transmission resource})} \quad [\text{Eq. 16}]$$

Differently from Eq. 16, if the size of the overhead is different from the data size, the ratio of the overhead used for transmission of a message is given by Eq. 17 below.

$$r_{OH} = \frac{\text{Connection resource} + \text{Overhead resource}}{\text{Connection resource} + \sum_{i=0}^{n-1} (\text{Overhead resource} + \text{Transmission resource})} \quad [\text{Eq. 17}]$$

If $r_{OH}$, which represents the overhead ratio, is determined through Eqs. 14 to 17, $r_{OH}$ may determine whether to transmit a message through the first transmission mode or through the second transmission mode.

In other words, if $r_{OH}$ is equal to or larger than a threshold value, the message may be transmitted through the second transmission mode while the message may be transmitted through the first transmission mode if $r_{OH}$ is smaller than the threshold value.

The threshold value may represent the maximum value of the overhead ratio according to which the eNB to allocate a resource for transmission of a message to a device.

In other words, the threshold value may represent the maximum value of the overhead ratio for operation in the first mode.

The threshold value may be configured for the device in advance or may be transmitted to the device by signaling through an upper layer or physical channel.

Figure 32:
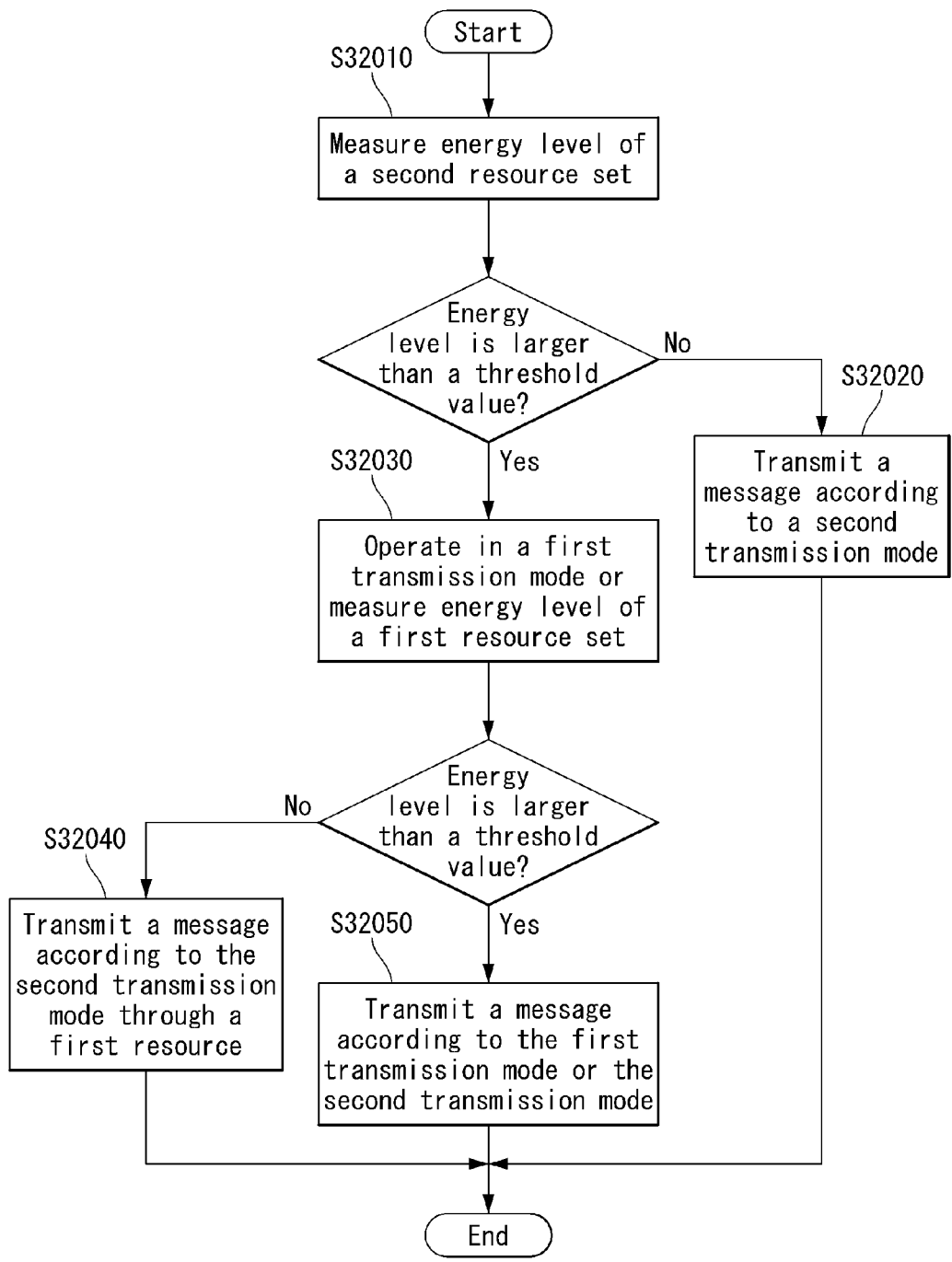
FIG. 32 is a flow diagram according to the present invention, illustrating a yet another example in which a device in the idle state transmits and receives messages to and from a base station.

FIG. 32 is a flow diagram according to the present invention, illustrating a yet another example in which a device in the idle state transmits and receives messages to and from an eNB.

Referring to FIG. 32, even when a link through which a device transmits data to an eNB is released, data may still be transmitted by re-establishing a link according to a contention situation, or an uplink message may still be transmitted to the eNB through a contention-based resource without involving a connection.

For example, in the case of the second transmission mode in which a message is transmitted through a contention-based resource, latency due to transmission of a message may be reduced since the second transmission mode does not require a procedure for receiving a resource from the eNB; however, since a plurality of devices may use the contention-based resources, collision may occur during message transmission.

Therefore, when the device transmits a message through the second transmission mode, if many collisions are anticipated, the message may be transmitted through the first transmission mode or by using a resource for the first transmission mode.

More specifically, if a message to be transmitted to the eNB is generated after the device enters the idle state as a connection to the eNB is released, the device may measure the energy level (first energy level) of a contention based resource set (in what follows, it is called a second resource set) for transmitting the message through the second transmission mode S32010.

If the second resource set includes a resource the energy level of which is less than a threshold value, the device may determine that no collision will occur even if the message is transmitted through the resource and transmit the message to the eNB through the second transmission mode S32020.

However, if energy levels of all of the resources belonging to the second resource set are larger than the threshold value, the device may determine that if a message is transmitted through a resource belonging to the second resource set, a collision may occur with messages transmitted from other devices and transmit the message by receiving a first resource belonging to the first resource set from the eNB according to the first transmission mode.

Or, the device measures the energy level (second energy level) of a resource set (in what follows, a first resource set) for transmitting a message through the first transmission mode S32030.

If a specific resource belongs to the first resource set, the energy level of which is measured to be less than a threshold value, the device may determine that even if a message is transmitted through the resource, no collision will occur with other messages transmitted by other devices and transmit data to the uplink through the specific resource without going through a separate resource allocation procedure performed by the eNB.

In other words, the device may operate in the second transmission mode through a specific resource belonging to the first resource set rather than the second resource set S32040. However, when the energy levels of the resources belonging to the first resource set are all higher than the thresh hold value, the device may transmit the message by selecting one transmission mode arbitrarily between the first and the second transmission mode or suspend transmission of the message until a resource the energy level of which is less than the threshold value is found in the second or the first resource set S32050.

At this time, the threshold value may represent the minimum energy level considered not to cause a collision at the time of message transmission.

The threshold value may be configured for the device beforehand or may be transmitted to the device by signaling through an upper layer or physical channel; and when the device measures the energy level of the first and the second resource set, the energy level may be measured over the entire resources or part of the resources of each resource set.

Also, when the energy level is measured, the measurement may be performed over both of the section to which a message is actually transmitted and the section to which control information is transmitted; or the measurement may be performed only over the section to which a message is actually transmitted or to the section to which control information about message transmission is transmitted (for example, SA (Scheduling Assignment) section).

Figure 33:
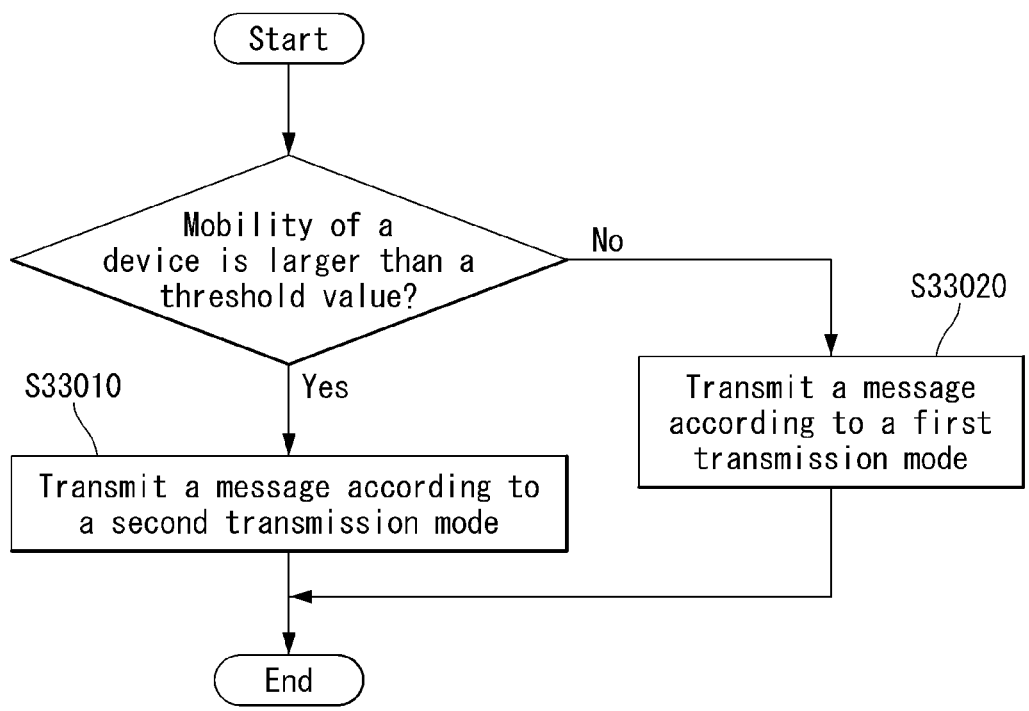
FIG. 33 is a flow diagram according to the present invention, illustrating a still another example in which a device in the idle state transmits and receives messages to and from a base station.

FIG. 33 is a flow diagram according to the present invention, illustrating a still another example in which a device in the idle state transmits and receives messages to and from an eNB.

Referring to FIG. 33, when a device moves with a high speed, the device may often leave the coverage of a serving eNB, thereby causing frequent handovers.

In this case, attempting to form a connection to a changed serving eNB and receiving a resource for message transmission to the uplink each time the device transmits a message may not satisfy the latency requirement of a message that requires low latency.

Therefore, when entering the idle state due to a situation such as the device's leaving the coverage of the eNB, the device may transmit a message to the eNB according to the first or the second transmission mode on the basis of the mobility of the device.

More specifically, when a message is generated to be transmitted to the eNB after the device enters the idle state as a connection to the eNB is released, a value related to the mobility of the device may be calculated (or measured).

For example, the device may calculate the value related to the mobility by measuring the rate at which a serving eNB is changed (for example, cell change rate). In other words, by calculating the ratio at which a serving eNB related to the device is changed during a specific time period, the value related to the mobility may be calculated.

Similarly, a value related to the mobility may be calculated by considering or estimating the device's speed, direction, and so on. For example, the value related to the mobility may be the speed of the device.

The device compares the value related to the mobility with a threshold value, and if the mobility-related value is smaller than the threshold value, the device may transmit the message to the eNB according to the first transmission mode S33020.

However, if the mobility-related value is larger than the threshold value, the device may transmit the message to the eNB according to the second transmission mode S33010.

For example, when the mobility-related value is the device's speed, and the device's speed is larger than the threshold value, the device may transmit the message to the eNB according to the second transmission mode on the expectation that handover may occur frequently.

However, when the device's speed is smaller than the threshold value, the device may transmit the message to the eNB according to the first transmission mode, expecting that handover will not occur frequently.

The threshold value may represent the maximum value related to the mobility for transmitting the message according to the first transmission mode.

At this time, the threshold value may be configured for the device beforehand or may be transmitted to the device by signaling through an upper layer or physical channel.

In a yet another embodiment of the present invention, the device may transmit a message to the eNB by using a method similar to the SPS method described above.

More specifically, when the device receives a resource for transmitting a message according to the SPS method described in FIG. 18 while the device is connected to the serving eNB, the device may transmit a message by using existing scheduling information even if the device enters the idle state as a connection to the eNB is released.

Also, when parameters related to the SPS are changed by the eNB even before the period of the SPS is terminated, the device may receive information related to the changed parameters. At this time, when the device receives the information in the middle of the SPS period or after the SPS period is completed, the device may apply the changed parameters.

By using the method described with reference to FIGS. 30 to 33, even after a connection to the eNB is released, the device may still transmit a message to the eNB by re-establishing a connection depending on whether a specific condition is satisfied or through a contention-based resource available for a plurality of devices in the idle state.

Therefore, the device may effectively transmit a message to the eNB by taking into account various conditions such as the surrounding environment and message type.

Figure 34:
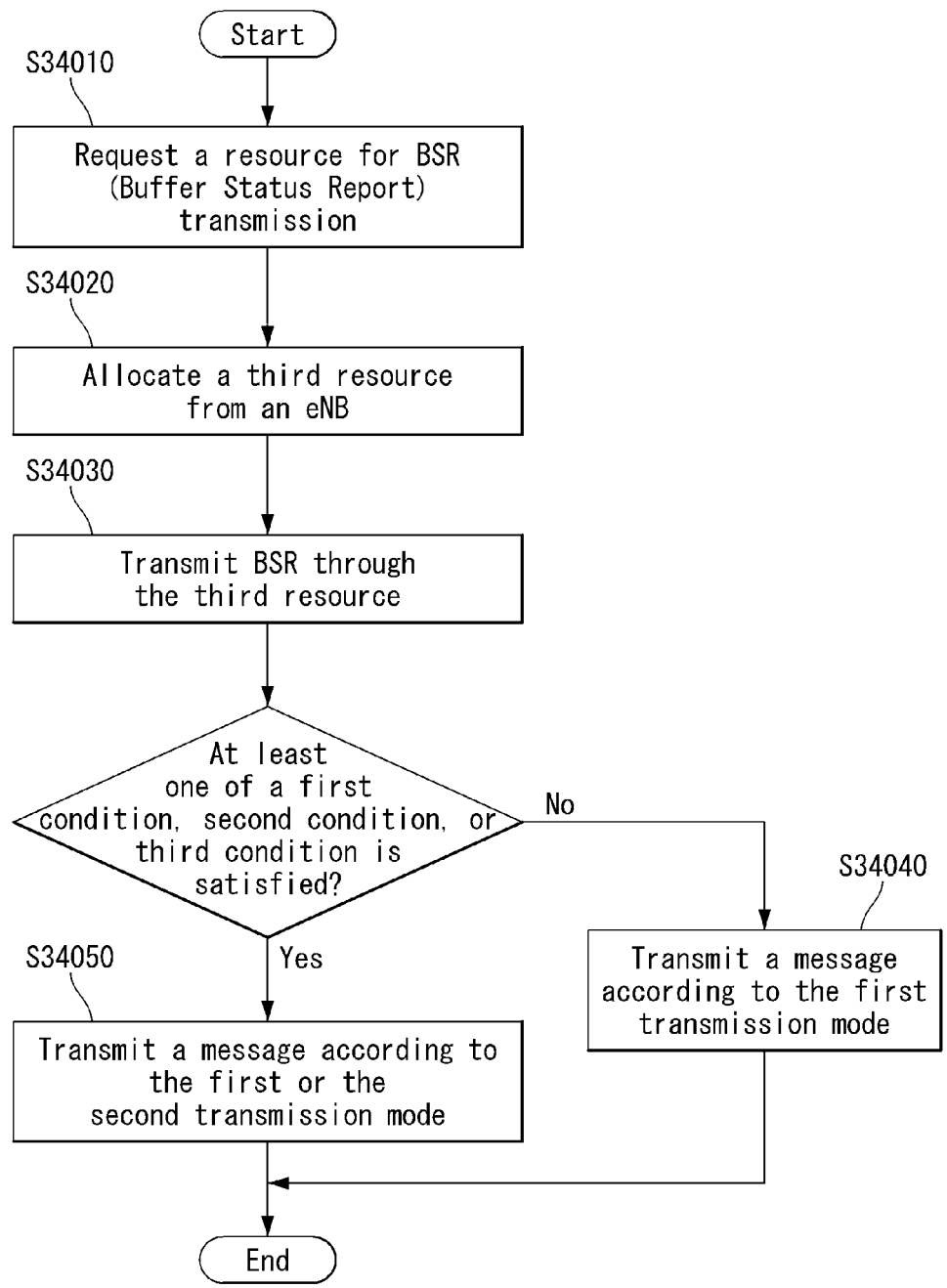
FIG. 34 is a flow diagram according to the present invention, illustrating a yet another example in which a device in a connected state transmits and receives messages to and from a base station.

FIG. 34 is a flow diagram according to the present invention, illustrating a yet another example in which a device in a connected state transmits and receives messages to and from an eNB.

Referring to FIG. 34, differently from FIGS. 30 to 33, a device may transmit a message to an eNB through the first or the second transmission mode described above depending on a specific situation even when a connection to the eNB is not released yet.

More specifically, when the device attempts to transmit an uplink message to the eNB after forming a connection to the eNB, the device requests resource allocation (a third resource) for transmission of a BSR (Buffer Status Report) from the eNB S34010.

The eNB may allocate a resource for the BSR (the third resource) to the device in response to the request of the device (for example, transmission of a UL grant), and the device may transmit the BSR to the eNB through the third resource allocated S34020, S34030.

Afterwards, the device may transmit the message to the eNB according to the first transmission mode. In other words, the device may request a resource for transmission of the message (the first resource) from the eNB and transmit the message to the eNB by receiving a resource from the eNB S34040.

However, the device may transmit the message according to the first or the second transmission mode by using the method described below when the device satisfies at least one of the following conditions: a case in which the device fails to receive the first resource within a predetermined time period (in what follows, it is called a first condition), a case in which the size of a message reported to the eNB through the BSR is different from the size of a message to be actually transmitted (in what follows, a second condition) and/or a case in which the size of the first resource is different form the size of the message (a third condition) S34050.

First, the device may transmit the message to the eNB according to the second transmission mode. For example, when the first condition is satisfied, the device may determine that resources to be allocated by the eNB become scarce or resources are not allocated within a specific time period. And while being in the connected state, the device may transmit the message through a contention-based resource (a second resource) of a contention-based resource set according to the second transmission mode.

Second, the device may wait for the first resource to be allocated until a specific time. If the first resource is allocated within the specific time period, the device may transmit the message to the eNB through the first transmission mode.

However, if the first resource is not allocated until the specific time period is completed, the device may transmit the message to the eNB through the second transmission mode or transmit the message to the eNB through the third method described below.

Third, the device may request an additional resource for transmission of the message (a fourth resource) from the eNB. At this time, the device may request the fourth resource through a pre-configured resource or signaled resource.

Also, the device may inform the eNB about the situation of the device through the request.

If the device receives the fourth resource within a specific time period through a request for the fourth resource, the device may transmit the message to the eNB through the fourth resource.

However, when the device does not receive the fourth resource until the specific time period is completed, the device may transmit the message through the first or second method.

At this time, the specific time period of the first to third method may be pre-configured or transmitted to the device by signaling through an upper layer or physical channel.

Even if the device forms a connection to the eNB and stays in the connected state through the method above, the device may transmit a message through a contention-based resource once a specific condition is satisfied.

Figure 35:
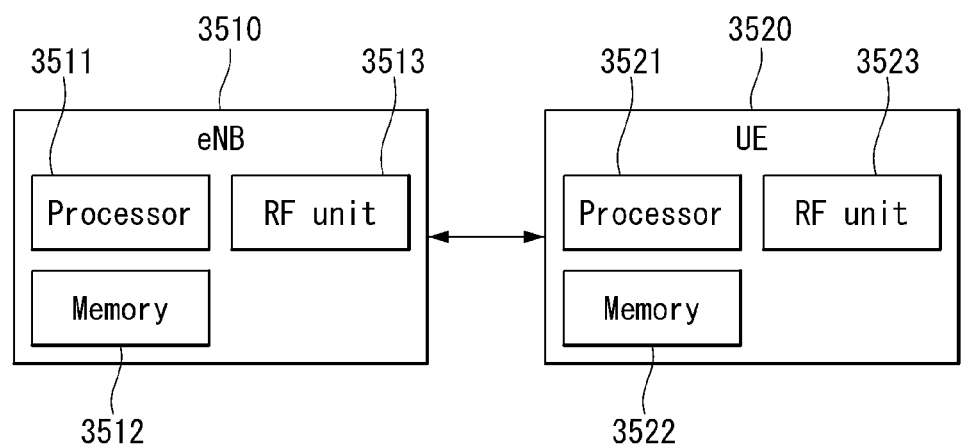
FIG. 35 illustrates one example of a block diagram of a wireless communication device according to one embodiment of the present invention.

FIG. 35 illustrates one example of a block diagram of a wireless communication device according to one embodiment of the present invention.

As shown in FIG. 35, the eNB 3510 and the UE 3520 include an RF unit (transceiver, communication unit) 3513, 3523, processor 3511, 3521, and memory 3512, 3522.

In addition to the components above, the eNB and the UE may further include an input unit and an output unit.

The RF unit 3513, 3523, processor 3511, 3521, input unit, output unit, and memory 3512, 3522 are connected functionally to each other to perform the method proposed in this document.

Receiving the information based on the PHY (Physical Layer) protocol, the RF unit (transceiver or communication unit) 3513, 3523 transforms the received information to the RF (Radio-Frequency) spectrum, performs filtering and amplification on the received information, and transmits the information through the antenna. Also, the RF unit performs the function of transforming the RF signal received from the antenna to the frequency band that may be processed according to the PHY protocol and filtering the transformed signal.

And the RF unit may also include a switch function for switching between the transmission and the reception function.

The processor 3511, 3521 implements a function, process and/or method proposed in the present document. Layers of a radio interface protocol may be implemented by the processor.

The processor may also be called a controller, control unit, or computer.

The memory 3512, 3522, being connected to the processor, stores protocols or parameters for performing D2D discovery.

The processor 3511, 3521 may include ASIC (Application-Specific Integrated Circuit), other chipsets, logical circuits and/or data processing devices. The memory may include ROM (Read-Only Memory), RAM (Random Access Memory), flash memory, memory card, storage medium and/or other storage devices. The RF unit may include a baseband circuit for processing a wireless signal. When embodiments are implemented by software, the techniques described above may be implemented by the modules (processes and functions) that perform the functions described above.

A module may be stored in the memory and executed by the processor. The memory may be installed inside or outside the processor and may be connected to the processor via various well-known means.

The output unit (display unit) is controlled by the processor and displays information outputted from the processor together with key input signals generated from the key input unit and various information signals from the processor.

In this document, for the convenience of description, the present invention has been described according to the respective drawings; however, it is equally possible to design a new embodiment by merging the embodiments described in the respective drawings. Also, depending on the needs of those skilled in the art, designing a computer-readable recording medium in a computer storing a program for running the embodiments previously described also belongs to the technical scope of the present invention.

The method for transmitting and receiving data in a wireless communication system according to the present invention is not limited to the embodiments described above, but the entire or part of the embodiments may be combined selectively so that various modifications may be made to the embodiments.

Meanwhile, the method for transmitting and receiving data in a wireless communication system according to the present invention may be implemented in the form of processor-readable program codes in a recording medium that may be read by a processor installed in a network device. The processor-readable recording medium includes all kinds of recording devices storing data that may be read by the processor. Examples of processor-readable recording media include ROM, RAM, CD-ROM, magnetic tape, floppy disk, optical data storage device, and implementation in the form of carrier waves such as transmission through the Internet. Also, the processor-readable recording medium may be distributed over computer systems connected to each other through a network so that processor-readable codes may be stored and executed in a distributed manner.

Throughout the document, preferred embodiments of the present invention have been described with reference to appended drawings; however, the present invention is not limited to the embodiments above. Rather, it should be noted that various modifications of the present invention may be made by those skilled in the art to which the present invention belongs without leaving the technical scope of the present invention defined by the appended claims, and these modifications should not be understood individually from the technical principles or aspects of the present invention.

The present document describes both of the product invention and the process invention, and depending on the needs, descriptions of the respective inventions may be applied in a supplementary manner.

The invention claimed is:

1. A method for a device to transmit and receive data with a base station in a wireless communication system supporting a V2X (Vehicle-to-everything) service, the method comprising:
    establishing a link for transmitting and receiving messages with the base station;
    entering an idle state; and
    transmitting a message through a first resource allocated by the base station based on a specific condition in the idle state or through a second resource for contention based transmission to the base station,
    wherein the specific condition is determined by one of a message type, message size, or first energy level of the second resource, or a mobility of the device.

2. The method of claim 1,
    wherein, when the specific condition is determined by the message type, the message type is determined by Quality of Service (QoS) of the message, and
    wherein the QoS is one of a latency request value indicating a required latency of the message and a target error rate.

3. The method of claim 2, wherein, when the QoS is the required latency value, the message is transmitted through the second resource when the required latency value is less than a threshold value and the message is transmitted through the first resource when the required latency value is larger than the threshold value.

4. The method of claim 3, wherein the threshold value indicates a maximum value of time required for the device to establish a link with the base station and transmit data.

5. The method of claim 1,
    wherein, when the specific condition is determined by the message size, the message is transmitted through the first resource when a value indicating a ratio of overhead for transmitting the message is less than a threshold value, and the message is transmitted through the second resource when the value is larger than the threshold value, and
    wherein the threshold value indicates a maximum value of overhead ratio for transmitting the message through the second resource.

6. The method of claim 1, further comprising:
    when the specific condition is determined by the first energy level, measuring the first energy level.

7. The method of claim 6, wherein, when the first energy level is less than a threshold value, the message is transmitted through the second resource.

8. The method of claim 6, further comprising:
    when the first energy level is larger than a threshold value, measuring a second energy level of the first resource.

9. The method of claim 8, wherein, when the second energy level is less than the threshold value, the message is transmitted through the first resource.

10. The method of claim 8, wherein, when the second energy level is larger than the threshold value, the message is transmitted through a resource randomly chosen between the first resource and the second resource.

11. The method of claim 1, wherein, when the specific condition is determined by the mobility, the message is transmitted through the second resource when the mobility is larger than a threshold value, and the message is transmitted through the first resource when the mobility is less than the threshold value.

12. The method of claim 1, further comprising:
    when the message is transmitted through the first resource, requesting a third resource for transmitting a BSR (Buffer State Report) to the base station;
    receiving the third resource from the base station;
    transmitting the BSR through the third resource; and
    receiving the first resource for transmitting the message from the base station based on the BSR.

13. A method for a device to transmit and receive data with a base station in a wireless communication system supporting V2X (Vehicle-to-everything) service, the method comprising:
    establishing a link for transmitting and receiving messages with the base station;
    requesting allocation of a third resource for transmission of a BSR (Buffer State Report) to the base station;
    receiving the third resource from the base station;
    transmitting the BSR through a first resource; and
    transmitting the message through the first resource or a second resource for contention based transmission based on the BSR according to whether the first resource for transmitting the message is allocated,
    wherein, when the size of the message is larger than the size of the message reported through the BSR, the message is transmitted through the second resource.

14. The method of claim 13, wherein, when the size of the message is equal to or smaller than the size of the message reported through the BSR, the message is transmitted through the first resource.

15. The method of claim 13, wherein, when the first resource is allocated within a specific time period, the message is transmitted through the first resource.

16. The method of claim 13, wherein, when the first resource is not allocated within a specific time period, the message is transmitted through the second resource.

17. The method of claim 13, further comprising:
    when the first resource is not allocated within a specific time period, requesting allocation of a fourth resource for transmitting the message to the base station;
    receiving the fourth resource from the base station; and
    transmitting the message through the fourth resource.

18. A device for transmitting and receiving data with a base station in a wireless communication system supporting a V2X (Vehicle-to-everything) service, the device comprising:
    a transceiver configured to transmit and receive signals; and
    a controller functionally connected to the transceiver, wherein the controller is configured to:
    establish a link for transmitting and receiving messages to and from the base station,
    enter an idle state, and
    transmit a message through a first resource allocated by the base station based on a specific condition in the idle state or through a second resource for contention based transmission to the base station,
    wherein the specific condition is determined by one of a message type, message size, first energy level of the second resource, or a mobility of the device.

* * * * *